United States Patent
Lee et al.

(10) Patent No.: US 9,386,905 B2
(45) Date of Patent: Jul. 12, 2016

(54) NETWORK SYSTEM

(75) Inventors: Koonseok Lee, Changwon-si (KR);
Junho Ahn, Changwon-si (KR);
Hoonbong Lee, Changwon-si (KR);
Yanghwan Kim, Changwon-si (KR);
Hoseon Choi, Changwon-si (KR);
Daehwan Park, Changwon-si (KR);
Gilsup Jeong, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 601 days.

(21) Appl. No.: 13/579,430

(22) PCT Filed: Feb. 17, 2011

(86) PCT No.: PCT/US2011/025219
§ 371 (c)(1),
(2), (4) Date: Aug. 16, 2012

(87) PCT Pub. No.: WO2011/103275
PCT Pub. Date: Aug. 25, 2011

(65) Prior Publication Data
US 2012/0310437 A1    Dec. 6, 2012

(30) Foreign Application Priority Data

| Feb. 17, 2010 | (KR) | 10-2010-0014125 |
| Feb. 17, 2010 | (KR) | 10-2010-0014133 |
| Feb. 17, 2010 | (KR) | 10-2010-0014145 |
| Feb. 23, 2010 | (KR) | 10-2010-0016026 |
| May 5, 2010 | (WO) | PCT/KR2010/002851 |
| May 5, 2010 | (WO) | PCT/KR2010/002852 |
| Jun. 10, 2010 | (WO) | PCT/KR2010/003750 |
| Nov. 26, 2010 | (WO) | PCT/IB2010/003388 |

(51) Int. Cl.
*G06F 1/26* (2006.01)
*G06F 1/32* (2006.01)
(Continued)

(52) U.S. Cl.
CPC ........... *A47L 15/4293* (2013.01); *D06F 39/005* (2013.01); *H04L 12/12* (2013.01); *H04L 12/2818* (2013.01); *Y02B 60/34* (2013.01)

(58) Field of Classification Search
CPC .... H04L 12/12; H04L 12/2818; Y02B 60/34; G06Q 50/06; D06F 33/02; D06F 39/005; D06F 2212/02; A47L 15/4293; Y04S 20/228
USPC .......................... 700/291, 295, 296; 705/412
See application file for complete search history.

(56) References Cited

U.S. PATENT DOCUMENTS

| 6,860,431 | B2 * | 3/2005 | Jayadev | 236/47 |
| 6,885,115 | B2 * | 4/2005 | Hatori et al. | 307/80 |

(Continued)

FOREIGN PATENT DOCUMENTS

EP    2494735    9/2012

*Primary Examiner* — Charles Kasenge
(74) *Attorney, Agent, or Firm* — Dentons US LLP

(57) ABSTRACT

A network system is provided. The network system includes an utility area network including an energy generation component, a home area network including an energy consumption component consuming energy generated in the energy generation component to perform a function according to an operation course, an energy metering component disposed in the utility area network or the home area network, the energy metering component recognizing energy information or additional information except for the energy information, and an energy management component disposed in the utility area network or the home area network, the energy management component managing the energy information or the additional information with respect to the energy consumption component. The energy consumption component includes a control unit for controlling an operation of at least one course component constituting the operation course to restrict the operation of the one course component based on the energy information or the additional information.

16 Claims, 48 Drawing Sheets

(51) Int. Cl.
   *A47L 15/42* (2006.01)
   *D06F 39/00* (2006.01)
   *H04L 12/12* (2006.01)
   *H04L 12/28* (2006.01)

(56) References Cited

U.S. PATENT DOCUMENTS

| | | | |
|---|---|---|---|
| 6,906,617 B1 | 6/2005 | Van der Meulen | |
| 6,940,413 B2 | 9/2005 | Longobardi | |
| 7,155,912 B2* | 1/2007 | Enis et al. | 60/652 |
| 7,274,975 B2* | 9/2007 | Miller | 700/295 |
| 7,590,871 B2* | 9/2009 | Morisawa | 713/300 |
| 7,783,390 B2* | 8/2010 | Miller | 700/295 |
| 7,962,248 B2* | 6/2011 | Flohr | 700/291 |
| 8,007,597 B2* | 8/2011 | Beaudet | A47L 15/4293 134/18 |
| 8,010,815 B2* | 8/2011 | Hamilton et al. | 713/320 |
| 8,138,627 B2* | 3/2012 | Ferlitsch | 307/39 |
| 8,165,724 B2* | 4/2012 | Kerofsky | 700/291 |
| 8,190,302 B2* | 5/2012 | Burt et al. | 700/295 |
| 8,255,090 B2* | 8/2012 | Frader-Thompson et al. | 700/295 |
| 8,280,556 B2* | 10/2012 | Besore et al. | 700/278 |
| 8,303,726 B2* | 11/2012 | Beaudet | A47L 15/4293 134/56 D |
| 8,463,448 B2* | 6/2013 | Burt et al. | 700/286 |
| 8,548,635 B2* | 10/2013 | Watson et al. | 700/295 |
| 8,562,754 B2* | 10/2013 | Koch | A47L 15/0021 134/57 D |
| 8,617,316 B2* | 12/2013 | Finch | G06Q 50/06 134/18 |
| 8,618,452 B2* | 12/2013 | Besore et al. | 219/702 |
| 8,627,689 B2* | 1/2014 | Finch | G06Q 50/06 68/12.12 |
| 8,818,566 B2* | 8/2014 | Besore et al. | 700/295 |
| 8,869,569 B2* | 10/2014 | Kappler | D06F 33/02 68/12.12 |
| 8,903,560 B2* | 12/2014 | Miller | 700/291 |
| 8,943,857 B2* | 2/2015 | Kappler | D06F 33/02 68/12.16 |
| 2002/0103655 A1 | 8/2002 | Boies et al. | |
| 2003/0178894 A1 | 9/2003 | Ghent | |
| 2004/0107372 A1* | 6/2004 | Morisawa | 713/300 |
| 2005/0171645 A1 | 8/2005 | Oswald et al. | |
| 2006/0276938 A1* | 12/2006 | Miller | 700/295 |
| 2007/0276547 A1* | 11/2007 | Miller | 700/295 |
| 2008/0272934 A1 | 11/2008 | Wang et al. | |
| 2009/0157529 A1* | 6/2009 | Ehlers et al. | 705/26 |
| 2009/0276649 A1* | 11/2009 | Hamilton et al. | 713/320 |
| 2009/0322151 A1* | 12/2009 | Ferlitsch | 307/39 |
| 2010/0089909 A1* | 4/2010 | Besore et al. | 219/720 |
| 2010/0146712 A1* | 6/2010 | Finch | G06Q 50/06 8/137 |
| 2010/0174668 A1* | 7/2010 | Finch et al. | 705/412 |
| 2010/0175719 A1* | 7/2010 | Finch | G06Q 50/06 134/18 |
| 2010/0179708 A1* | 7/2010 | Watson et al. | 700/296 |
| 2011/0061175 A1* | 3/2011 | Kappler | D06F 33/02 8/137 |
| 2011/0061176 A1* | 3/2011 | Kappler | D06F 33/02 8/137 |
| 2011/0061177 A1* | 3/2011 | Kappler | D06F 33/02 8/137 |
| 2011/0148199 A1* | 6/2011 | Besore et al. | 307/41 |
| 2011/0148390 A1* | 6/2011 | Burt et al. | 323/318 |
| 2011/0153090 A1* | 6/2011 | Besore et al. | 700/278 |
| 2011/0153100 A1* | 6/2011 | Besore et al. | 700/291 |
| 2011/0153101 A1* | 6/2011 | Thomas et al. | 700/291 |
| 2012/0215370 A1* | 8/2012 | Seo et al. | 700/296 |

\* cited by examiner

NETWORK SYSTEM

CROSS-REFERENCE TO RELATED APPLICATIONS

This application claims the benefit of priority of PCT/US2011/025219 filed on Feb. 17, 2011, PCT Application No. PCT/KR2010/002852 filed on May 5, 2010, PCT Application No. PCT/KR2010/002851 filed on May 5, 2010 PCT Application No. PCT/KR2010/003750 filed on Jun. 10, 2010, PCT Application No. PCT/IB2010/003388 filed on Nov. 26, 2010, Korean Application No. 10-2010-0014125 filed on Feb. 17, 2010, Korean Application No. 10-2010-0014145 filed on Feb. 17, 2010, Korean Application No. 10-2010-0014133 filed on Feb. 17, 2010 and Korean Application No. 10-2010-0016026 filed on Feb. 23, 2010, all of which are incorporated by reference in their entirety herein.

BACKGROUND

Embodiments relate to a network system for a component.

Providers simply provided an energy source such as electricity, water or gas, and customers simply used the energy source provided from the providers. As a result, it was difficult to perform effective management in view of energy production, energy distribution, energy usage, or the like. Therefore, it is required to develop a network system for effectively managing energy.

SUMMARY

Embodiments provide a network system for a component capable of effectively managing an energy source.

In one embodiment, a network system includes: an utility area network including an energy generation component; a home area network including an energy consumption component consuming energy generated in the energy generation component to perform a function according to an operation course; an energy metering component disposed in the utility area network or the home area network, the energy metering component recognizing energy information or additional information except for the energy information; and an energy management component disposed in the utility area network or the home area network, the energy management component managing the energy information or the additional information with respect to the energy consumption component, wherein the energy consumption component includes a control unit for controlling an operation of at least one course component constituting the operation course to restrict the operation of the one course component based on the energy information or the additional information.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
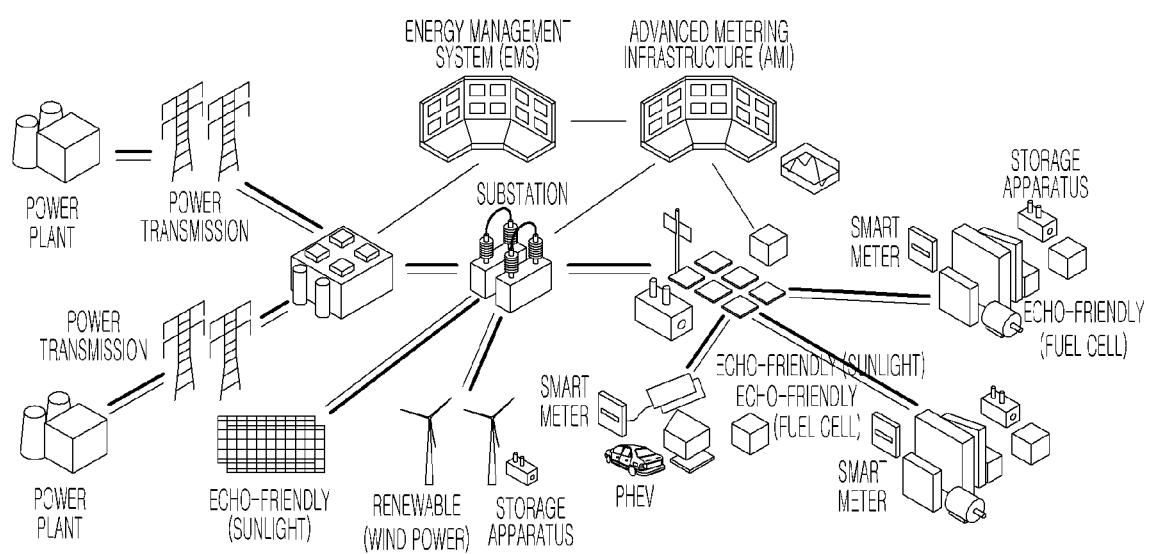
FIG. 1 is a view schematically showing an example of a network system according to an embodiment.

FIG. 1 is a view schematically showing an example of a network system according to an embodiment.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

Also, in the network system, one or more EMSs may be provided as a separate configuration, or the EMS may be included as an energy management function or energy management solution in one or more components.

Figure 2:
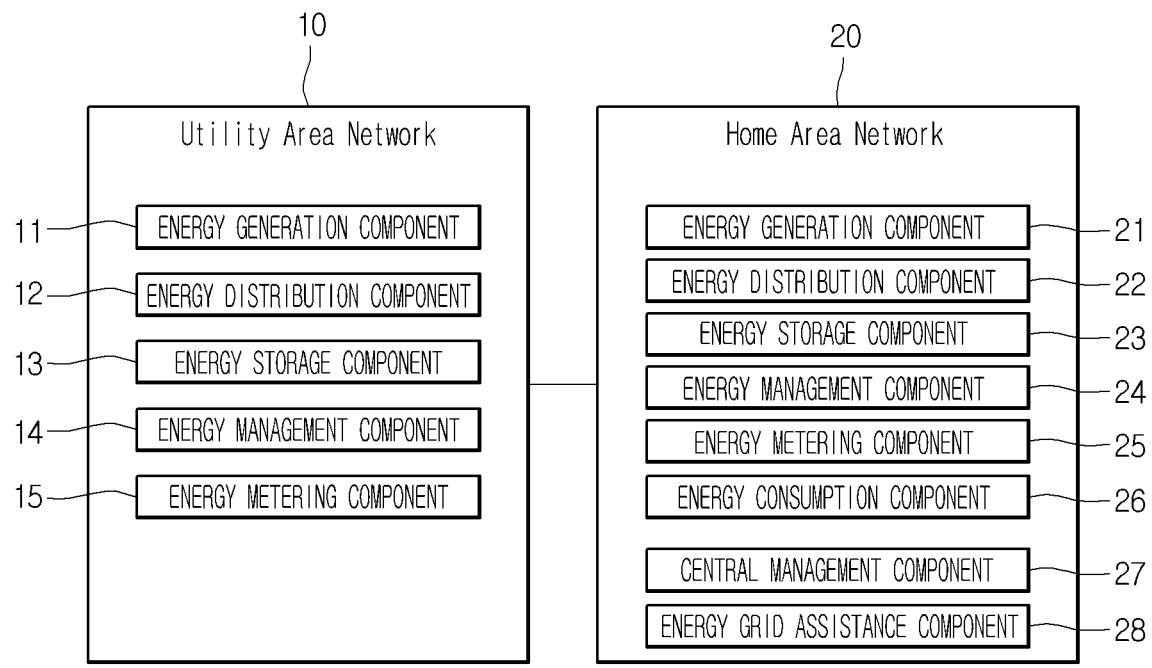
FIG. 2 is a block diagram schematically showing an example of the network system according to an embodiment.

FIG. 2 is a block diagram schematically showing an example of the network system according to an embodiment.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components. In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20. The terminal component may be a component necessary for transmitting/receiving information between the UAN and the HAN. Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS.

In view of the supplied energy, the energy storage component 23, the energy consumption component and the energy generation component 11 may be an energy supplied component to which energy is supplied. The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20. The energy management component 24 may be provided as a separate configuration or may be included in another component as an energy management function.

Specifically, the energy management component 24 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component. The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

Two components that constitute the HAN 20 may communicate with each other by means of a communication unit. The energy generation components 11 and 21, the energy distribution components 12 and 22, the energy storage components 13 and 23, the energy management components 14 and 24, the energy metering components 15 and 25, the energy consumption component and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20.

Figure 3:
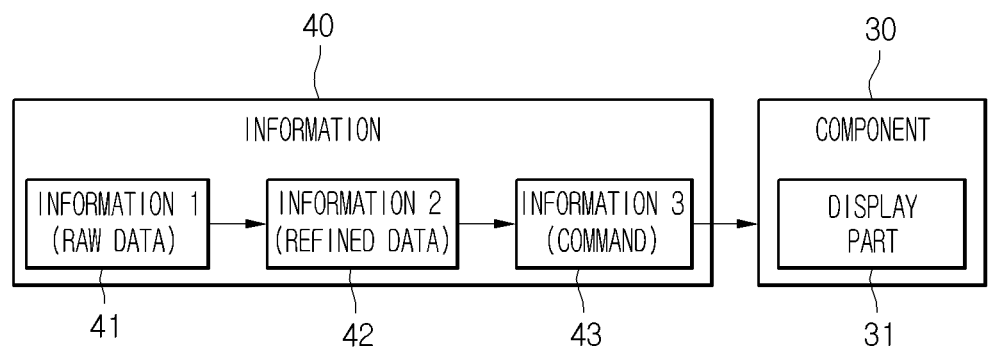
FIG. 3 is a block diagram showing an information transmission process on the network system according to an embodiment.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20. As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels. Also, the energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information. For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or washer, hot water may be stored by driving a heater earlier than the time when the heater is to be operated. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system. If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy. In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased. On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Among the information related to energy, the on-peak information, the curtailment information and information on the deficiency of the amount of electricity supplied may be recognized as high-cost information considered that energy cost is relatively expensive.

On the other hand, among the information related to energy, the off-peak information, the energy increment information and the information on the excess of the amount of electricity supplied may be recognized as low-cost information considered that energy cost is relatively cheap.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Bloolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted. For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information. However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information. In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component. The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes. Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component. As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated. Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control. It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed. As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased. However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained. Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

As still another example, in a case where the component includes a plurality of energy consumption components, the energy consumption components to be controlled may be differently selected according to the kind or state of the energy information or additional information. For example, the energy consumption components to be controlled may be differently selected according to the energy cost value or energy cost level. The reference information may include a first reference information and a second reference information greater than the first reference information. Alternatively, the reference information value may include a single value. For example, if the value of the energy information or additional information is greater than the second reference information value, the power of a first energy consumption component (function performing component that consumes energy) may be controlled (operation limitation). If the value of the energy information or additional information is between the first and second reference information values, the power of a second energy consumption component (function performing component that consumes energy) may be controlled (operation limitation). If the value of the energy information or additional value is smaller than the first reference information value, electricity may be stored in an energy storage component (the operation of a function performing component that stores energy may be started).

That is, any one of a plurality of control objects or methods may be selected according to the kind or state of the energy information or additional information.

As still another example, if the high-cost information is recognized in the operation of the component, the sum of powers of a plurality of energy consumption components that constitute the component and perform the same function may be decreased. The plurality of energy consumption components may be the same kind or different kinds from one another. In a case where the high-cost information is recognized, only some energy consumption components may be turned off, or the power of the some energy consumption components may be decreased. Alternatively, in a case where the high-cost information is recognized, the power of each of the power consumption components may be decreased while the plurality of power consumption components maintain an on-state. Alternatively, in a case where the high-cost is recognized, the power of the plurality of energy consumption components may be decreased with the same power amount or power reduction rate. Alternatively, in a case where the high-cost information is recognized, the power of the plurality of energy consumption components may be decreased with a different power amount or power reduction rate. Alternatively, in a case where the high-cost information is recognized, the plurality of energy consumption components may be alternately turned on and turned off.

As still another example, if the high-cost information is recognized in the operation of the component, among a plurality of energy consumption components that constitute the component, the function performance of one or more energy consumption components may be limited, and the function of another one or more energy consumption components may be performed. The power consumption of the energy consumption components of which function is limited is greater than that of the energy consumption components of which function is performed. For example, in a case where the high-cost information is recognized while a component with relatively high power is operated, energy consumption components with high power may be turned off, and energy consumption components with low power may be turned on.

As still another example, if the high-cost information is recognized in the operation of the component, the operation of energy consumption components that satisfy a limitation condition may be limited among a plurality of energy consumption components that constitute the component. In this instance, the limitation condition may be power consumption, energy used cost or limitation order. That is, among the plurality of energy consumption components, the operation of energy consumption components of which power consumption or energy use cost exceeds a reference value may be limited. Alternatively, the limitation condition may be power consumption that is relatively large among the plurality of energy consumption components.

As still another example, in a case where the operation mode of the component includes a plurality of processes, at least one of the plurality of processes may be limited in the section in which the high-cost information is recognized. The limitation means that the process is stopped or the power consumption in the performance of the process is decreased. For example, in a case where the component is a washing machine, the operation mode may be a standard course, quilt course, wool course or the like. The plurality of processes may include at least one of soaking, washing, rinsing, dehydrating and drying processes. The limited process may be automatically set, or may be manually set or changed.

As still another example, if the high-cost information is recognized in the operation of the component, two or more of a plurality of factors related to the operation of one or more energy components (function performing components) that constitute the component may be changed. The factor may include operation speed, operation time, power, operation rate and the like. If the value related to any one of two or more factors is decreased, the value of another factor may be increased.

As an example, when an energy consumption component is a motor, the rotation speed of the motor may decrease, and a rotation time may increase. When the energy consumption component is a heater, the output of the heater may decrease, and an operation time may increase. That is, when high-cost information is recognized, two or more factors associated with the operations of one or more energy consumption components may vary.

Alternatively, when the energy consumption component is a motor, the operation pattern of the motor may vary. Specifically, when the energy consumption component is a motor that rotates a drum included in a washing machine or a washer, the motor may rotate in one direction or another direction. In the case of a washing machine or a washer, the motor is controlled for laundry to be lifted and then dropped. A drum driving motion may be changed according to the rotation speed of the motor and a rotation angle in a specific direction. The drum driving motion may be divided into a general driving motion and one or more special motions (which have a rotation speed faster than the general motion or a large rotation angle in one-time rotation). Furthermore, the power consumption amount of the motor that is driven in the special motion is greater than the power consumption amount of the motor that is driven in the general motion. In this example, when high-cost information is reduced while the motor is being driven in the special motion, the washing machine or the washer may perform the general motion. When the high-cost information is recognized while the general motion is being performed, the washing machine or the washer performs a specific motion to be originally performed at a time when low-cost information is recognized.

As another example, the operation may be controlled based on the specific order of a plurality of components which may be operated with respect to energy. The specific order may be any one of the order of components which must be firstly operated, the order of operation start, and the order of energy consumption amount or energy usage cost. For example, the bigger the current energy consumption amount, the current energy usage cost, the energy consumption amount for a predetermined time, and the energy usage cost for a predetermined time are, it may be set at the latter order. Alternatively, the operation order may be manually selected by a user, and a plurality of the same or other species components may be set at the same order.

In a case where high-cost information is recognized during the operation of a plurality of components, the operation of the component in the last order may be limited. Alternatively, the operation of a plurality of components in the latter orders (components in a plurality of orders) may be limited. And, if low-cost information is recognized in the state where the operation of components is limited, the components with their operations limited may be again operated. The reference for limitation on operation may be any one of the number of operable components and available total energy consumption amount or total energy usage cost. At this time, the limitation on operation of components may be immediately performed. Alternatively, in a case where the operation of a component consists of a number of processes, the operation of the component may be limited after one process is completed. Alternatively, the operation of the component may be limited after high-cost information is recognized and a predetermined time is passed. Alternatively, after a component whose operation is to be limited has consumed a predetermined amount of energy or the energy usage cost reaches a certain level, the operation of the component may be limited. Information notifying that the operation is limited may be displayed in the display unit of a component with its operation limited. Alternatively, information notifying that the operation is limited may be displayed in the display unit of other component which may control the component.

As another example, only when the time for recognition of high-cost information (e.g., on-peak time) exceeds a reference time, the control may be performed for reducing the energy which the component has used. Alternatively, high-cost information is recognized, and then the control is immediately performed for reducing energy, and when the time for performing the control has passed a predetermined time, whether the high-cost information may be recognized for maintenance or change of the current state may be again determined. This is intended to prevent the method of operating the component from being often changed.

Figure 4:
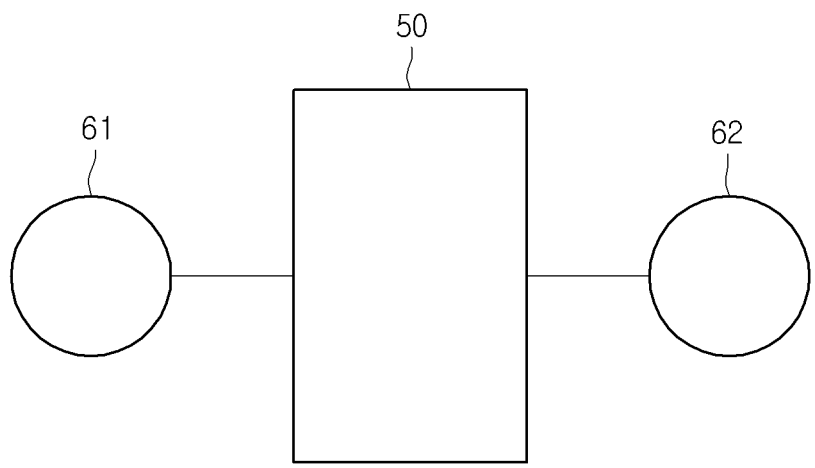
FIG. 4 is a view showing the communication structure of two components that constitute the network system according to a first embodiment.
Figure 5:
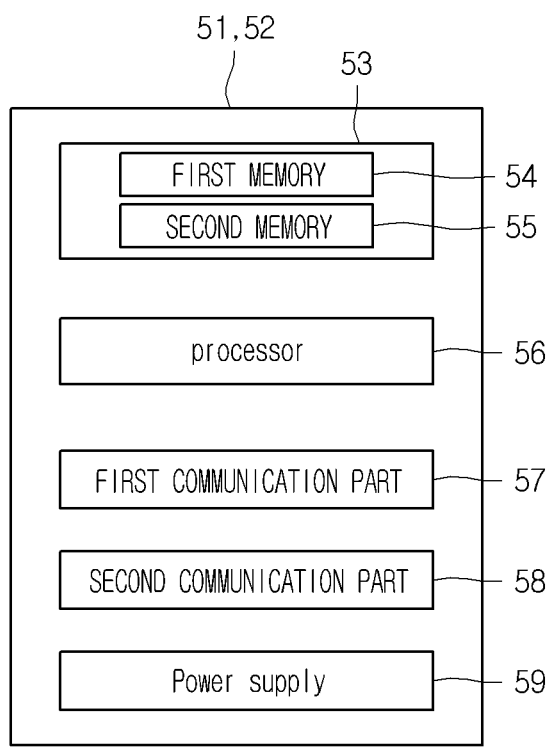
FIG. 5 is a block diagram showing the detailed configuration of a communication device that constitutes a communication unit.

FIG. 4 is a view showing the communication structure of two components that constitute the network system according. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

The first component 61 may be a component that constitutes the UAN 10 or a component that constitutes the HAN 20. The second component 62 may be a component that constitutes the UAN 10 or a component that constitutes the HAN 20. The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group. The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 57 for communication with the first component 61, a second communication part 58 for communication with the second component 62, a memory 53 for storing information received from the first component 61 and information received from the second component 62, a processor 56 for performing information processing, and a power supply 59 for supplying power to the communicator 51 and 52.

Specifically, the communication language (or scheme) of the first communication part 57 may be identical to or different from that of the second communication part 58.

Two kinds of information respectively received from the two components may be stored in the memory 53. The two kinds of information may be stored in a single sector or may be respectively stored in sectors. In any case, an area in which the information received from the first component 61 may be referred to as a first memory 54, and an area in which the information received from the second component 62 may be referred to as a second memory 55.

The processor 56 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 59 may receive electricity supplied from the components 61 and 62 or may receive electricity supplied from a separate power source. Alternatively, the power supply 59 may be a battery or the like.

Figure 6:
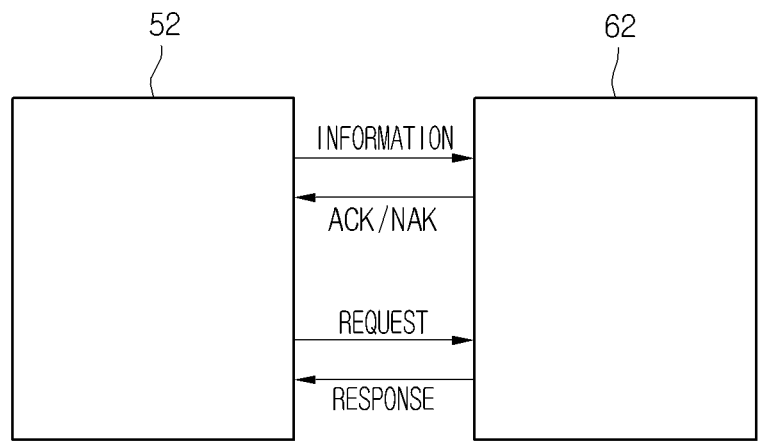
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator is stored in the memory 53. The second communicator 52 transmits a message to the second component 62 as a response for the message. In this instance, the message transmitted to the second component 62 relates to new information different from the information previously stored in the memory 53, or information generated in the processor 56.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 53 of the second communicator 52.

If the second communicator 52 receives a message for requesting the component information from the first communicator 51, it transmits the component information stored in the memory 53 to the first communicator 51 as a response for the message. Alternatively, the second communicator 52 transmits the component information stored in the memory 53 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 53. Hence, in a case where the second communicator 52 receives a message for requesting the component information from the first communicator 51, it transmits the component information stored in the memory 53 directly to the first communicator 51 without a request for information to the second component 62, and thus, the communication load of the second component 62 can be reduced. That is, the second component becomes a virtual component.

Figure 7:
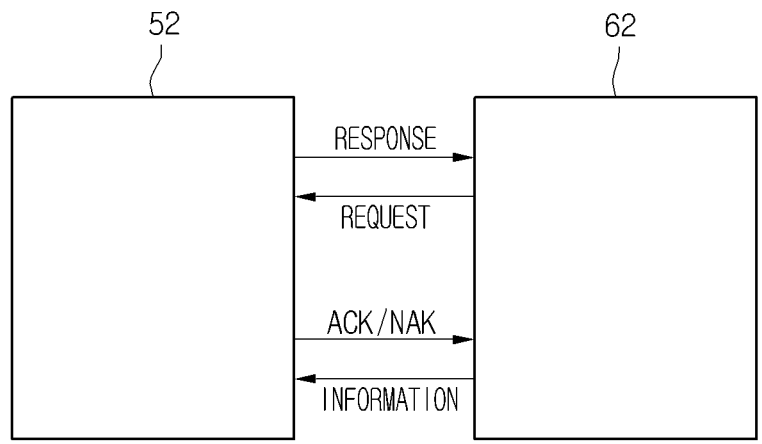
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 53, or information generated in the processor 56. Alternatively, the information transmitted to the second component 62 may be information received from the first component.

The second component 62 performs a function based on the received information or waits for performing the function. Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 53, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 53, to the first communicator 51 as a response for the message. Alternatively, the second communicator 52 the information of the second component 62, stored in the memory 53, to the first communicator 51 in real time or by periods.

The second communicator 52 stores the information of the second component 62 in the memory 53. Hence, in a case where the second communicator 52 receives the message for requesting the component information from the first communicator 51, it transmits the information stored in the memory 53 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted. Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10. In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like. In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components. An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component). In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
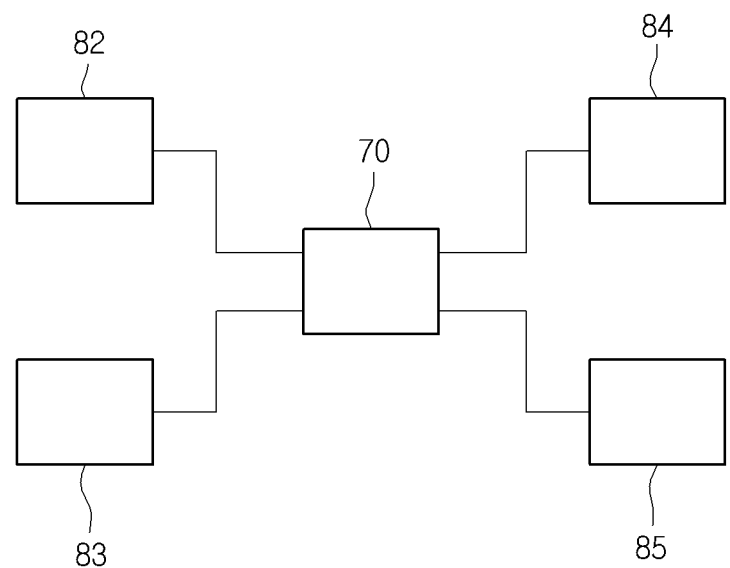
FIG. 8 is a view showing the communication structure of components that constitute the network system according to a third embodiment.
Figure 9:
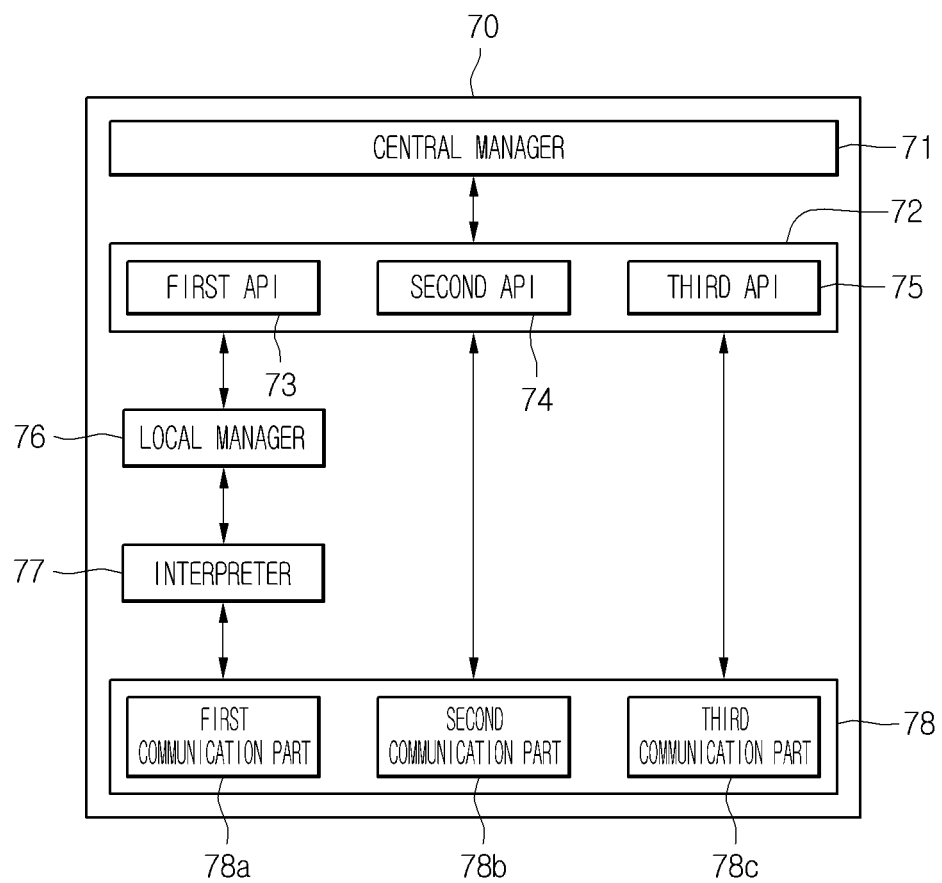
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted).

The first component 70 includes a communication unit 78 for performing communication with another component, a central manager 71 for managing the entire operation and/or information processing of the first component, and an application programming interface 72 (hereinafter, referred to as an "API") for performing an interface between the communication unit 78 and the central manager 71 (specifically, application software).

The communication unit 78 includes a first communication part 78a for performing communication with the second and third components 82 and 83, a second communication part 78b for performing communication with the fourth component 84, and a third communication part 78c for performing communication with the fifth component 85.

In this instance, the first and second communication parts 78a and 78b may use different communication protocols from each other. As an example, the first communication part 78a may use Zigbee and the second communication part 78b may use Wi-fi. In this embodiment, the kind of communication protocol or method used by the first and second communication parts 78a and 78b is not limited. The third communication component 78c may use Internet communication as an example.

The API 72 includes a first API 73, a second API 74 and a third API 75. The third API 75 is an interface between the central manager 71 and the third communication part 78c, and the first API 73 is an interface between the first communication part 78*a* and the central manager 71. The second API 74 is an interface between the second communication part 78*a* and the central manager 71.

The first component 70 further includes a local manager 76 and an interpreter 77. In a case where the information to be transmitted/received between the API 72 and the communication unit 78 is information related to operations of energy consumption components (electric home appliances), the local manager 76 outputs information corresponding to the respective energy consumption components. The interpreter 77 interprets information transmitted from the local manager 76 to the communication unit 78 or information received in the communication unit 78. The information outputted from the interpreter 77 is used to set or get values of information related to the respective energy consumption components.

The local manager 76 includes a memory (not shown) in which information related to one or more energy consumption components is stored. Alternatively, the local manager 76 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 72 to the local manager 76, information corresponding to a specific energy consumption component is outputted. In a case where a plurality of energy consumption components exist, information on the plurality of energy consumption components is outputted. The interpreter 77 interprets the information transmitted from the local manager 76 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 78*b*. The received energy information is transmitted to the central manager 71 through the second API 74. In the process of information transmission between the second API and the central manager 71, only a signal including the information is converted, and the content of the information is not converted.

Since the energy information is information related to the energy consumption reduction of the energy consumption components, the central manager 71 transmits information (second command) related to operations of the energy consumption components to the API 72. As an example, the central manager 71 transmits information necessary for turning off power of the washing machine or refrigerator. Then, the information is transmitted from the first API 73 to the local manager 76.

The local manager 76 transmits information (third command) for controlling the operation of each of the energy consumption components to the interpreter 77 based on the information transmitted from the first API 73. As an example, in a case where the information transmitted from the first API 73 is information having different kinds of energy consumption components as targets, the local manager 76 transmits information related to the control of each of the energy consumption components to the interpreter 77. In this case, since the local manager 76 receives the second command and outputs the third command, the information inputted to the local manager 76 is converted and outputted by the local manager 76.

Subsequently, the interpreter 77 interprets the information transmitted from the local manager 76 into a machine language (signal). Then, the converted signal is transmitted to the target energy consumption components (second and third components) through the first communication part 78*a*. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 78*a* is transmitted to the central manager 71 via the interpreter 77, the local manager and the first API 73. In such an information transmission process, the information related to the second and third components 82 and 83 is stored in the local manager 76. In this embodiment, since the information related to the energy consumption components is stored in the local manager, the local manager may be understood as a virtual energy consumption component (abstraction model).

The central manager 71 may transmit the received information to the second communication part 78*b* and/or the third communication part 78*c*.

The operation of the first component will be described. The information received through the communication unit 78 may be transmitted directly to the API 72, or may be converted (via the interpreter and the local manager) and then transmitted to the API 72, based on the kind of information (or the type of signal).

The information transmitted from the central manager 76 may be transmitted directly to the communication unit 78, or may be converted and then transmitted to the communication unit 78.

As another example, the interpreter may be included in the local manager 76, and the information received through the communication unit 78 is transmitted to the local manager 76. However, converted information may be outputted, or information may be outputted as it is without converting the information.

Meanwhile, in a case where the information transmitted to the API 72 through the second or third communication part 78*b* or 78*c* is information (raw data or refined data) related to time-based pricing, the central manager 71 determines the presence of on-peak time. In the case of the on-peak time, the central manager 71 may transmit the information (first command) for controlling the operations of the energy consumption components to the API 72. Then, the information is converted through the local manager 76, and the converted information (second command) is transmitted to the energy consumption components through the first communication part 78*a*. Alternatively, the central manager 71 may transmit the information related to the time-based pricing to the first communication part 78*a* through the second API 74 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
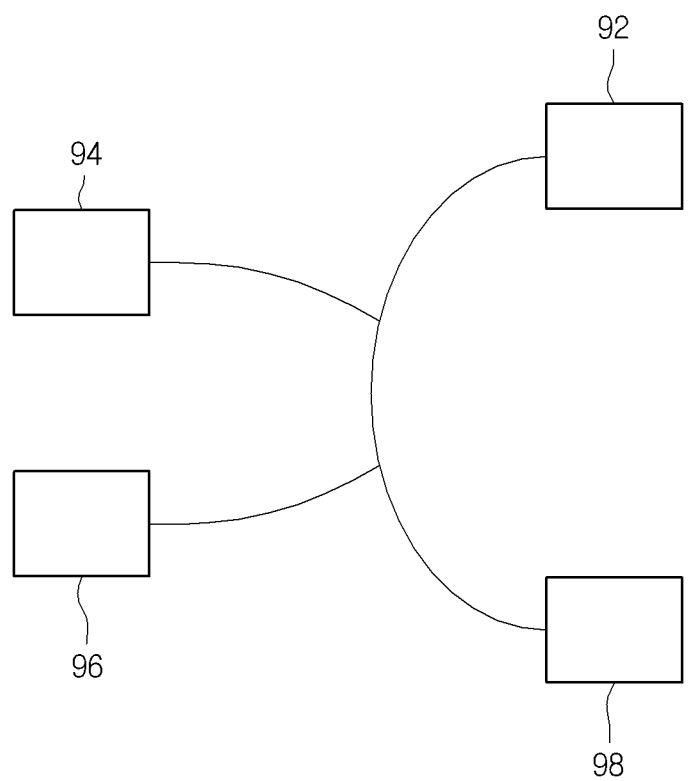
FIG. 10 is a view showing the communication structure of components that constitute the network system according to a fourth embodiment.
Figure 11:
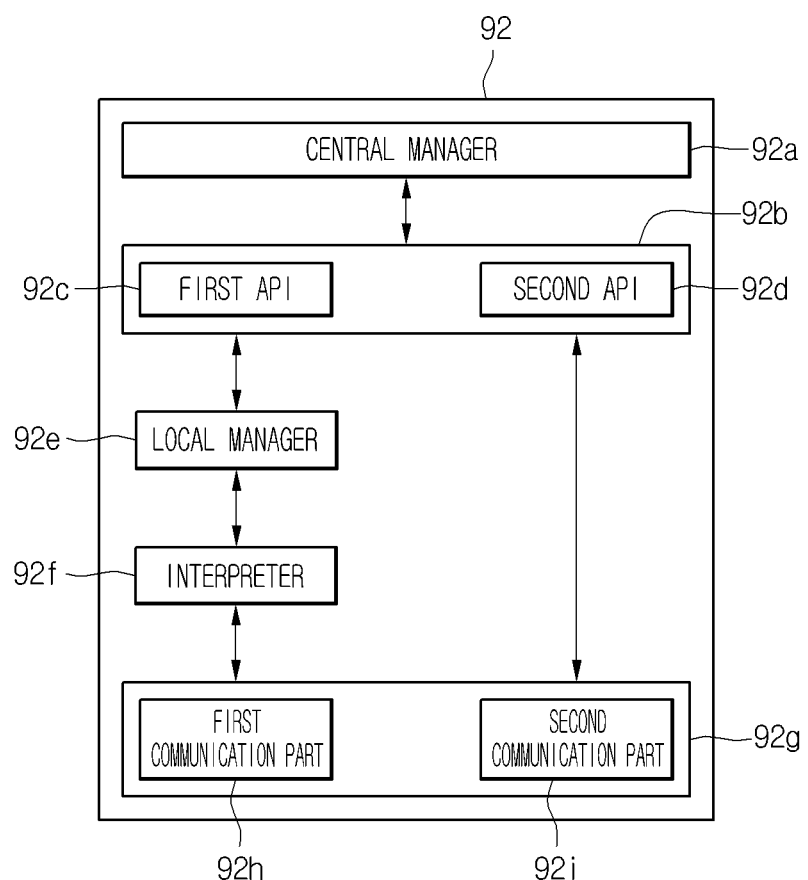
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 92*g* for performing communication with another component, a central manager 92*a* for managing the entire operation and/or information transmission/reception of the first component 92, and an application programming interface 92*b* (hereinafter, referred to as an "API") that serves as an interface between the communication unit 92*g* and the central manager 92*a* (specifically, application software).

The communication unit 92*g* may include a first communication component 92*h* for performing communication with the second to fourth components 94, 96 and 98, and a second communication component 92*i* for performing Internet communication.

The API 92*b* includes a first API 92*c* and a second API 92*d*. The second API 92*d* is an interface between the central manager 92*a* and the second communication part 92*i*, and the first API 92*b* is an interface between the first communication part 92*h* and the central manager 92*a*.

The first component 92 further includes a local manager 92*e* and an interpreter 92*f*. In a case where the information to be transmitted/received between the API 92*c* and the communication unit 92*g* is information related to operations of energy consumption components (electric home appliances), the local manager 92*e* outputs information corresponding to the respective energy consumption components. The interpreter 92*f* interprets information transmitted from the local manager 92*e* to the communication unit 92*g* or information received in the communication unit 92*g*.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 92*h*. Alternatively, the first component 92 may receive energy information from an external component connected to Internet through the second communication part 92*i*.

The received energy information is transmitted directly to the first or second API 92*c* or 92*d* and then transmitted to the central manager 92*a*. Since the energy information is information related to the energy consumption reduction of the energy consumption components, the central manager 92*a* transmits information related to the operations of the energy consumption components to the first API 92*c*. As an example, the central manager 92*a* transmits information necessary for turning off power of a washing machine or refrigerator. Then, the information is transmitted from the first API 92*c* to the local manager 92*e*.

The local manager 92*e* transmits information for controlling the operation of each of the energy consumption components to the interpreter 92*f* based on the information transmitted from the first API 92*c*. As an example, in a case where the information transmitted from the first API is information related to different kinds of energy consumption components, the local manager 92*e* transmits information related to the control of each of the energy consumption components to the interpreter 92*f*.

Subsequently, the interpreter 92*f* interprets the information transmitted from the local manager 92*f* into a machine language (signal). Then, the interpreted signal is transmitted to the energy consumption components through the first communication part 92*h*. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 92*h* is transmitted to the central manager 92*a* via the interpreter 92*f*, the local manager 92*e* and the first API 92*c*. In such an information transmission process, the information related to the first and second components is stored in the local manager 92*e*.

The central manager 92*a* may transmit the received information to the first communication part 92*h*. Then, the information of the second and third components 94 and 96 is transmitted to the fourth component 98.

The operation of the first component will be described. The information received through the communication unit 92*g* may be transmitted directly to the API 92*b*, or may be converted (via the interpreter and the local manager) and then transmitted to the API 92*b*, based on the kind of information (or the type of signal).

On the contrary, the information transmitted from the central manager 92*a* may be transmitted directly to the communication unit 92*g*, or may be converted and then transmitted to the communication unit 92*g*.

Meanwhile, in a case where the information transmitted to the API 92*b* through the second communication part 92*i* is information related to time-based pricing, the central manager 92*a* determines the presence of on-peak time. In the case of the on-peak time, the central manager 92*a* may transmit the information for controlling the operations of the energy consumption components to the API 92*b*. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like. As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
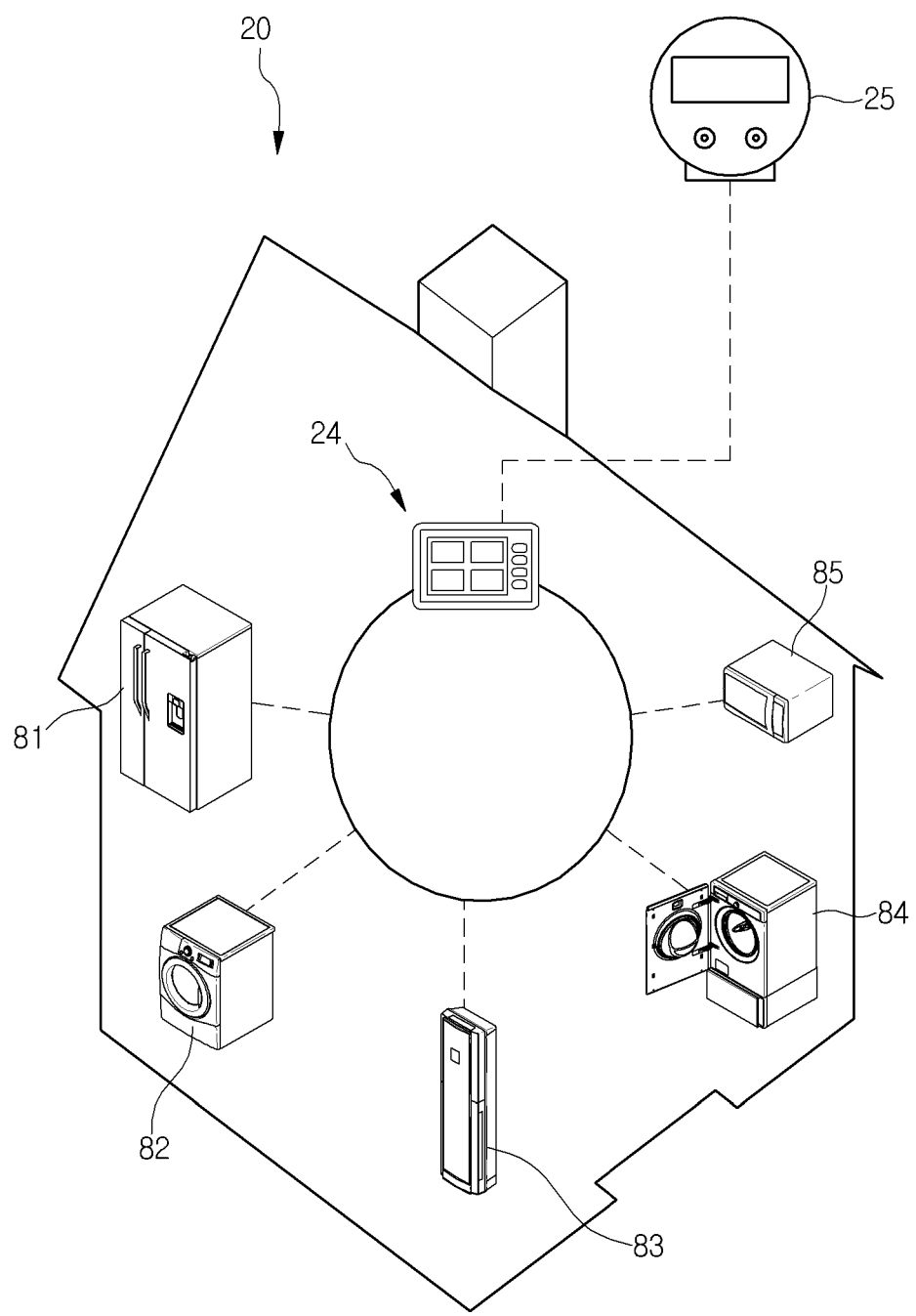
FIG. 12 is schematic view of a home area network (HAN) according to an embodiment.

FIG. 12 is schematic view of a home area network (HAN) according to an embodiment.

Referring to FIG. 12, a HAN 20 according to an embodiment includes an energy metering component 25 for metering a power and/or electricity charge supplied from an utility area network 10 into each residential customer in real time, for example, a smart meter, and an energy management component 24 connected to the energy metering component 25 and electric products to control their operations.

An electricity charge of each hole may be billed on a per time basis. The electricity charge per time may be expensive at a time period in which power consumption is significantly increased. Also, the electricity charge per time may be inexpensive at a time period such as during the middle of night at which the power consumption is relatively low.

The energy management component 24 may be connected to electric products of an energy consumption component 26 such as a refrigerator 81, a washing machine 82, an air-conditioner 83, a drying machine 84, and a cooking machine 85 through an in-house network to two-way communicate with each other.

The communication in the residential customer may be performed through a wireless manner such as Zigbee or wifi or a wired manner such as power line communication (PLC). One electric home appliance may be connected to the other electric home appliance to communicate with each other.

Figure 13:
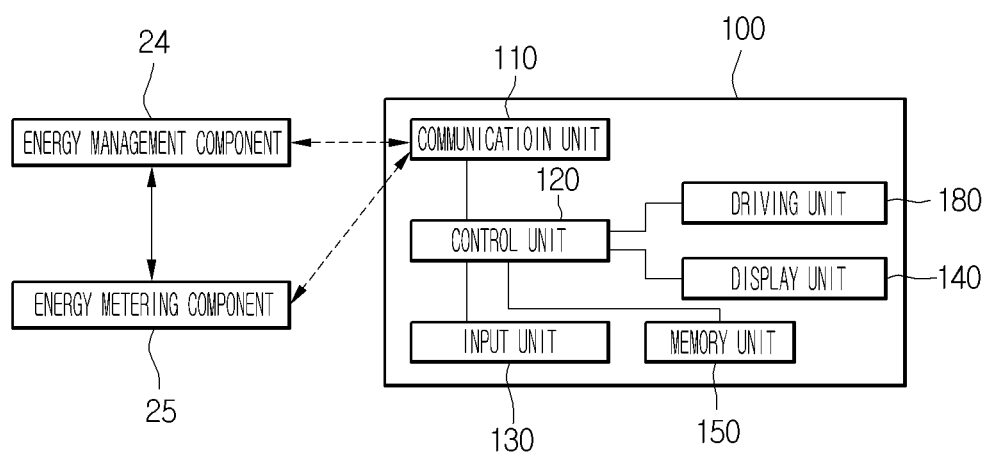
FIG. 13 is a block diagram of a network system including an energy consumption component according to an embodiment.

FIG. 13 is a block diagram of a network system including an energy consumption component according to an embodiment.

Referring to FIG. 13, a network system including an energy consumption component 100 according an embodiment includes an energy metering component 25 for recognizing energy information or additional information except the energy information, an energy management component 24 for managing (controlling) an operation of an energy consumption component 100 according to the energy information or the additional information, and a communication component 110 communicating with the energy management component 24 and the energy metering component 25.

The energy metering component 25 and the energy management component 24 may connected to each other to communicate with each other. Also, the communication component 110 may be provided in the energy consumption component 100. Alternatively, the communication component 110 may be connected to the energy consumption component 100.

The energy consumption component 100 includes an input unit 130 for inputting a predetermined command to allow a user to operate the energy consumption component 100, a memory unit 150 for storing predetermined information according to the command inputted through the input unit 130, a display unit 140 for displaying the operation state of the energy consumption component 100 or the predetermined information, and a control unit 120 for controlling the above-described units.

In detail, the energy consumption component 100 may be defined as a component (one electric product), which is operable in a predetermined pattern or manner (course) according to the inputted command.

The input unit 130 may include a plurality of input units, which may perform the pattern (operation manner). For example, the input unit 130 may include input units, which separately input commands of A, B, C, and D with respect to the energy consumption component which performs a course of A, B, C, and C. On the other hand, the input unit 130 may include a separate input unit for selecting a standardized (preset) course of A+B+C+D. A manner or kind inputted through the input unit 130 is not limited.

The memory component 150 may store component information of a course performed by the energy consumption component 100 or operation information of the energy consumption component corresponding to the course component.

The display unit 140 may display a kind of course which is being performed at the moment, a kind of course component constituting the course, the course component or remaining time information of the course to be performed.

The energy consumption component 100 includes a driving unit 180 operated for performing the course of the energy consumption component 100. For example, the driving unit 180 may be one of a motor, a pump, a compressor, a fan, a driving component similar to these and the like, which may be disposed within electric products. The operation of the course component may be performed by operating the driving unit 200.

Figure 14:
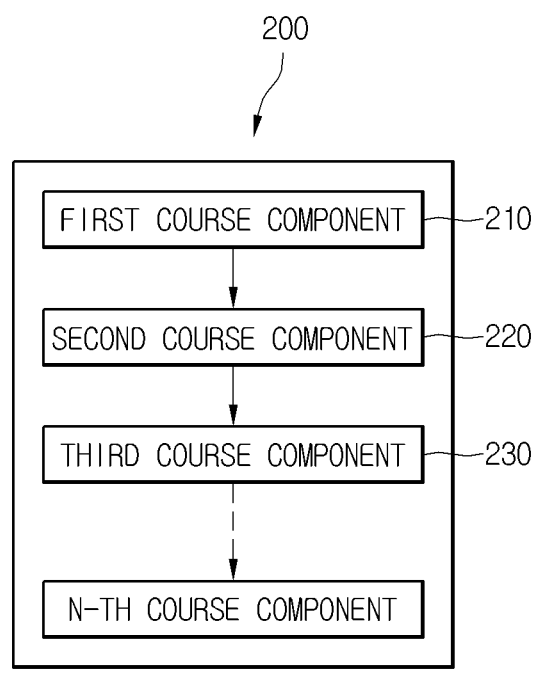
FIG. 14 is a block diagram illustrating a configuration of an operation course of an energy consumption component according to an embodiment.
Figure 15:
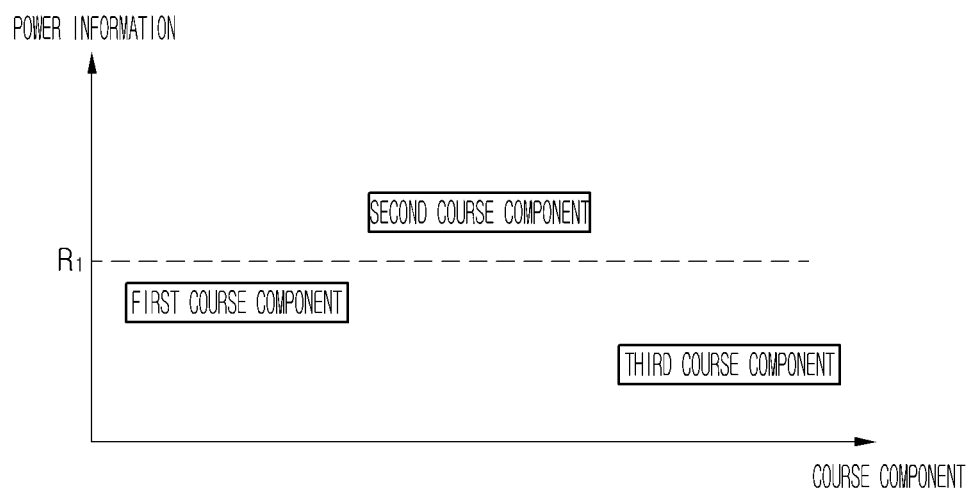
FIG. 15 is a graph illustrating a classified state of the course component according to an embodiment.

FIG. 14 is a block diagram illustrating a configuration of an operation course of an energy consumption component according to an embodiment, and FIG. 15 is a graph illustrating a classified state of the course component according to an embodiment.

Referring to FIGS. 14 and 15, an operation course 200 performed by the energy consumption component 100 according to an embodiment may include a first course component 210, a second course component 220, and a third course component 230.

The operation course 200 may include more course components (n-th course component) according to an operation characteristic of the energy consumption component 100. On the other hand, the second course component 220 and the third course component 230 may be omitted. In summary, the operation course 200 includes at least one course component.

The operation course 200 may be understood as an operation pattern (manner) operated for performing a function of the energy consumption component 100 and having a preset time period. Alternatively, the operation course 200 may be understood as a process period repeated with a predetermined cycle.

The course component may be one component constituting the operation course 200. That is, one or more course components may be coupled to each other to complete the operation course 200. The plurality of course components may be successively or simultaneously performed.

For example, the energy consumption component 100 may be a washing machine. The operation course 200 may be one of a standard course, a wool course, a comforter course, a baby cloth course, and a course similar to these according to a kind of laundry. Also, the operation course 200 may be one of a cold water washing course, a warm water washing course, a boiling washing course, and a course similar to these according to washing methods.

Each of the courses may include a soaking, washing, rinsing, dehydrating, or drying processes, which constitutes an operation of the respective courses. Each of the processes may be understood as a course component and successively performed according to a lapse of time. The soaking, washing, rinsing, dehydrating, or drying process may be changed in performed time or number according to kinds of the operation course 200. Their information may be previously stored in the memory unit 150.

For another example, the energy consumption component 100 may be a dishwasher. The operation course 200 may be one of a standard course, a soaking course, a powerful course, a delicate course, or a course similar to these. Each of the courses may include a washing, rinsing, heating, or drying process, which constitutes an operation of the respective courses. Each of the processes may be understood as a course component and successively performed according to a lapse of time. The washing, rinsing, heating, or drying process may be changed in performed time or number according to kinds of the operation course 200. Their information may be previously stored in the memory unit 150.

For another example, the energy consumption component 100 may be a refrigerator. The operation course 200 may be one of a normal cooling course, a quick freezing course, or a course similar to these. Each of the courses may include an operation of a compressor or a blow fan or an opening/closing operation of a damper for discharging cool air. Each of the operation may be understood as a course component. The operations may be performed successively or simultaneously performed according the selection of the operation course 200.

The compressor, the blow fan, or the damper may be changed in performed time or number according to kinds of the operation course 200, and their information may be previously stored in the memory unit 150.

In addition, the energy consumption component 100 may be a drying machine, a cooking machine, a water purifier, or an air-conditioner. Here, the operation course 200 to be performed based on a function of the energy consumption component 100 may be stored in the memory unit 150. Also, the operation course 200 may include at least one course component constituting the operation course 200.

The plurality of course components may have different power consumption amounts according to one component of the operated energy consumption component 100. For example, in the washing machine, the driving process in which a heater should be operated may have a relatively high power consumption amount than that of the rinsing or dehydrating process.

Referring to FIG. 15, the plurality of course components may include a second course component 220 having a value greater than that of a preset power information R1 and first and third course components 210 and 230 each having a value less than that of the preset power information R1. However, the graph shown in FIG. 15 is illustrated merely as an example. Thus, more course components may be classified based on the R1 according to an operation characteristic of the energy consumption component 100.

The power information may be a power consumption amount or power consumption of the one component. The power information of each of the course components and the preset power information value R1 may be previously stored in the memory unit 150.

When a power reduction operation or energy saving operation of the energy consumption component 100 is required according to information (energy information or additional information) transmitted from the energy management component 24 or the energy metering component 25, an operation of the course component having the value greater than that of the preset power information R1, i.e., the second course component 220 may be controlled corresponding to the transmitted information. Descriptions with respect to the control operation will be described below.

Figure 16:
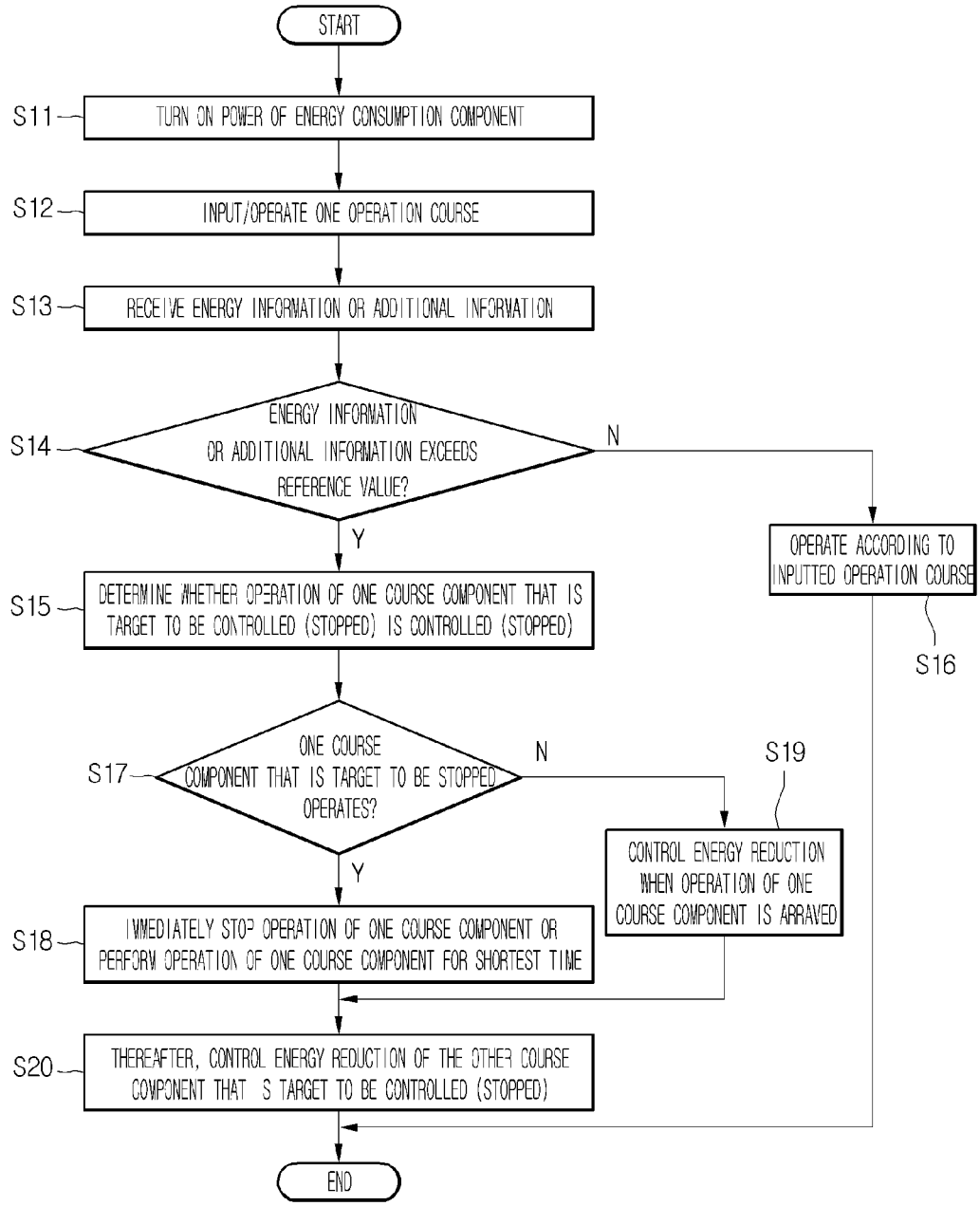
FIG. 16 is a flowchart illustrating a method of controlling a network system according to an embodiment.

FIG. 16 is a flowchart illustrating a method of controlling a network system according to an embodiment. A method of controlling a network system according to an embodiment will be described with reference to FIG. 16.

First, a power of an energy consumption component 100 may be turned on, and one operation course 200 may be inputted to perform an operation of the energy consumption component 100. Then, the energy consumption component 100 may be operated according to the inputted operation course. Here, in operations S11 and S12, to a driving unit 180 may be operated to perform the operation course 200.

In operation S13, information, i.e., energy information or additional information may be transmitted from the energy management component 24 or the energy metering component 25 during the operation of the energy consumption component 100. In operation S14, whether the energy information or the additional information exceeds a preset reference value may be determined.

For example, when the information is information related to energy charge information, the reference value may be a mean value of power information, a mean value of a maximal value and a minimal value in a predetermined period, or a reference variation of the power information. When the energy charge information exceeds the reference value, the energy charge information may be recognized as an on-peak time period.

When the energy charge information may be recognized as the on-peak time period, whether the operation of the one course component that is set to a target to be controlled (stopped) is controlled (stopped) may be determined. Here, in operation S15, the one course component that is set to the target to be controlled may be the second course component 220 having a value greater than that of the preset power information value R1.

On the other hand, when the energy charge information is not recognized as the on-peak time period, the energy consumption component 100 may be operated according to the inputted operation course 200 in operation S16. In operation S17, whether the one course component that is the target to be controlled (stopped) is operated at the moment may be determined.

When the one course component is operated at the moment, the operation of the one course component may be immediately stopped or stopped after the operation thereof is completely performed for the shortest time. Here, the shortest time may be a preset time in consideration of a remaining time for the operation of the one course component. In operation S18, the shortest time may be tabled and stored in the memory unit 150.

In case where the one course component is not operated at the moment, when the operation of the one course component is arrived, the operation of the one course component may be controlled to reduce energy.

Here, the method of controlling the one course component may include skipping of the operation of the one course component and stopping of the operation of the one course component after the one course component is operated for a preset time (the shortest time). That is, in operation S19, the operation for controlling the one course component may be understood as an "operation limitation".

After the operation of the one course component is controlled, when the other course component that is a target to be controlled (stopped) is arrived, an operation of the other course component may be controlled to reduce energy.

In operation S20, a method of controlling the other course component may include skipping of the operation of the other course component and stopping of the operation of the other course component after the other course component is operated for a preset time (the shortest time). As described above, when an on-peak time period is arrived, an operation of a course component having a relatively large power consumption may be limited to reduce the energy charge.

Another embodiment is proposed.

"The operation limitation method" of the course component may further include an output reduction or operation time period shift method.

In detail, an operation output of the course component may be reduced with respect to the output reduction. For example, the whole output of the course component may be decreased by a predetermined rate, or an output of a portion of units (heater or motors) driven to operate the course component may be decreased by a predetermined rate.

An operation time of the course component may previously make an early or be delayed the respect to the operation time period shift. For example, the operation of the course component may be previously delayed before or after the high cost time period to avoid the high cost time period. Due to the above-described operation limitation method, the energy charge or usage amount of the electric products may be reduced.

Figure 17:
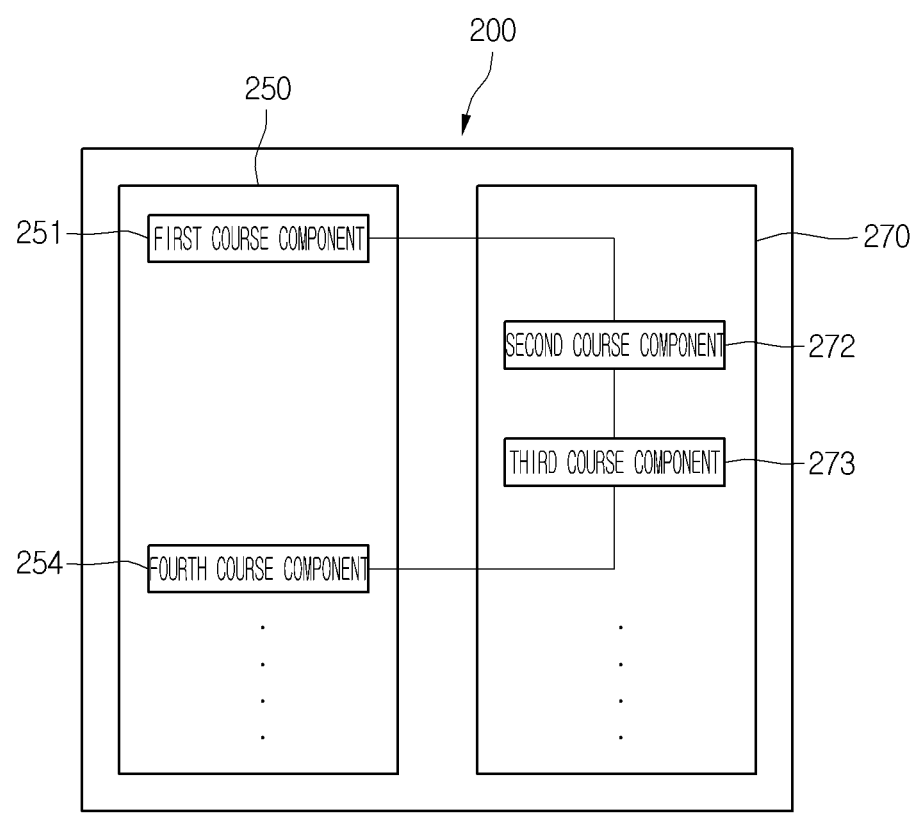
FIG. 17 is a block diagram illustrating a configuration of an operation course of an energy consumption component according to another embodiment.
Figure 18:
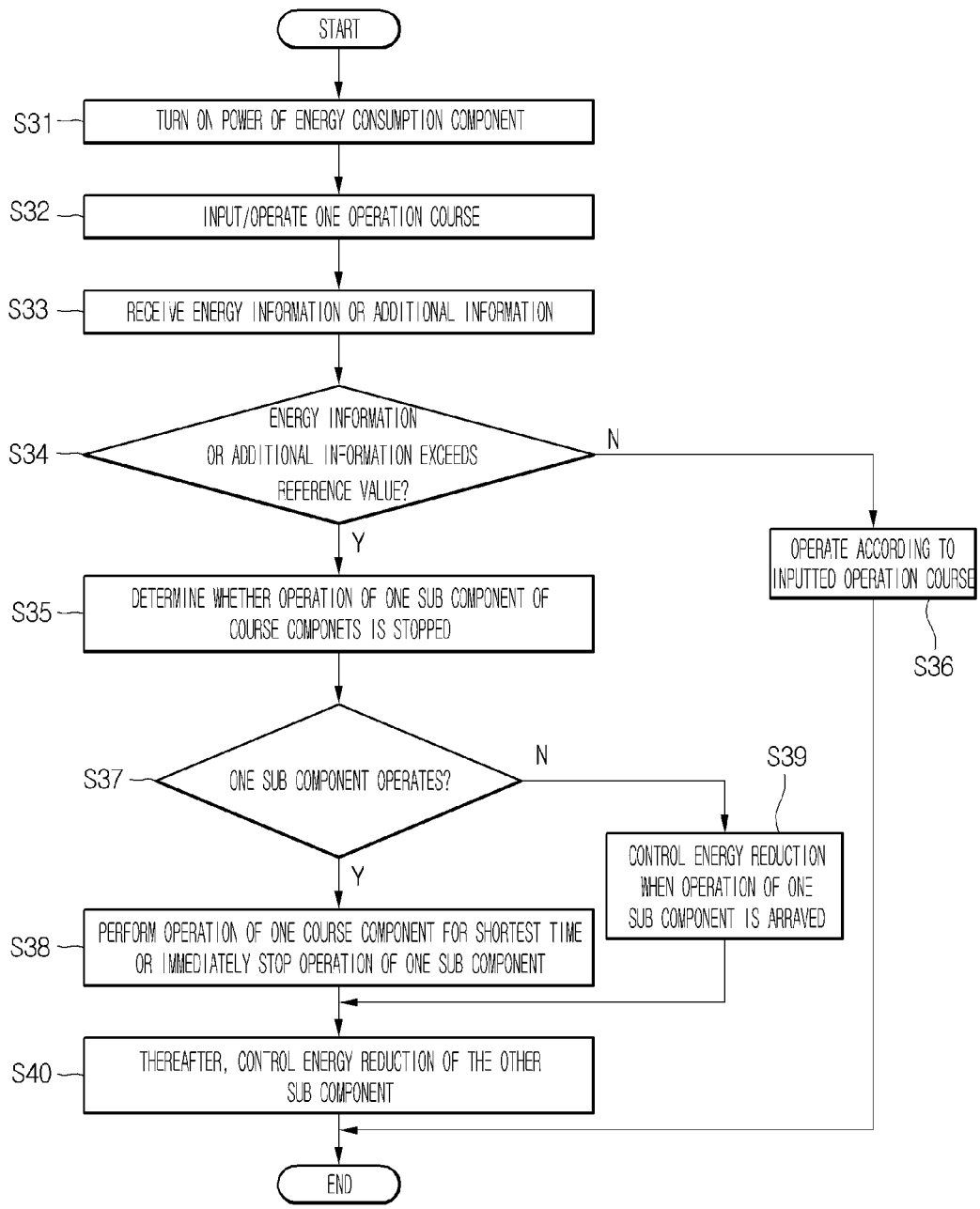
FIG. 18 is a flowchart illustrating a method of controlling a network system according to another embodiment.

FIG. 17 is a block diagram illustrating a configuration of an operation course of an energy consumption component according to another embodiment. FIG. 18 is a flowchart illustrating a method of controlling a network system according to another embodiment.

Referring to FIGS. 17 and 18, an operation course 200 of an energy consumption component 100 according to another embodiment includes a plurality of course components constituting the operation course 200.

The plurality of course components include a main component 250 that is an essential component for performing a function of the energy consumption component 100 and a sub component 270 which does not directly relate to the function of the energy consumption component 100.

For example, the main component 250 may include a first course component 251 and a fourth course component 254 of the plurality of course components. Also, the sub component 270 may include a second course component 272 and a third course component 273.

For example, when the energy consumption component 100 is a washing machine, the main component 250 may a washing process, a rinsing process or a dehydrating process. The sub component 270 may include a displaying (image or voice) process of an operation state and a brightness adjusting process of the display unit 140.

That is, the sub component 270 may be defined as a component in which skipping or minimal operation is possible or a component in which the function of the energy consumption component 100 is possible even though the skipping (minimal operation) is performed during the process in which the function of the energy consumption component 100 is performed.

However, the block diagram shown in FIG. 17 is illustrated merely as an example. Thus, the configurations of the main component 250 and the sub component 270 may be different from those of FIG. 17 according to the function of the energy consumption component 100 and the configuration of the operation course 200.

When a power reduction operation or energy saving operation of the energy consumption component 100 is required according to information (energy information or additional information) transmitted from the energy management component 24 or the energy metering component 25, an operation of the sub component 270 may be controlled corresponding to the transmitted information. Descriptions with respect to the control operation will be described below.

Referring to FIG. 18, a method of controlling a network system according to another embodiment.

First, a power of an energy consumption component 100 may be turned on, and one operation course 200 may be inputted to perform an operation of the energy consumption component 100. Then, the energy consumption component 100 may be operated according to the inputted operation course. Here, in operations S31 and S32, to a driving unit 180 may be operated to perform the operation course 200.

In operation S33, information, i.e., energy information or additional information may be transmitted from the energy management component 24 or the energy metering component 25 during the operation of the energy consumption component 100. In operation S34, whether the energy information or the additional information exceeds a preset reference value may be determined.

For example, in a case where the information is information related to energy charge information, the energy charge information may be recognized as an on-peak time period when the energy charge information exceeds the reference value. As described above, the reference value may be a preset value. When the energy charge information is recognized as the on-peak time period, when an operation of one sub component of the plurality of course components is controlled (stopped) may be determined in operation S35.

On the other hand, when the energy charge information is not recognized as the on-peak time period, the energy consumption component 100 may be operated according to the inputted operation course 200 in operation S36. In operation S37, whether the one sub component is operated at the moment may be determined.

When the one sub component is operated at the moment, the operation of the one sub component may be immediately stopped or stopped after the operation thereof is performed for the shortest time. Here, the shortest time may be a preset time in consideration of a remaining time for the operation of the one sub component. In operation S18, the shortest time may be tabled and stored in the memory unit 150.

In case where the one sub component is not operated at the moment, when the operation of the one sub component is arrived, the operation of the one sub component may be controlled to reduce energy. Here, the method of controlling the one sub component may include skipping of the operation of the one sub component and stopping of the operation of the one sub component after the one course component is operated for a preset time (the shortest time). That is, in operation S39, the operation for controlling the one sub component may be understood as an "operation limitation".

After the operation of the one sub component is controlled, when the other sub component that is a target to be controlled (stopped) is arrived, an operation of the other sub component may be controlled to reduce energy.

In operation S40, a method of controlling the other sub component may include skipping of the operation of the other sub component and stopping of the operation of the other sub component after the other sub component is operated for a preset time (the shortest time). As described above, when an on-peak time period is arrived, an operation of a sub component having a relatively large power consumption may be limited to reduce the energy charge.

The other embodiment is proposed.

An input unit 130 may include an input part for selecting a power saving (energy save) course. The power saving course may be understood as that course components for reducing a power consumption amount or an energy charge are previously associated with each other. Thus, when the power saving course is selected, an operation course in which the power consumption amount or the energy charge is reduced may be performed regardless of reception of energy information (or additional information).

Also, when selectable options for performing functions of an energy consumption component exist in a state where the power saving course is selected, a maximum value of the options may be limited. For example, when the energy consumption component is a washing machine, in case where the selectable options include a heating time and the number of rinsing process, the heating time may be limited to maximally 5 minutes, and the number of rinsing process may be limited to maximally 3 times.

When the energy consumption component is operated according to the inputted operation course and then the energy information (or the additional information) is received, the power saving course may be automatically performed.

Figure 19:
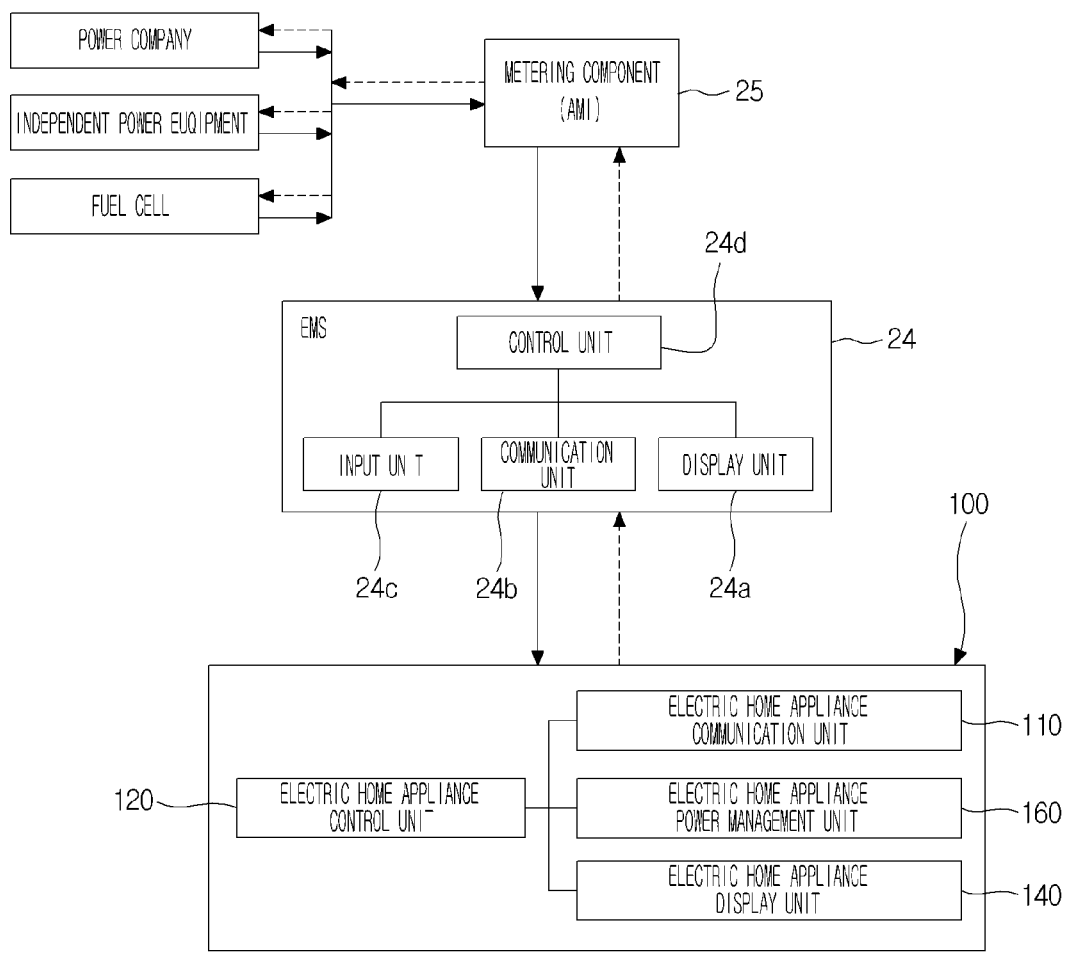
FIG. 19 is a view illustrating a control structure of an electric home appliance according to an embodiment.
Figure 20:
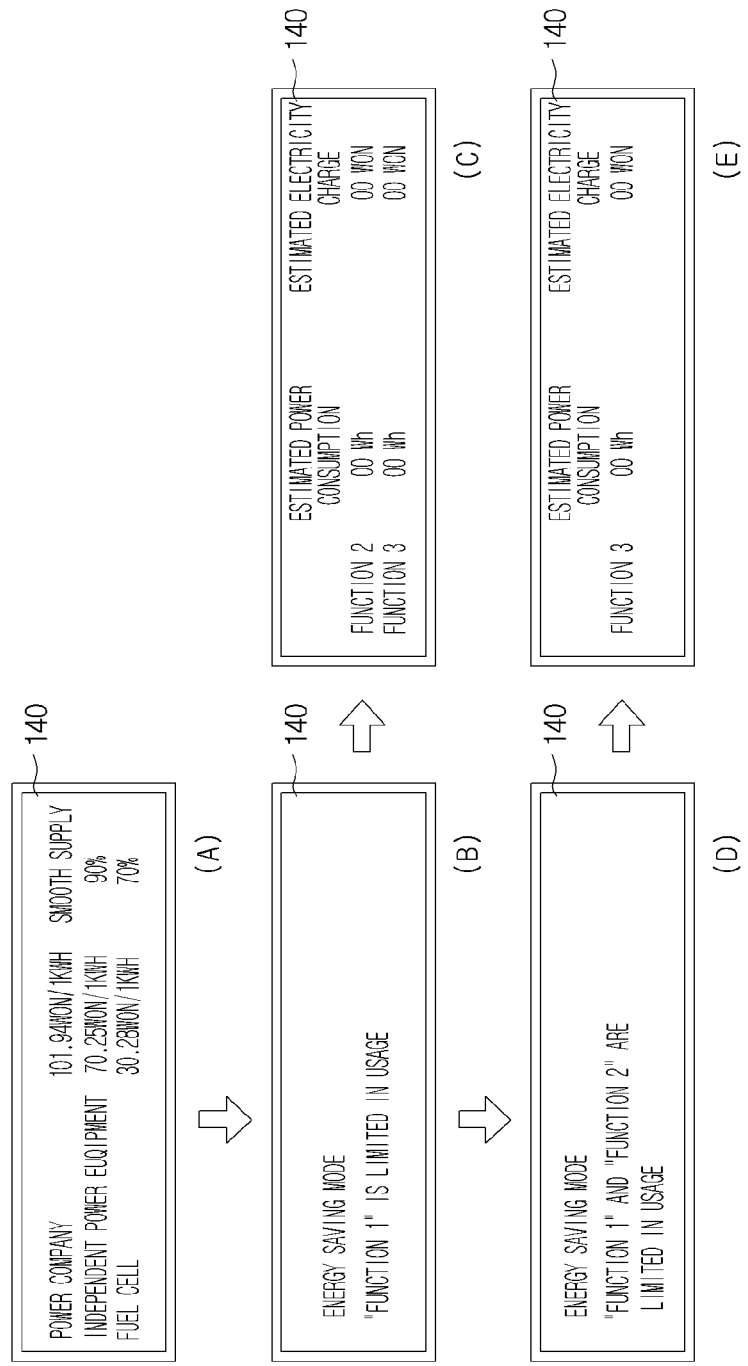
FIG. 20 is a view illustrating information displayed through a display unit of the electric home appliance according to an embodiment.

FIG. 19 is a view illustrating a control structure of an electric home appliance according to an embodiment, and FIG. 20 is a view illustrating information displayed through a display unit of the electric home appliance according to an embodiment.

Referring to FIGS. 19 and 20, an electric home appliance 1 according to an embodiment includes an electric appliance communication component 100 connected to communicate with a power management network including a metering component 25 and an energy management component 24 to receive power supply information.

The electric home appliance communication component 100 is configured to receive the power supply information provided through a communication unit 24b of the energy management component 24 to display corresponding information on a display unit 140 (that will be described below) of the electric home appliance. Here, the electric home appliance communication component 100 may be connected to the communication unit 24b of the energy management component 24 in a PLC manner.

For this, a plug including a communication module is disposed on the electric home appliance 100 and connected to the power management network. When the plug is connected to the power management network, a plurality of information related to a power supply source, which are transmitted through the energy management component 24 are displayed on the electric home appliance display unit 140. Also, a standby power for operation standby of the electric home appliance 100 is supplied through one of a plurality of power sources.

Also, when the plug is connected to the power management network as described above, a power supplied from the power supply source is transmitted into an electric home appliance power management unit 160 to control the electric home appliance power management unit 160 so that the standby power is supplied.

That is, the electric home appliance power management unit 160 is a component for controlling a power to be used in the electric home appliance 100 connected to the power management network. Also, in the electric home appliance power management unit 160, a power supply mode may be varied from a normal mode to an energy saving mode by a user confirming the power supply information displayed on the electric home appliance display unit 140. For this, a power mode selection button (see reference numeral 350 of FIG. 21) for selecting a power mode is disposed on the electric home appliance 100.

The electric home appliance power management unit 160 includes a first power supply circuit for supplying a power into the electric home appliance 100 in a standby mode, a second power supply circuit for supplying a power so that the electric home appliance 100 uses the whole functions of the electric home appliance 100, and a third power supply circuit for supplying a power so that a portion of the functions of the electric home appliance 100 is limited.

The power supply circuits classified as described above may be selected by confirming the information displayed on the electric home appliance display unit 140 according to a function and run time desired by a user.

In detail, when the plug is initially connected to the power management network, the power supply circuit of the electric home appliance power management unit 160 is controlled through an electric home appliance control unit 120 to supply a power in the standby mode.

The electric home appliance display unit 140 receives the power supply information received through the electric home appliance communication component 110 from the plurality of power supply sources to display the information so that the information is compared and confirmed as shown in FIG. 20A.

When the user confirming the power supply information compared to each other and illustrated as the above-described manipulates a power mode selection button 350 to select the power supplied into the electric home appliance 100 in the energy saving mode, a function which requires a relatively high output is firstly limited in usage through the electric home appliance power management unit 160.

The limited function is displayed in a character form on the electric home appliance display unit 140 as shown in FIG. 20B. Also, after a predetermined time elapses, as shown in FIG. 20C, available functions and estimated power consumption and estimated electricity charge according to the performance of the available functions are displayed on the electric home appliance display unit 140.

Here, a time variable as shown in FIGS. 20B and 20C may be set to the electric home appliance control unit 120. Also, the estimated power consumption and estimated electricity charge may be calculated based on a unit time. When the energy saving mode is performed to reduce a supply amount of the used power, a function which requires the highest output among the functions expect the function limited in usage may be additionally limited.

That is, as shown in FIG. 20D, when one or more functions are limited, the limited functions are displayed through the electric home appliance display unit 140. Then, after a predetermined time elapses, available functions and estimated power consumption and electricity charge per a unit time are displayed through the electric home appliance display unit 140.

For more detailed descriptions, a vacuum cleaner as the electric home appliance 100 will now be described.

Figure 21:
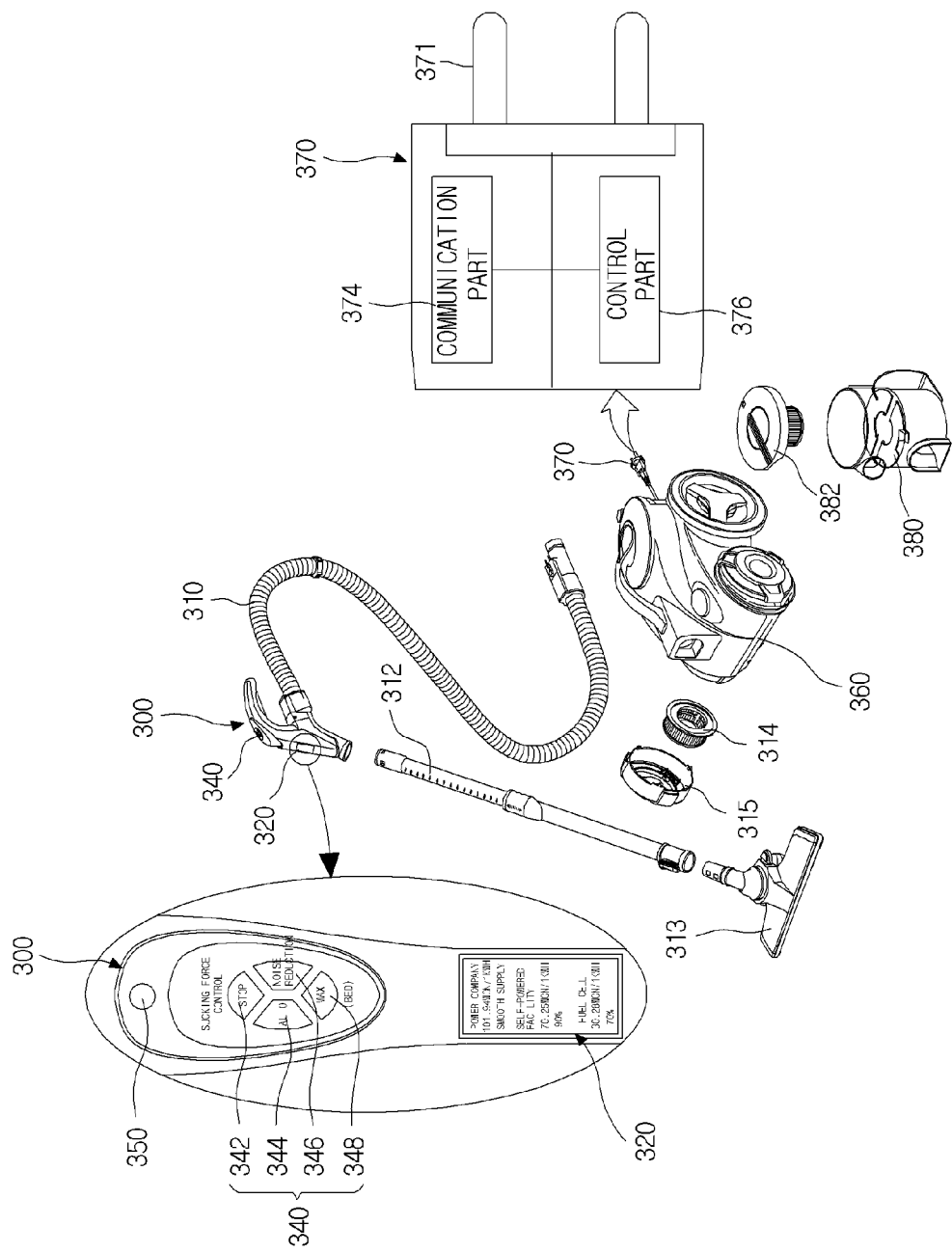
FIG. 21 is a schematic view illustrating a vacuum cleaner as an electric home appliance according to an embodiment.
Figure 22:
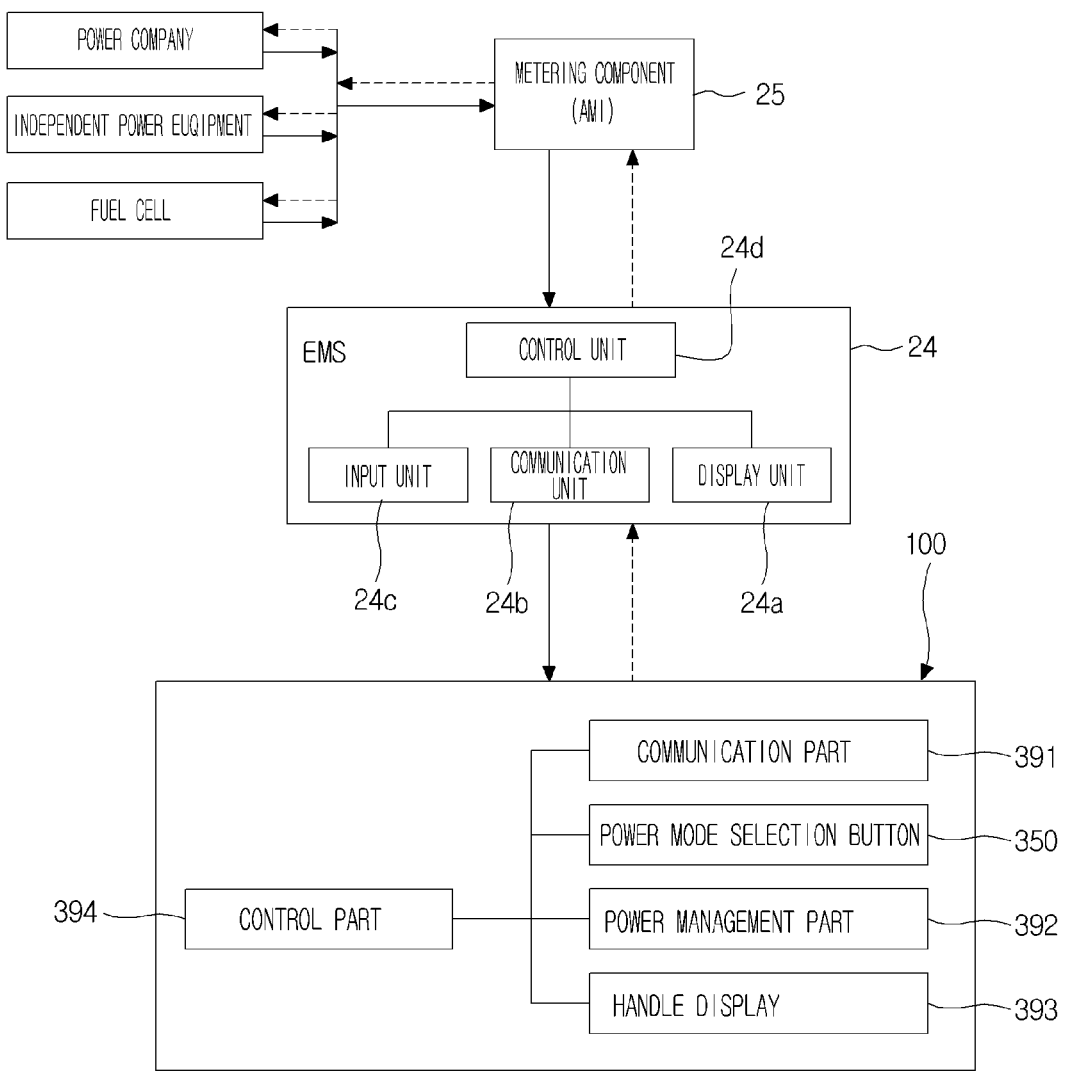
FIG. 22 is a block diagram illustrating a control structure of the vacuum cleaner of FIG. 21.

FIG. 21 is a schematic view illustrating a vacuum cleaner as an electric home appliance according to an embodiment. FIG. 22 is a block diagram illustrating a control structure of the vacuum cleaner of FIG. 21.

Referring to FIGS. 21 and 22, a vacuum cleaner according to an embodiment includes a nozzle 313 sucking air including dust, a handle 300 for a user to operate the vacuum cleaner, an extension pipe 312 connecting the nozzle 313 to the handle 300, and a connecting hose 310 connecting the nozzle 313 to a main body 360 and guiding sucked air and dust to the main body 360.

The handle 300 may include a manipulation buttons 340 that are held by a user to adjust sucking force, and a handle display 320 that displays functions for limiting or allowing an operation of the vacuum cleaner (also denoted by 100).

The manipulation buttons 340 include a stop button 342 for stopping the vacuum cleaner 100, a noise reduction button 346 for silently performing a cleaning operation at low power, an automatic button 344 used for a normal cleaning operation, and a maximum button 348 for outputting great sucking force.

When the nozzle 313 is removed and a bedclothes cleaning nozzle is attached for cleaning bedclothes, the maximum button 348 may be pressed to operate the bedclothes cleaning nozzle. The handle display 320 will be described later in more detail. The main body 360 includes a suction part for sucking air and a foreign substance. The connection hose 310 is coupled to the suction part.

A dust container 380, which removes a foreign substance from air introduced through the suction part and stores it, is removably attached to the main body 360. Dust collected in the dust container 380 can be dumped out by removing a dust container cover 382 covering the upper portion of the dust container 380.

The main body 360 includes: an exhaust filter 314 that removes fine dust from air after normal dust is removed; and a filter cover 315 fixing the exhaust filter 314.

The vacuum cleaner includes a cleaner plug 370 connected to the power management network to transmit operation power to the main body 360 and perform two-way communication.

To this end, the cleaner plug 370 includes a coupling part 371 fitted in a socket provided to a receptacle (not shown) constituting the power management network, a communication part 374 for transmitting a control signal through the power management network connected to the coupling part 371, and a control part 376.

That is, when the cleaner plug 370 is connected to the socket, operation power may be supplied to the vacuum cleaner through the EMS 24. A power management part 392 may supply operation power according to a stand-by mode, a general mode, and an energy saving mode.

In the stand-by mode, one of power supply sources supplied through the EMS 24 may be displayed on the handle display 320, and be selected by a user.

The power management part 392 communicates with the EMS 24 to receive power selected by a user, and a separate power circuit operates such that a user selects and controls a power supply mode for the selected power. In detail, the power management part 392 may include three power supply circuits which operate in the stand-by mode, the general mode, and the energy saving mode.

In the stand-by mode, one of power supply sources supplied through the EMS 24 supplies power that is used to display power supply information on the handle display 320.

Thus, a user checks the power supply information and manipulates a power mode selection button 350 disposed at a side of the handle 300 to select a power supply source that supplies operation power for the vacuum cleaner. That is, according to the number of times of pressing, the power mode selection button 350 switches the power supply circuits such that the cleaner power management part 392 supplies power corresponding to the general mode or the energy saving mode.

Figure 23:
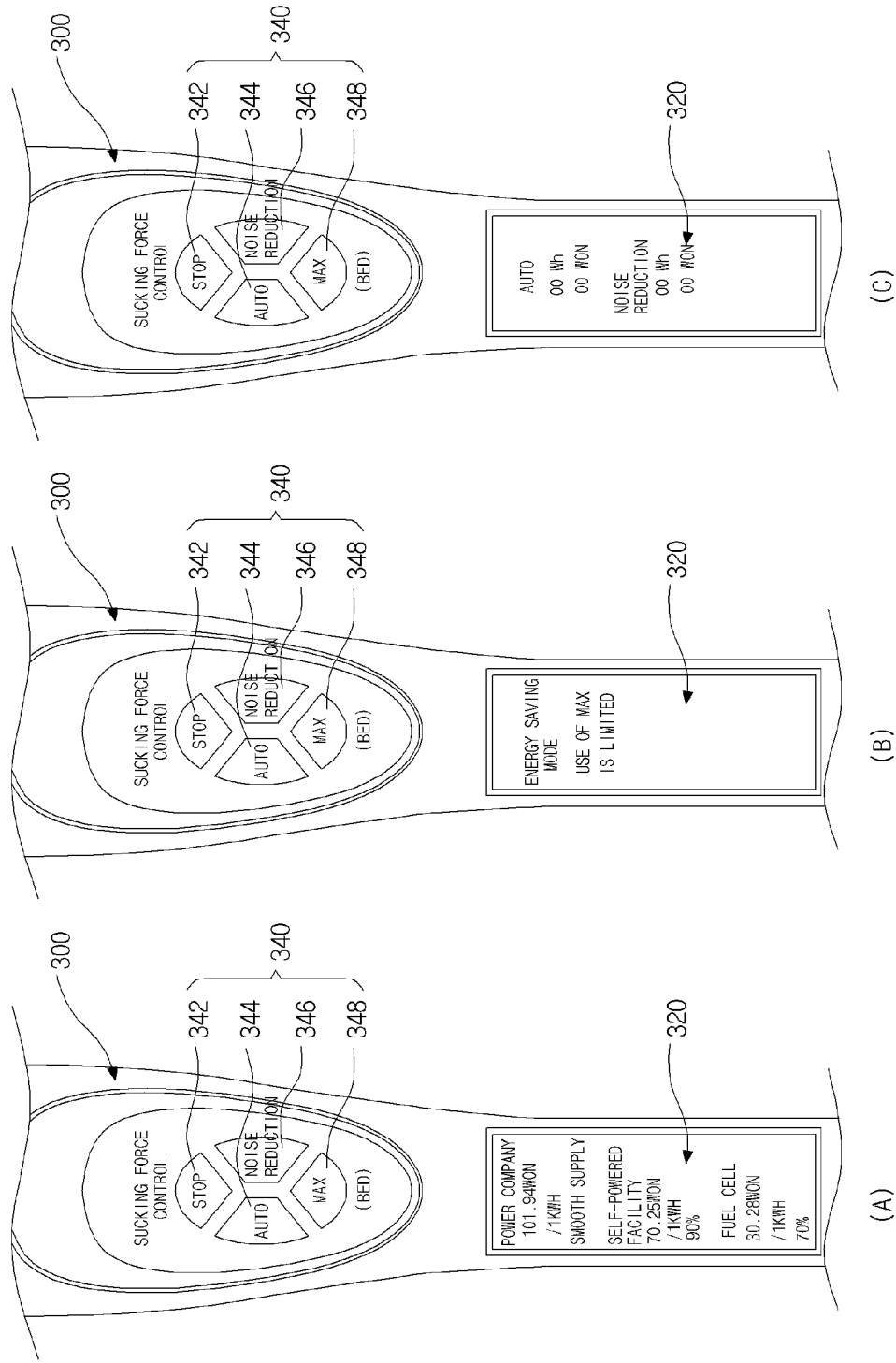
FIGS. 23A, 23B and 23C are schematic views illustrating information displayed on a display of the vacuum cleaner illustrated in FIG. 21.
Figure 24:
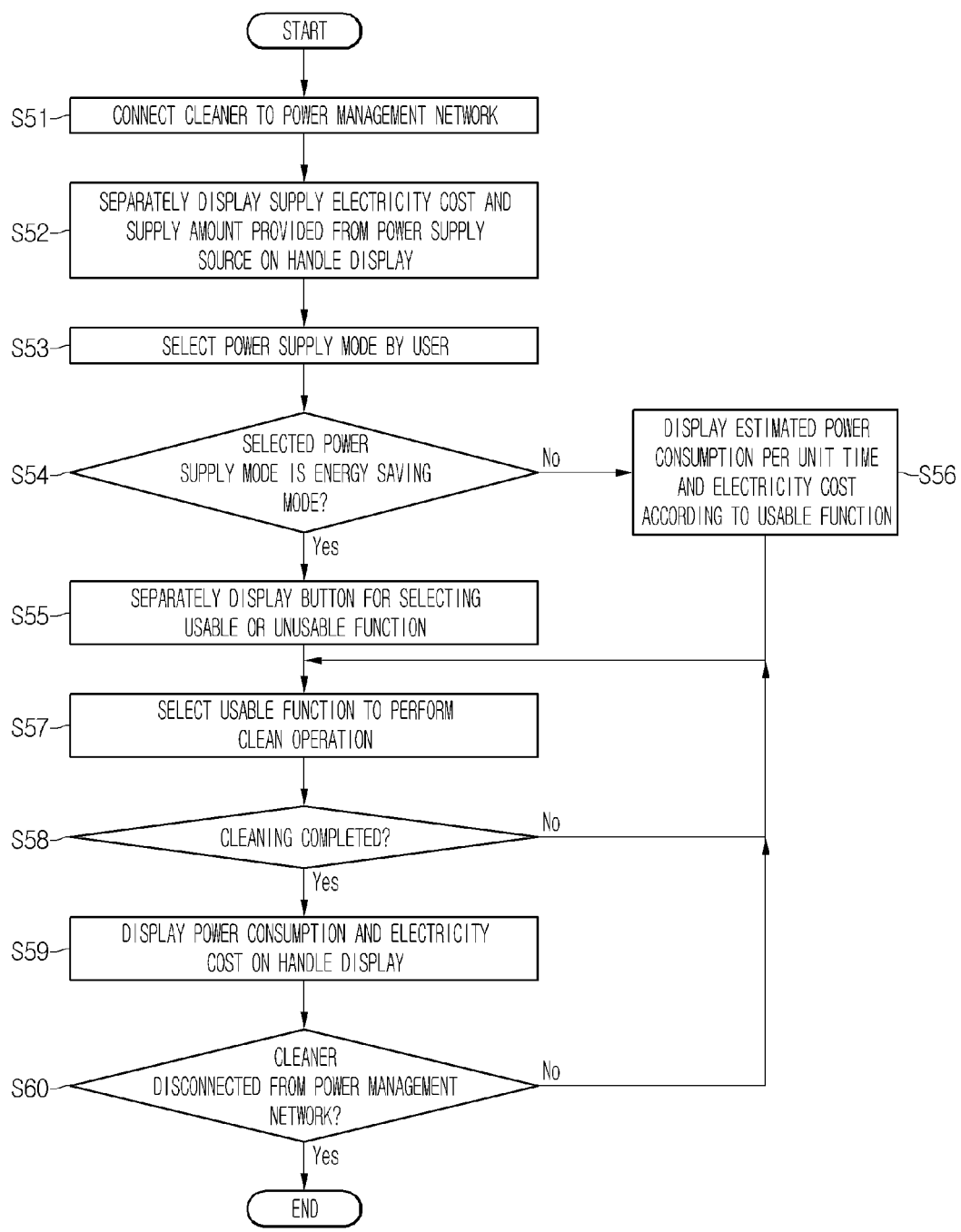
FIG. 24 is a flowchart illustrating a control process of the vacuum cleaner of FIG. 21.

FIGS. 23A, 23B and 23C are schematic views illustrating information displayed on the display of the vacuum cleaner illustrated in FIG. 21. FIG. 24 is a flowchart illustrating a control process of the vacuum cleaner of FIG. 21.

Referring to FIGS. 23A, 23B, 23C and 24, when the cleaner plug 370 is connected to the power management network to use the vacuum cleaner in operation S51, the power management part 392 supplies power in the stand-by mode, and a power supply cost per 1 KWH and the amount of power to be supplied are displayed on the handle display 320 according to a power supply source, as illustrated in FIG. 23A in operation S52.

Then, a user checks the power supply cost and the amount of power and manipulates the power mode selection button 350 to select one of the general mode or the energy saving mode in operation S53.

In operations S54 and S56, when the general mode is selected, the power management part 392 transmits a power supply request signal to the EMS 24 such that a power supply source that sufficiently supplies power at a high cost, and all functions of the vacuum cleaner can be used with the supplied power.

On the contrary, when the user selects the energy saving mode, the power management part 392 transmits a power supply request signal to the EMS 24 such that a power supply source that insufficiently supplies power at a low cost.

In the energy saving mode, a power circuit is configured to limit a function requiring large power, thereby efficiently using power supplied with a small amount as described above.

That is, when power is insufficiently supplied, a power circuit is configured such that the power management part 392 limits high power consumption functions such as a bedclothes cleaning function or a maximal sucking force function.

The handle display 320 displays a usable function and an unusable function, so that a user can check a state where a function is limited as described above. An unusable function is displayed darker than a usable function on the manipulation button 340 to efficiently check the unusable function and the usable function.

That is, referring to FIG. 23B, the handle display 320 displays characters to describe that a "maximum" function requiring large power is limited, and the maximum button 348 is displayed darker than the other parts.

After the state as illustrated in FIG. 23B is maintained for a predetermined time, the handle display 320 displays characters to describe that an "auto" function and a "noise reduction" function can be used except for the maximum button 348, and the amount of power consumed per unit time and an electricity cost according to a related function are displayed. Accordingly, the user can determine a cleaning type of the vacuum cleaner, in operations S55 and S57.

When a predetermined cleaning operation is completed in operation S58, the amount of consumed power and a used electricity cost are displayed on the handle display 320 in operation S59, and the vacuum cleaner may be disconnected from the power management network in operation S60.

Figure 25:
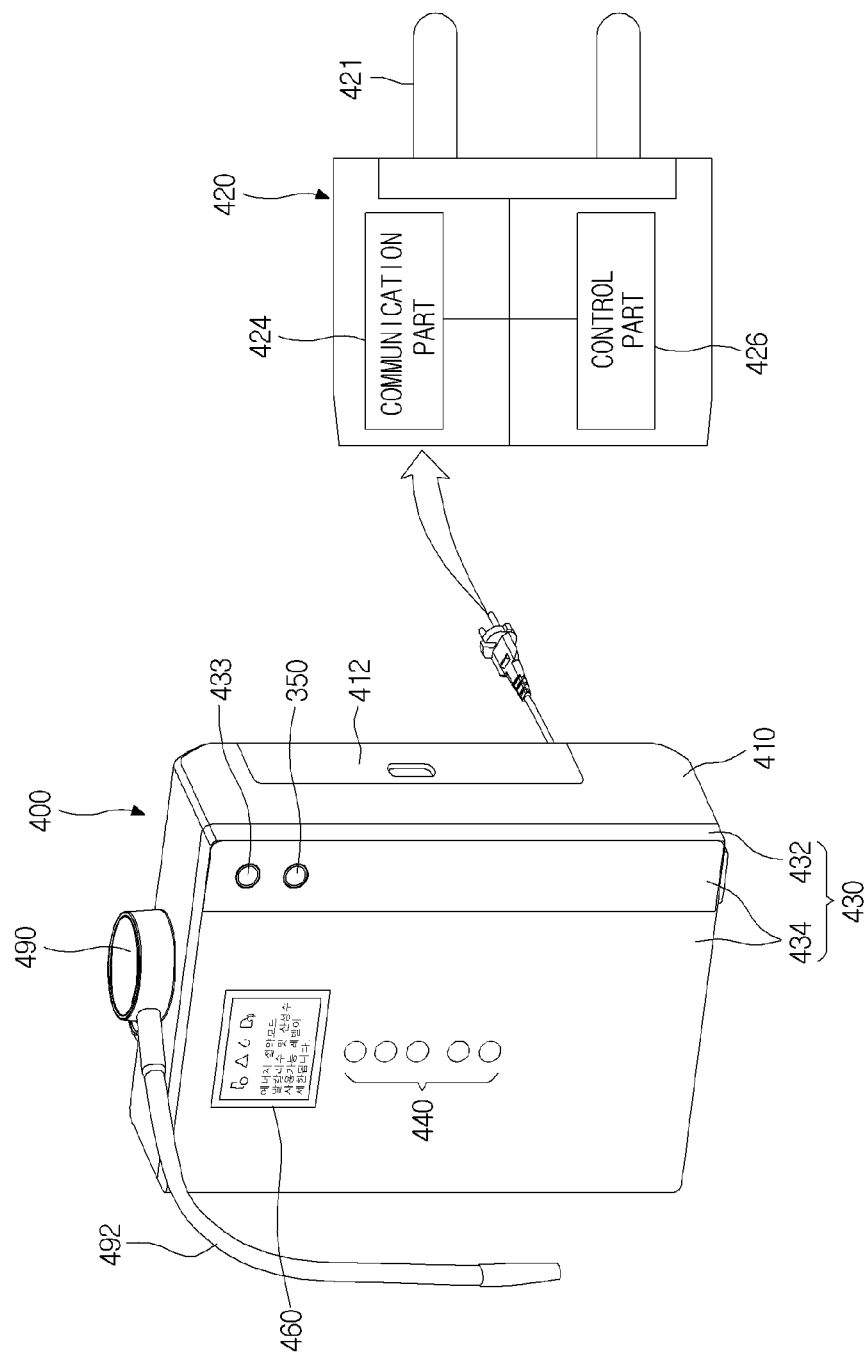
FIG. 25 is a schematic view illustrating a water ionizer as an electric home appliance according to an embodiment.
Figure 26:
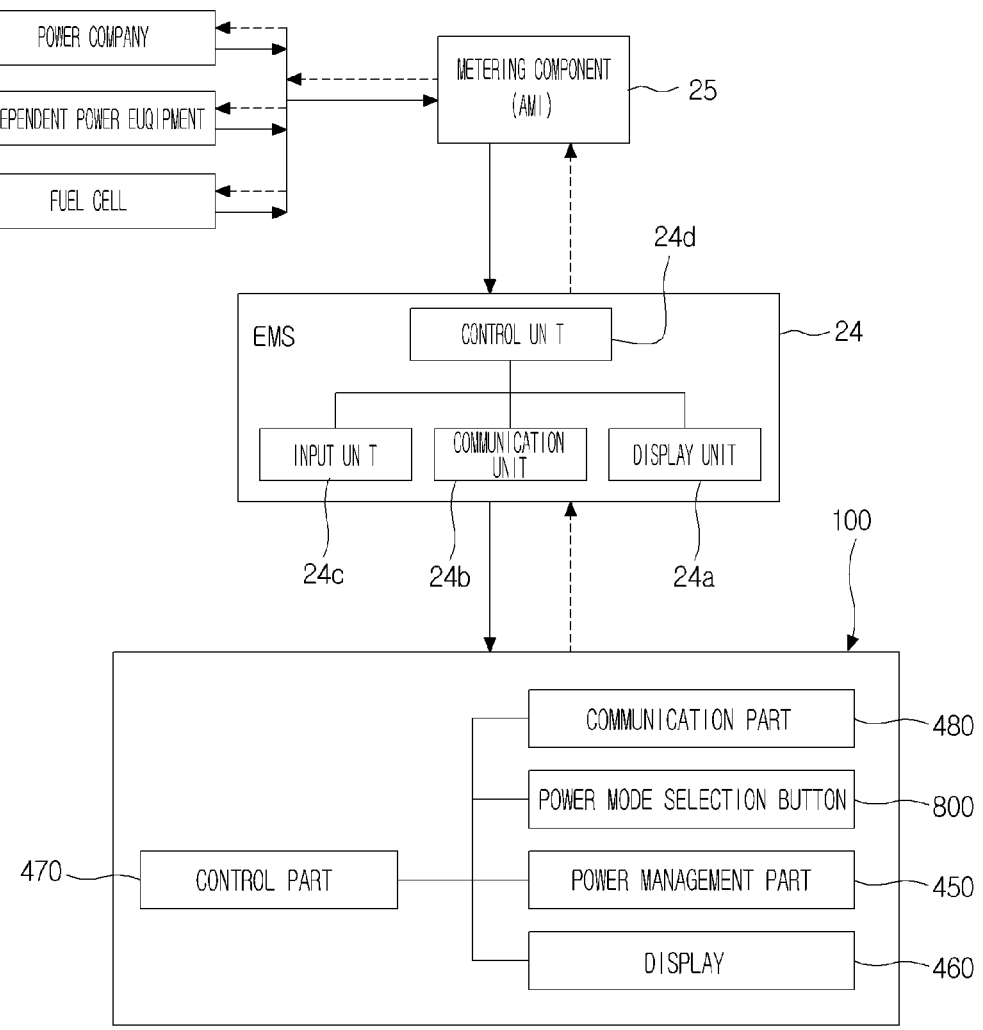
FIG. 26 is a block diagram illustrating a control structure of the water ionizer illustrated in FIG. 25.

FIG. 25 is a schematic view illustrating a water ionizer as an electric home appliance according to an embodiment. FIG. 26 is a block diagram illustrating a control structure of the water ionizer illustrated in FIG. 25.

Referring to FIGS. 25 and 26, a water ionizer 400 according to an embodiment includes a main body 410 having an open front portion and a hollowed inner portion. The main body 410 is coupled with a front cover 432 covering an open front surface of the main body 410, and deco panels 434 coupled to the front cover 432 to constitute the appearance of the water ionizer 400, thereby forming a predetermined inner space of the main body 410. An electrolyzer (not shown) is disposed in the inner space of the main body 410 to produce ionized water.

A water pipe may be connected to the main body 410 to supply source water for producing ionized water. At least one filter may be disposed in the inner space of the main body 410 to purify water supplied through the water pipe. The filter can be easily attached or detached by opening and closing a filter cover 412 disposed at a portion of the main body 410.

The upper surface of the main body 410 is provided with a nozzle holder assembly 490 that is coupled with a water discharge nozzle 492 for discharging ionized water. The nozzle holder assembly 490 is rotatably installed on the main body 410 to change a discharge direction of ionized water through the water discharge nozzle 492.

An operation button 433 is disposed at a side portion of the deco panel 434 to input a command for operating or stopping the water ionizer 400. The operation button 433 may be a touch-type one, so that capacitance of the operation button 433 can be sensed to transmit a control signal.

A power management button (also denoted by 350) is disposed under the operation button 433 to switch a power supply mode for the water ionizer 400 to a general mode or an energy saving mode.

The power management button 350 may be a touch type button. That is, when the power management button 350 is pressed, the general mode and the energy saving mode are switched to each other to change a power supply mode. When a plug 420 is connected to or disconnected from the power management network, the power supply mode is automatically set to a neutral mode.

As a result, when the power management button 350 is pressed in the state where power is supplied, a control signal corresponding to the general mode and a control signal corresponding to the energy saving mode is alternately generated and transmitted to a power management part 450 disposed in the main body 410 to operate a power circuit corresponding to the general mode or the energy saving mode, thereby changing a power supply mode for the water ionizer 400.

In the neutral mode, one of power supply sources is selected to supply power. In this case, regardless of the amount of supplied power, power having the lowest electricity cost is selected and supplied through the EMS 24.

The water ionizer 400 includes a display 460 connected to the power management network to check power supply information through the water ionizer 400, and a manipulation part 440. A user can use the manipulation part 440 to input a control command, seeing information on the display 460.

To this end, a plug 420 is connected to the water ionizer 400 to communicate with the power management network and receive power. The plug 420 may include: a communication part 424 transmitting and receiving a communication signal to request supplying of power; and a control part 426 for controlling the supplying of power.

FIGS. 27A, 27B, 27C and 27D are schematic views illustrating information displayed on the display of the water ionizer illustrated in FIG. 25. FIG. 28 is a flowchart illustrating a control process of the water ionizer illustrated in FIG. 25.

Referring to FIGS. 27A, 27B, 27C, 27D and 28, power supply information provided from power supply sources is displayed on the display 460 of the water ionizer 400.

Figure 27:
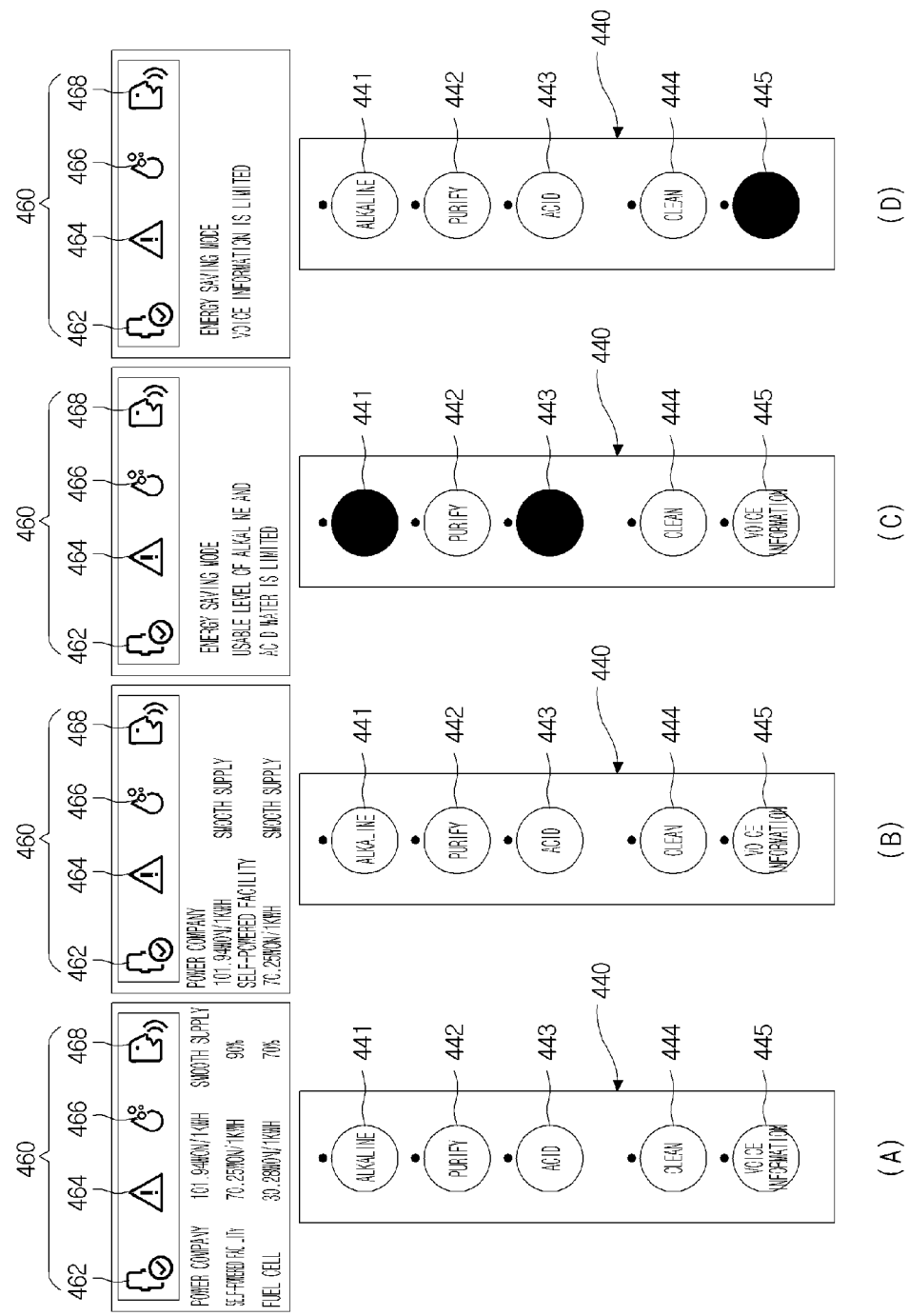
FIGS. 27A, 27B, 27C and 27D are schematic views illustrating information displayed on a display of the water ionizer illustrated in FIG. 25.
Figure 28:
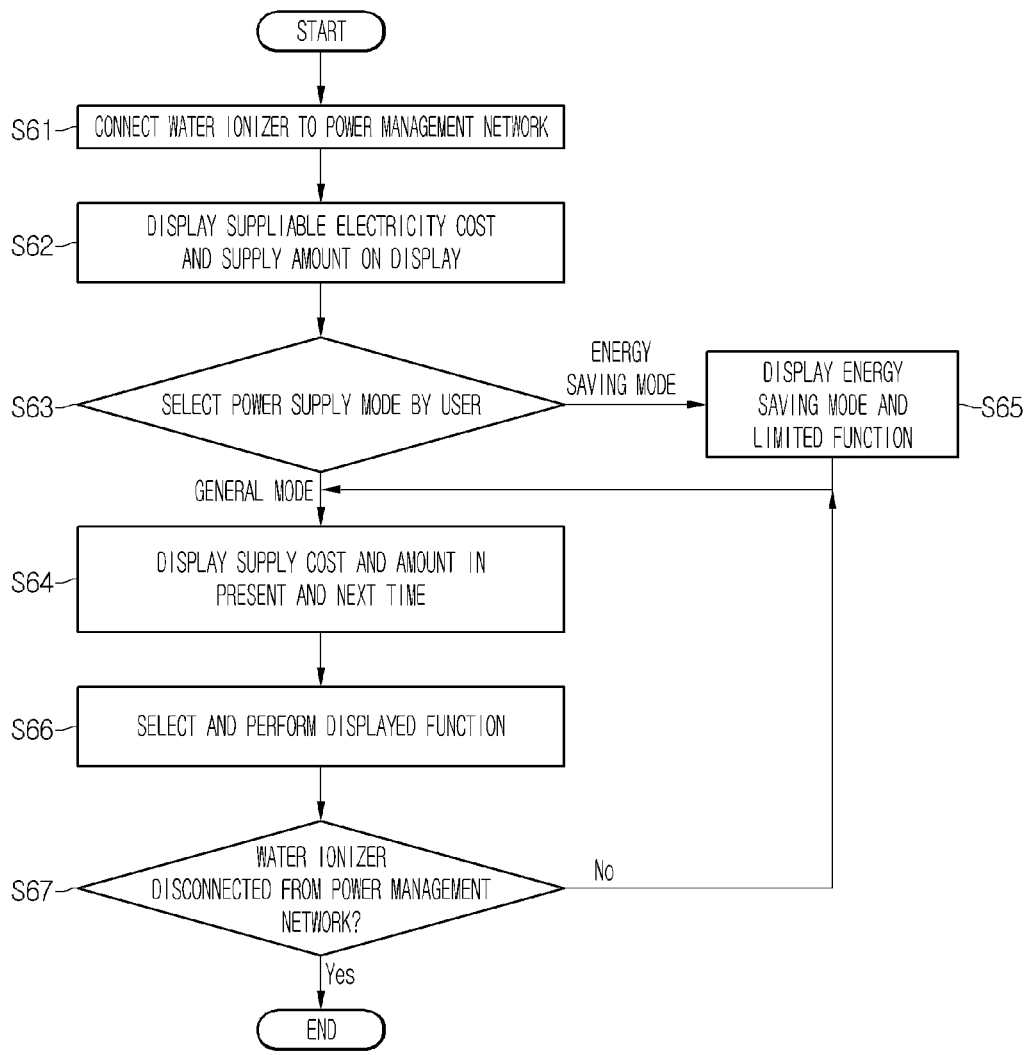
FIG. 28 is a flowchart illustrating a control process of the water ionizer illustrated in FIG. 25.

That is, referring to FIG. 27A, the cost of electricity and the amount of power supplied through a power supply source are separately displayed on the display 460. In addition, the display 460 displays a filter replacement icon 462 for notifying a replacement interval of a filter, an anomaly icon 464 for notifying an anomaly of the water ionizer 400, a cleaning icon 466 for notifying that the water ionizer 400 is cleaned, and a voice information icon 468 for notifying voice information.

When a power supply mode is selected, a control part 470 provided to the water ionizer 400 checks the power supply mode to selectively limit usable functions of the water ionizer 400.

That is, when the plug 420 is connected to the power management network in operation S61, the power management button 350 is set to the neutral mode, and the water ionizer 400, the EMS 24, and the AMI 25 are connected to communicate with one other, and power supply information is provided from power supply sources to the water ionizer 400 as illustrated in FIG. 27A in operation S62.

The power supply information as described above is displayed on the display 460 and the user checks the power supply information. Then, the user manipulates the power management button 350 according to the power supply information to select a power supply mode of the water ionizer 400 in operation S63.

When the user touches the power management button 350 to select the general mode as the power supply mode, all the buttons of the manipulation part 440 are activated as illustrated in FIG. 27B.

That is, an alkaline water button 441, a purification button 442, an acid button 443, a cleaning button 444, and a voice information button 445 are activated and displayed brighter than the other parts. When the user presses a button, a control signal is transmitted to the control part 470, and a control command is transmitted to a part performing a function corresponding to the control command.

The display 460 receives power supply information through the EMS 24 to display a supply electricity cost and a supply capacity in a present time period and a supply electricity cost and a supply capacity in a next time period in operation S64. When the user touches the power management button 350 to select the energy saving mode as the power supply mode, a part of the functions is limited as illustrated in FIG. 27C or 27D.

That is, the power management part 450 checks a power supply amount selected by the user and provided from the EMS 24, and a power circuit is configured to limit a function consuming large power if the power supply amount is insufficient. For example, a function of discharging ionized water having a high pH level such as alkaline water or acid water is limited first.

In addition, the display 460 may display a description of the limited function. That is, referring to FIG. 27C, the display 460 may notify that the energy saving mode is selected as the power supply mode, and may display a message "Usable level of alkaline water and acid water is limited'.

Referring to FIG. 27D, the voice information function and the pH level of ionized water that can be discharged according to a supply power amount may be limited. Also in this case, a message notifying corresponding contents can be displayed on the display 460.

As described above, when the user manipulates the manipulation part 440 in the state where the power supply mode is determined, only a usable function can be performed in operation S66. In operation S67, it is determined whether the water ionizer 400 is disconnected from the power management network.

Figure 29:
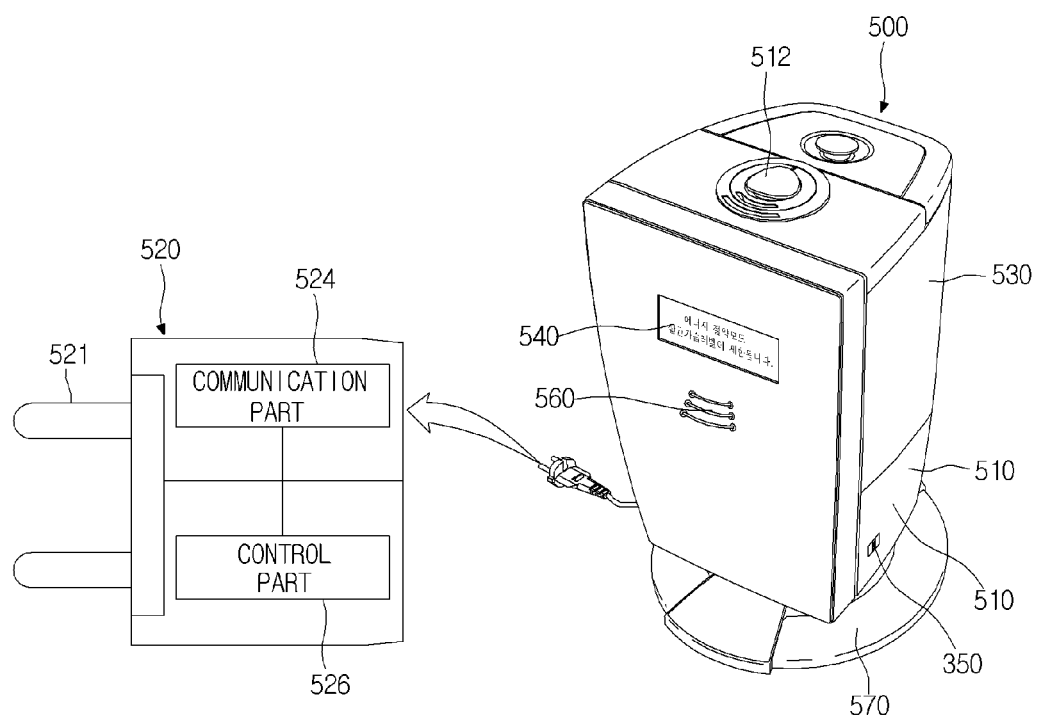
FIG. 29 is a schematic view illustrating a humidifier as an electric home appliance according to an embodiment.
Figure 30:
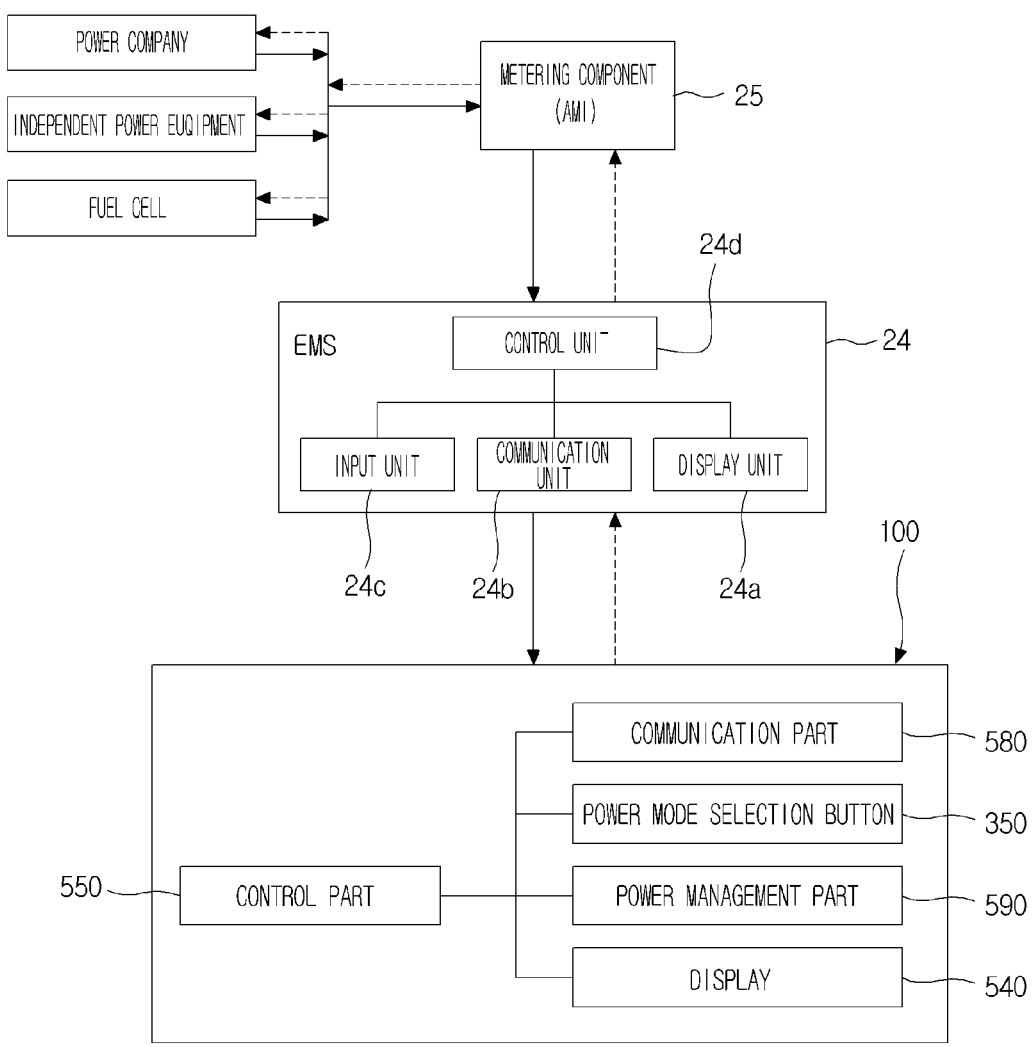
FIG. 30 is a block diagram illustrating a control structure of the humidifier illustrated in FIG. 29.

FIG. 29 is a schematic view illustrating a humidifier as an electric home appliance according to an embodiment. FIG. 30 is a block diagram illustrating a control structure of the humidifier illustrated in FIG. 29.

Referring to FIGS. 29 and 30, as an electric home appliance, a humidifier 500 creates a pleasant indoor environment by adjusting humidity of an interior space. Referring to drawings, the humidifier 500 includes a main body 510 and a water tank 530 mounted on the main body 510.

In detail, the main body 510 provides a space at a portion of the rear to mount the water tank 530. When the water tank 530 is mounted, the water received in the water tank 530 is processed to generate wet vapor.

For this, an ultrasonic generator or a heating element is equipped in the main body 510, and a blower unit for discharging the generated wet vapor may be further included in the main body 510. A path of the wet vapor generated from the main body 510 is disposed in the water tank 530 and a spray nozzle 512 is selectively mounted on the path to discharge the wet vapor in a direction that a user wants.

Additionally, the front of the main body 510 is provided with a manipulation part 560 through which a user controls an injection amount and time, and a front panel 570 including a display 540 for displaying an input state of a control command by the manipulation part 560 and operation information of the humidifier 500.

The main body 510 includes a plug 520 at a side. The plug 520 for supplying power and two-way communication is connected to the power management network including the EMS 24 and the AMI 25. That is, the plug 520 includes a communication part 524 and a control part 526 for supplying power and transmitting and receiving communication signals.

Unlike the water ionizer 400, the power management button 350 has a neutral mode in a central part, and moves in a first direction from the central part to select a general mode in which all functions of the humidifier 500 can be used with sufficient power.

The power management button 350 moves in a second direction from the central part to select an energy saving mode in which functions are performed with insufficient power but at low cost, and a large power function is limited.

The humidifier 500 includes a power management part 590 that forms a power circuit to limit a part of the functions of the humidifier 500 based on a power supply mode according to an operation of the power management button 350. The display 540 displays contents of a limited function to a user.

Figure 31:
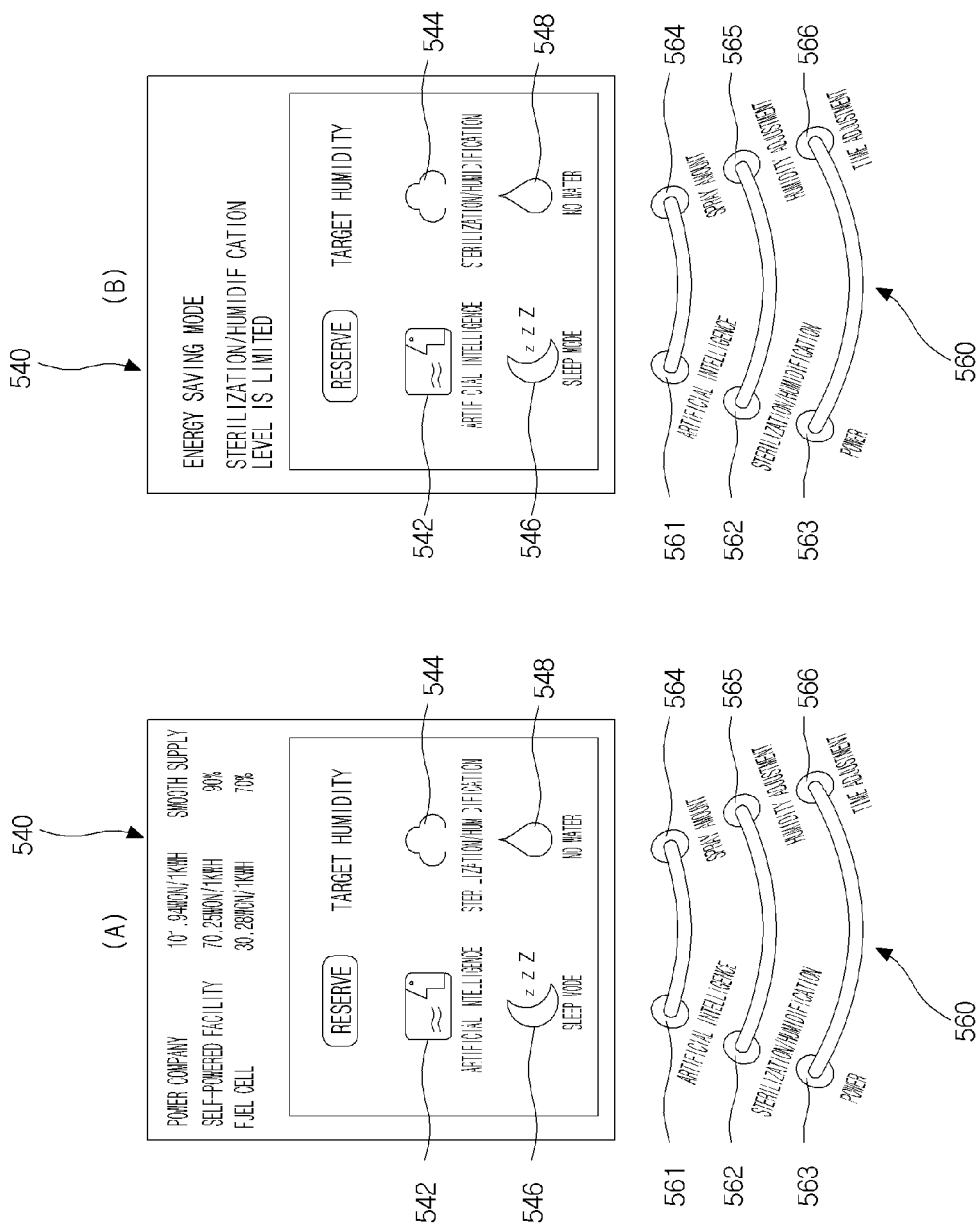
FIGS. 31A and 31B are schematic views illustrating information displayed on a display of the humidifier illustrated in FIG. 29.
Figure 32:
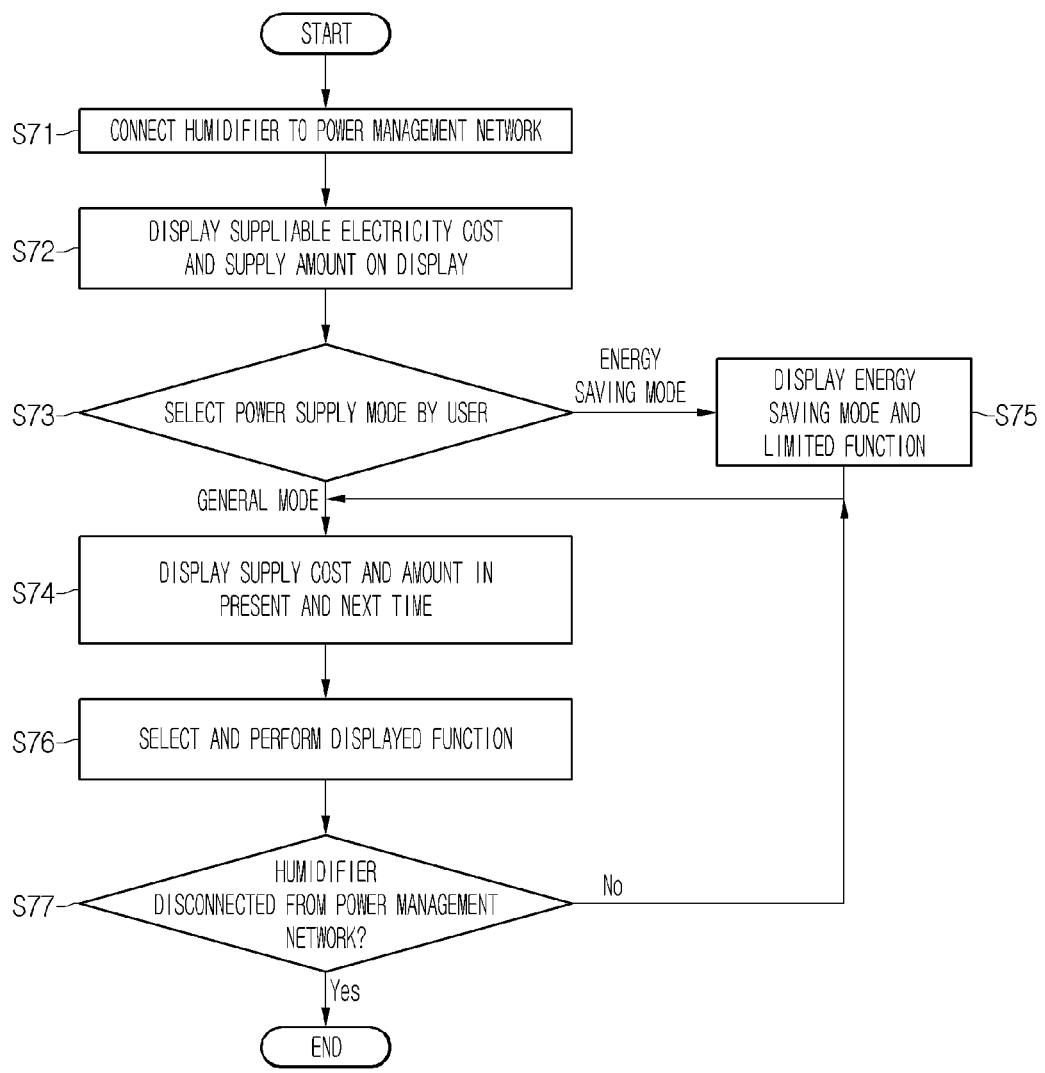
FIG. 32 is a flowchart illustrating a control process of the humidifier illustrated in FIG. 29.

FIGS. 31A and 31B are schematic views illustrating information displayed on the display of the humidifier illustrated in FIG. 29. FIG. 32 is a flowchart illustrating a control process of the humidifier illustrated in FIG. 29.

Referring to FIG. 31A, various types of power supply information provided from power supply sources connected through the display 540 are separately displayed. That is, when the humidifier 500 is connected to the power management network through terminal parts 521 in operation S71, the neutral mode is selected using the power management button 350, and the display 540 checks power supply information from the EMS 24 and displays the power supply information in operation S72.

When a user manipulates the power management button 350 to select the general mode of the humidifier 500, the display 540 displays a supply electricity cost of a selected power supply source and a supply capacity thereof in a present time period and a supply electricity cost and a supply capacity in a next time period, like the previous embodiment.

Usable functions of the humidifier 500 are displayed in the form of an icon under the above-described information. The usable functions may include an artificial intelligence display part 542 that notifies an operation state of an artificial intelligence function for adjusting a spray amount and a spray time of the humidifier 500 according to programmed contents, a sterilization/humidification display part 544 that notifies sterilization and humidification states, and a sleep mode display part 546 that notifies an operation of a sleep function in which an operation is stopped after a set time, and a water shortage display part 548 that notifies a water shortage.

The manipulation part 560 disposed under the display 540 includes an artificial intelligence selection button 561, a spray amount adjustment button 564, a sterilization/humidification selection button 562, a humidity adjustment button 565, a power button 563, and a time adjustment button 566, which are displayed brighter than the other parts to notify that all the functions can be used. To this end, the buttons may include separate LEDs that are selectively turned on according to power supply modes to notify activations of the buttons in operations S73 and S74.

When the user manipulates the power management button 350 to select the general mode as a power supply mode, the energy saving mode and a message "Sterilization/humidification level is limited" are displayed on the display 540 as illustrated in FIG. 31B.

That is, to operate the humidifier 500 in the energy saving mode in the state where power is insufficiently supplied, a power circuit of the power management part 590 is configured such that the using of a high sterilization/humidification level that requires large power is limited first, and a control part 550 operates the power circuit to limit a part of the functions of the humidifier 500.

For a user to easily perceive a limited function as described above, the limited function is displayed darker than the other parts on the manipulation part 560 in operation S75. That is, the sterilization/humidification selection button 562 is displayed darker than the other parts to notify the inactivation thereof. Thus, a function unused in the energy saving mode can be easily perceived, and only a usable function of the humidifier 500 is selected and operated in operation S76. In operation S77, it may be determined whether the humidifier 500 is disconnected from the power management network.

Figure 33:
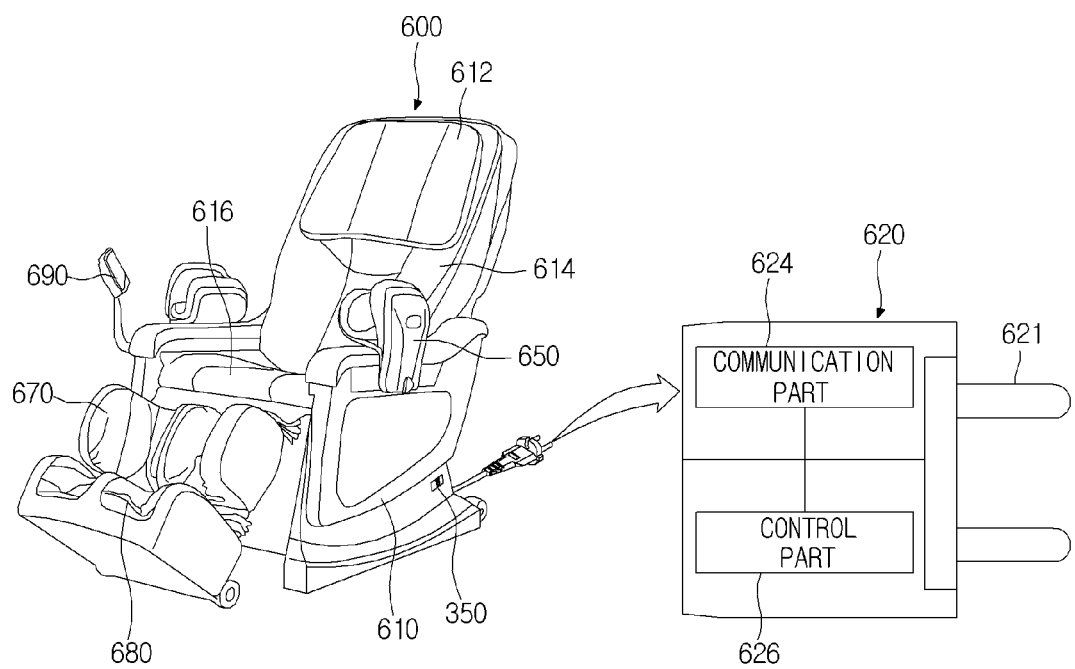
FIG. 33 is a schematic view illustrating a massage chair as an electric home appliance according to an embodiment.

FIG. 33 is a schematic view illustrating a massage chair as an electric home appliance according to an embodiment. FIG.

34 is a block diagram illustrating a control structure of the massage chair illustrated in FIG. 33.

Figure 34:
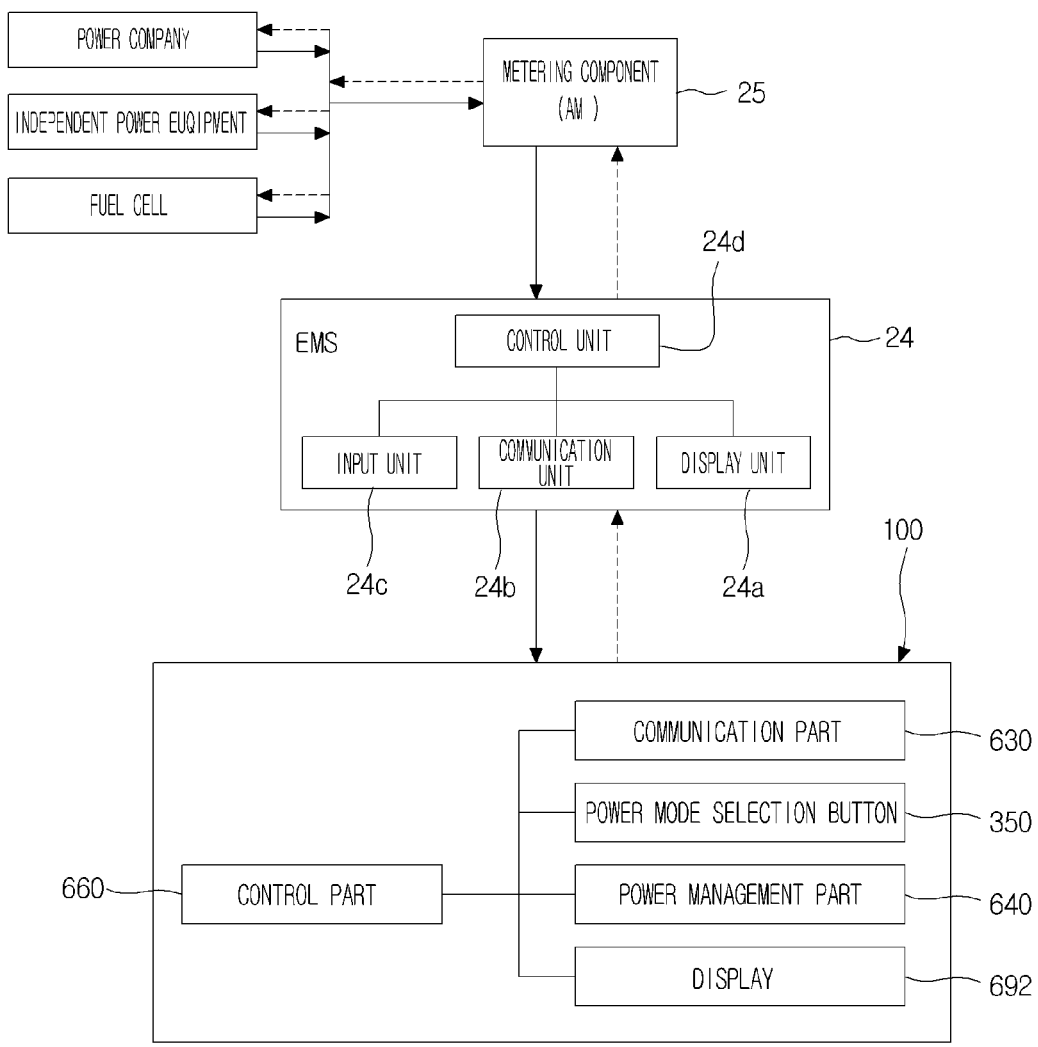
FIG. 34 is a block diagram illustrating a control structure of the massage chair illustrated in FIG. 33.

Referring to FIGS. 33 and 34, a massage chair 600 according to an embodiment includes a main body 610 provided in the form of a chair, a plurality of motors, and a plurality of air adjustment devices connected to a plurality of air bags to selectively massage at least one part of a user's body.

In detail, a main body 610 includes a back pad 614 for massaging a user's back, a headrest pad 612 for massaging the user's neck, a hip pad 616 for massaging a user's hip, arm massage parts 650, a leg massage part 670, and a foot massage part 680, which operate independently. To this end, motors or air adjustment devices that operate independently are provided to separately massage each part of the body. That is, each of the back pad 614, the headrest pad 612, and the hip pad 616 includes a plurality of massage protrusions connected to a motor to move in various patterns and massage an intended part of a user.

The arm massage parts 650 and the leg massage part 760 use the air adjustment devices to expand and contract the air bag, thereby massaging a user's arms and legs.

The massage chair 600 includes: a remote control 690 for separately or concurrently operating the above-described massage parts according to a user's need; and a control part 660 for transmitting a control command to each massage part according to contents selected using the remote control 690.

The remote control 690 is disposed at a side of the arm massage part 650, so that a user seated on the massage chair 600 can conveniently check and operate the remote control 690. The remote control 690 includes a touch type display 692, so that a user can conveniently check and select an operation mode.

The display 692 may display information according to a control signal transmitted through the EMS 24. To this end, a communication part 630 and the control part 660 are provided to a side portion of the remote control 690.

The main body 610 includes a plug 620, so that the massage chair 600 can communicate with the power management network including the AMI 25 and the EMS 24 and can receive power.

The plug 620 includes terminal parts 621 fitted in a socket of the power management network, a communication part 624, and a control part 626 for processing a control command to transmit and receive a power supply signal.

The main body 610 may further include the power management button 350. The power management button 350 is connected to a power management part 640 disposed in the main body 610 to selectively limit the functions of the massage chair 600 according to a selected mode. In this case, limited functions are displayed using the display 692 and a plurality of manipulation buttons disposed on the remote control 690, so that a user can perceive the limited functions.

Figure 35:
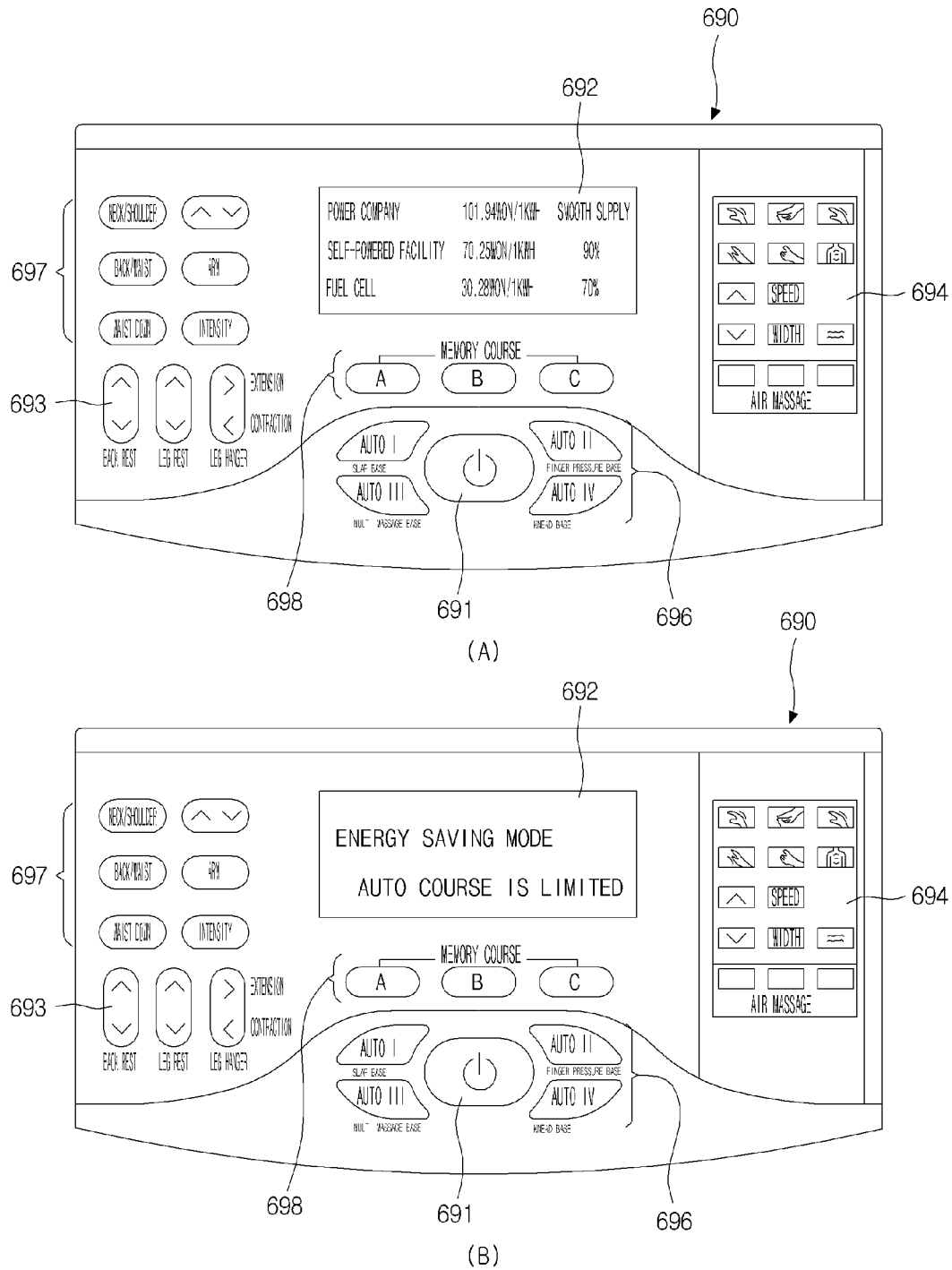
FIGS. 35A and 35B are schematic views illustrating information displayed on a remote control of the massage chair illustrated in FIG. 33.
Figure 36:
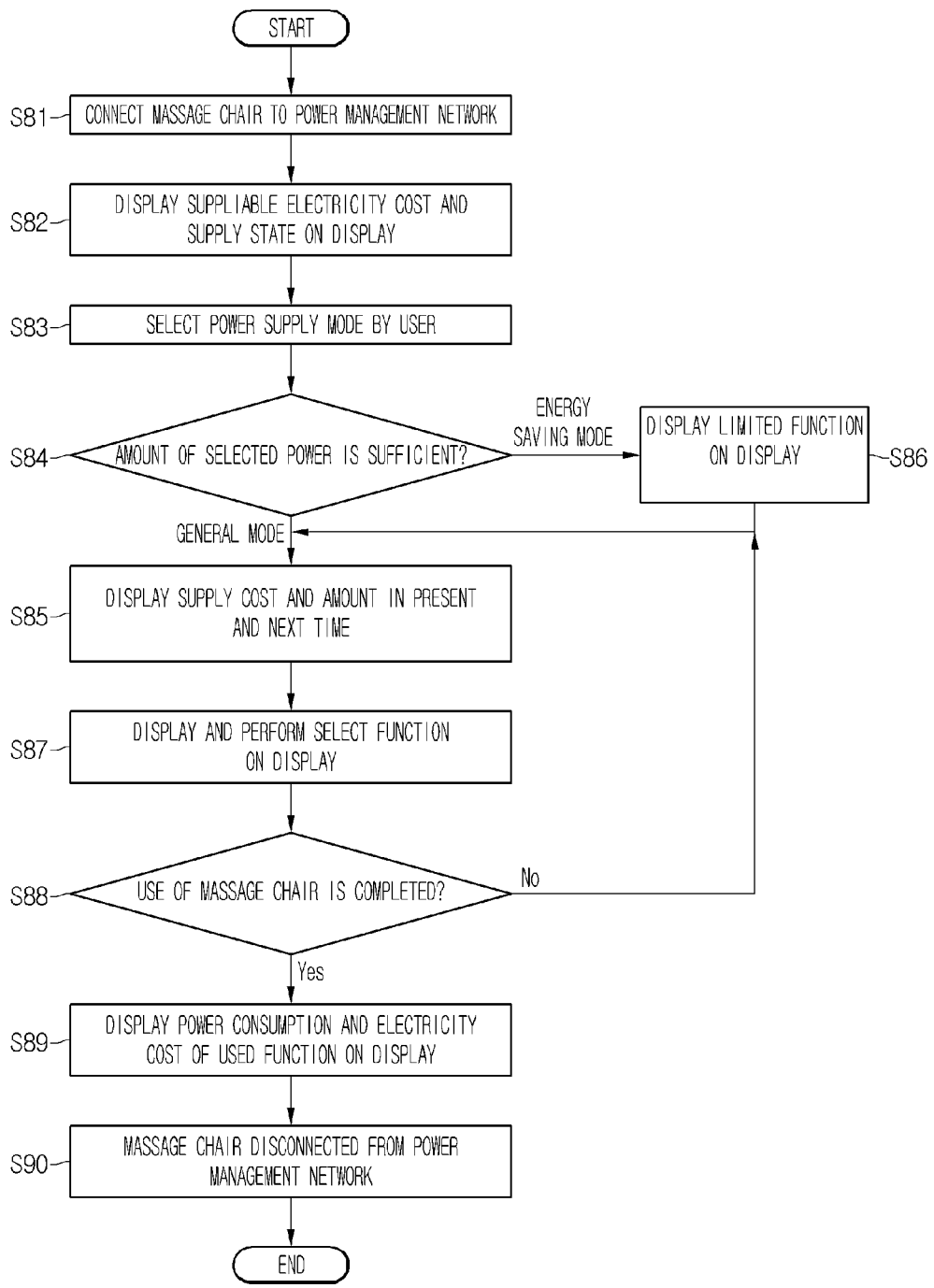
FIG. 36 is a flowchart illustrating a control process of the massage chair illustrated in FIG. 33.

FIGS. 35A and 35B are schematic views illustrating information displayed on the remote control of the massage chair illustrated in FIG. 33. FIG. 36 is a flowchart illustrating a control process of the massage chair illustrated in FIG. 33.

When the massage chair 600 is connected to the power management network including the EMS 24 and the AMI 25 in operation S81, various types of power supply information provided from the EMS 24 are separately displayed on the display 692 in operation S82.

Thus, the user manipulates the power management button 350 according to a desired function of the massage chair 600 to select a power supply mode of the massage chair 600. In this case, the general mode can be selected when the supply of selected power is sufficient, and the energy saving mode can be selected when the supply of selected power is insufficient.

The remote control 690 includes: an automatic input part 696 for selecting an automatic course that a massage operation is automatically performed according to programmed contents; and a manual input part 694 for performing a manual massage operation. The remote control 690 further includes intensive massage buttons 697 for intensively massaging a specific part, length adjustment buttons 693 for fitting the massage chair 600 to a user's body, memory buttons 698 for performing a function memorized by a user, and a power button 691, so that a user can select and manipulate a desired function in operation S83.

When the general mode is selected as a power supply mode for the massage chair 600, the display 692 displays a supply electricity cost and a supply capacity in a present time period and a supply electricity cost and a supply capacity in a next time period in operation S85, as in the previous embodiments.

When the energy saving mode is selected as a power supply mode for the massage chair 600, the display 692 displays a message "Automatic course is limited" and a message notifying that the energy saving mode is selected as illustrated in FIG. 13B. That is, the automatic course requiring large power is limited.

In addition, the automatic input part 696 is displayed darker than the other parts to notify the inactivation thereof, so that a user can easily perceive an unusable function in the energy saving mode in operation S86.

Thus, the user manipulates only an activated and usable function of the massage chair 600, so that the user can use a desired function with a low-cost power supply source in operation S87.

When a function activated on the remote control 690 and selected by a user is ended, the display 692 may display the amount of power consumed by the function and a related electricity cost thereof.

That is, the power management part 640 calculates the amount of consumed power to display it on the display 692. Thus, the user can check power consumption and a supply cost of the function in operation S88 and S89 and can use the power consumption and the supply cost when selecting a power supply mode using the power management button 350. In operation S90, it may be determined whether the massage chair 600 is disconnected from the power management network.

Figure 37:
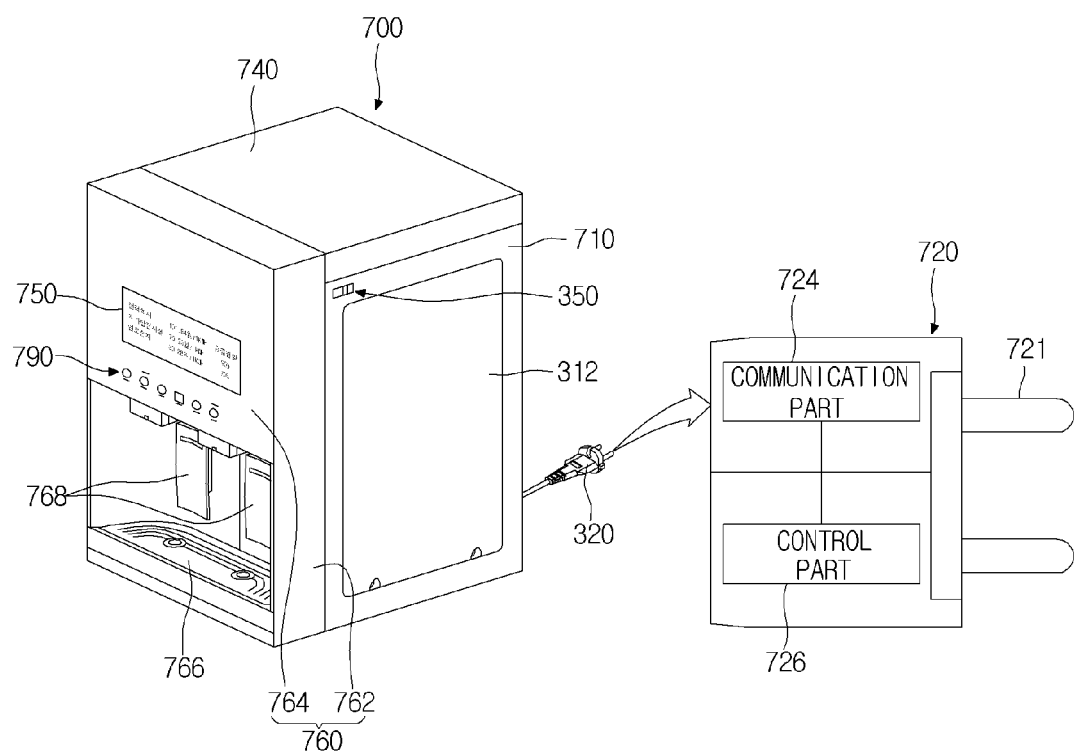
FIG. 37 is a schematic view illustrating a water purifier according to an embodiment.
Figure 38:
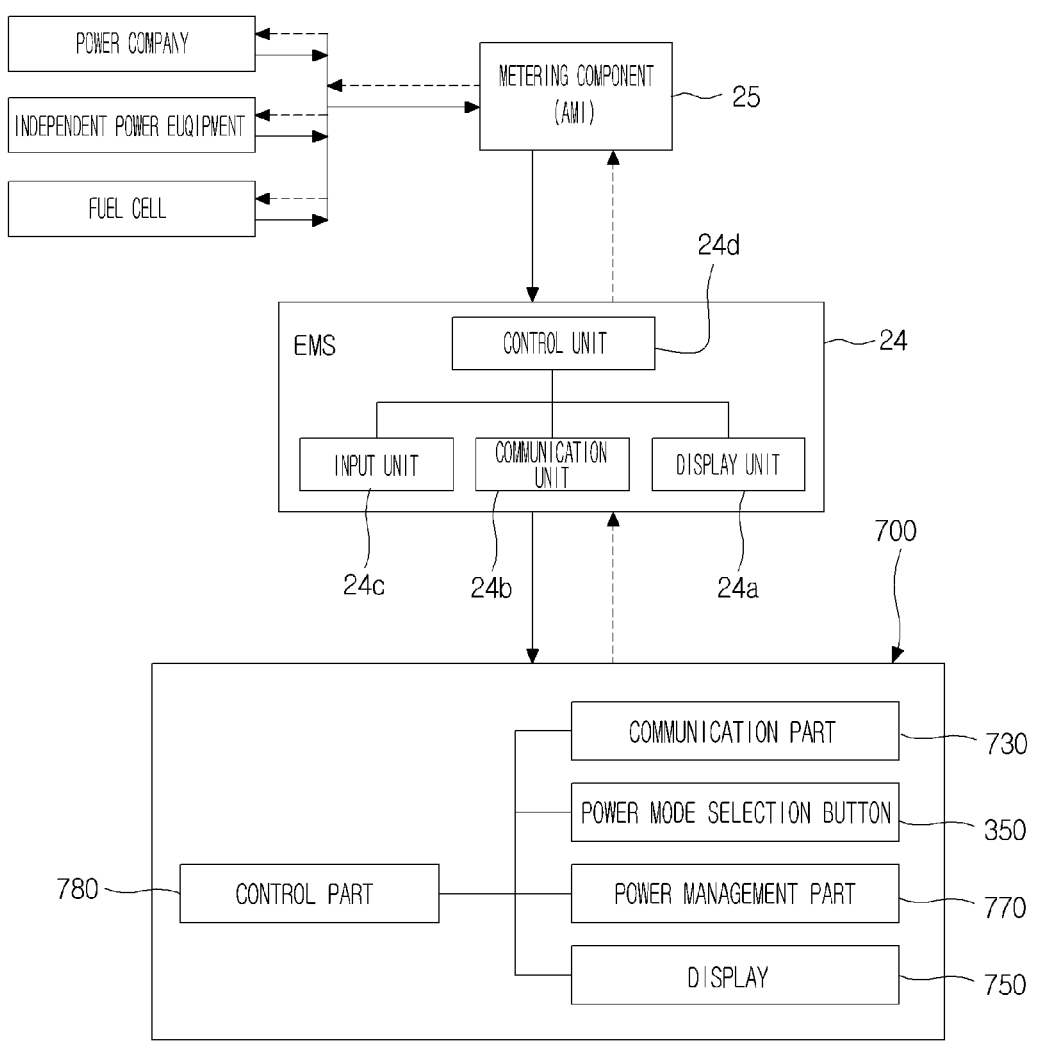
FIG. 38 is a block diagram illustrating a control structure of the water purifier illustrated in FIG. 37.

FIG. 37 is a schematic view illustrating a water purifier according to an embodiment. FIG. 38 is a block diagram illustrating a control structure of the water purifier illustrated in FIG. 37.

Referring to FIGS. 37 and 38, a water purifier 700 has an external appearance formed by a main body 710 constituting a frame, and a front assembly 760 and a top cover 740 mounted on the main body 710.

Moreover, although not shown in the drawings, the main body 710 accommodates a plurality of filters for filtering supplied source water, a water tank for receiving water purified by the filter, a cool water tank for cooling purified water supplied from the water tank, and a hot water tank for heating purified water supplied from the water tank.

Additionally, an open portion for efficient management of the filter is formed at one side of the main body 710. Moreover, a filter cover 1112 is selectively mounted on the open portion of the main body 710, such that filter replacement can be made without difficulties after removing of the filter cover 712.

Also, the front assembly 760 for forming a portion of a front and side appearance is mounted at the front of the main body 710, and the top cover 740 for forming a top appearance is mounted on the top of the main body 710.

More specifically, the front assembly 760 includes a front cover 762 for surrounding a portion of the side and the front of the main body 710 and a deco plate 764 coupled to the front cover 1162 to form an appearance. The front cover 762 has: a lower portion recessed toward the inside for providing a space for dispensing water; and a flat top for providing a mounting position of the deco plate 764.

The deco plate 764 includes: an input part 790 of a touch input type for checking an operation state of the water purifier 700 and also inputting a control command; and a display 750 at the top of the input part 790 for checking a control state and input contents of a control command.

Also, dispenser levers 768 for dispensing water are disposed in the recessed lower portion of the front cover 764. The dispenser levers 768 may be divided into a hot water lever and a cool water lever, so that water having a temperature that a user selects can be supplied.

In addition, a water gutter 766, which receives drops formed while water is supplied through the dispenser lever 768, is disposed at the bottom of the front assembly 760. Since the water gutter 766 is selectively removed, a user can remove water from the water gutter 766.

Moreover, a tempered glass plate is formed at the fronts of the display 750 and the input part 790, and has a corresponding size to the fronts, and a function display part for determining a position of the input part 790 is shown at the rear of the tempered glass plate.

That is, the function display part, which is a printed design on the deco plate 764, may display simple icons that represent a cool water or hot water indication, a filter replacement interval, and a continuous water dispensing operation. Accordingly, a user may check the function display unit and may manipulate the input part 790.

The water purifier 700 includes the power management button 350, so that a user can check power supply information and a supply amount provided from the power management network including the AMI 25 and the EMS 24 to select a supply power source.

The power management button 350 is disposed in a central part to perform a neutral mode, and moves in a first direction from the central part to perform a general mode in which all functions of the water purifier 700 can be used with sufficient power.

The power management button 350 moves in a second direction from the central part to select an energy saving mode in which functions are performed with insufficient power but at low cost, and a high output function is limited. Although the power management button 350 moves to select a mode in the current embodiment, the power management button 350 may be a touch type one in another embodiment in which a mode is selected by pressing the power management button 350.

Figure 39:
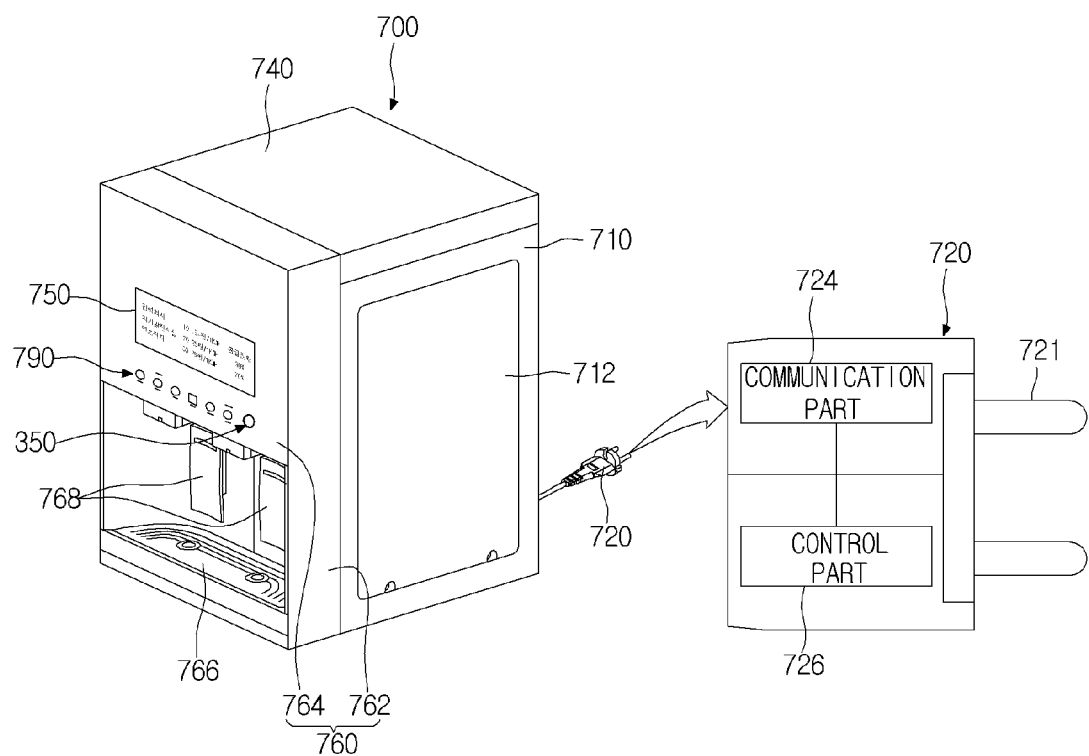
FIG. 39 is a schematic view illustrating a water purifier according to another embodiment.

FIG. 39 is a schematic view illustrating a water purifier according to another embodiment.

Referring to FIG. 39, the power management button 350 may be provided as a touch type one at a side of the input part 790.

In this case, when the power management button 350 is pressed, the general mode and the energy saving mode are alternately switched to each other. Only when a plug 720 to be described later is connected to the power management network for the first time or is disconnected therefrom, the neutral mode is selected.

The power management button 350 alternately generates a control signal corresponding to the general mode and a control signal corresponding to the energy saving mode. The control signal is transmitted to a power management part 770 to operate a power circuit corresponding to the general mode or the energy saving mode, thereby changing a power supply mode of the water purifier 700.

The water purifier 700 includes the plug 720 to supply power corresponding to a power supply mode selected using the power management button 350.

The plug 720 includes plug terminals 721 fitted in a socket constituting the power management network, a communication part 724 for transmitting a control signal through the power management network connected to the plug terminals 724, and a plug control part 726 for controlling the plug terminals 721 and the communication part 724.

When the plug 720 is connected to the socket, an operation power for the water purifier 700 may be supplied through the EMS 24. The operation power may be supplied from one of power supply sources supplying power through the EMS 24.

A power supply source for supplying power is selected according to a position of the power management button 350 manipulated by a user, and the number of times that a user presses the power management button 350. Power supply information for helping a user's manipulation is provided through both the EMS 24 and power supply sources and may be displayed on the display 750. A water purifier control part 780 processes a control signal such that the power management part 770 and the display 750 are controlled according to a power supply mode selected by a user's operation, to perform the selected power supply mode.

That is, the power management part 770 communicates with the EMS 24 to request the EMS 24 to supply power selected by a user. In this case, according to a selected power, a large power function of the water purifier 700 is selectively limited first.

FIGS. 40A, 40B, 40C, and 40D are schematic views illustrating information displayed on the display of the water purifier illustrated in FIG. 37. FIG. 41 is a flowchart illustrating a control process of the water purifier illustrated in FIG. 37.

Figure 40:
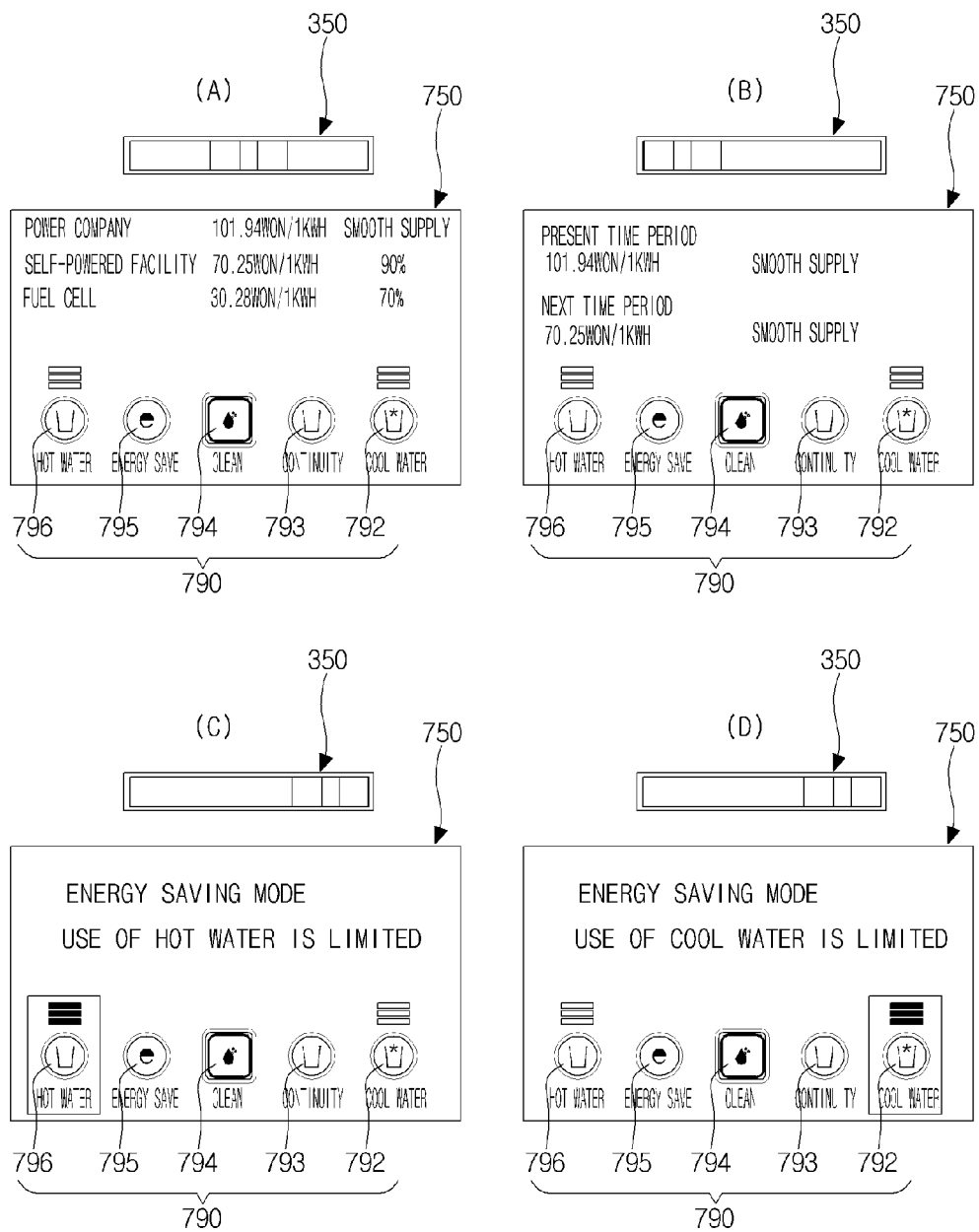
FIGS. 40A, 40B, 40C, and 40D are schematic views illustrating information displayed on a display of the water purifier illustrated in FIG. 37.
Figure 41:
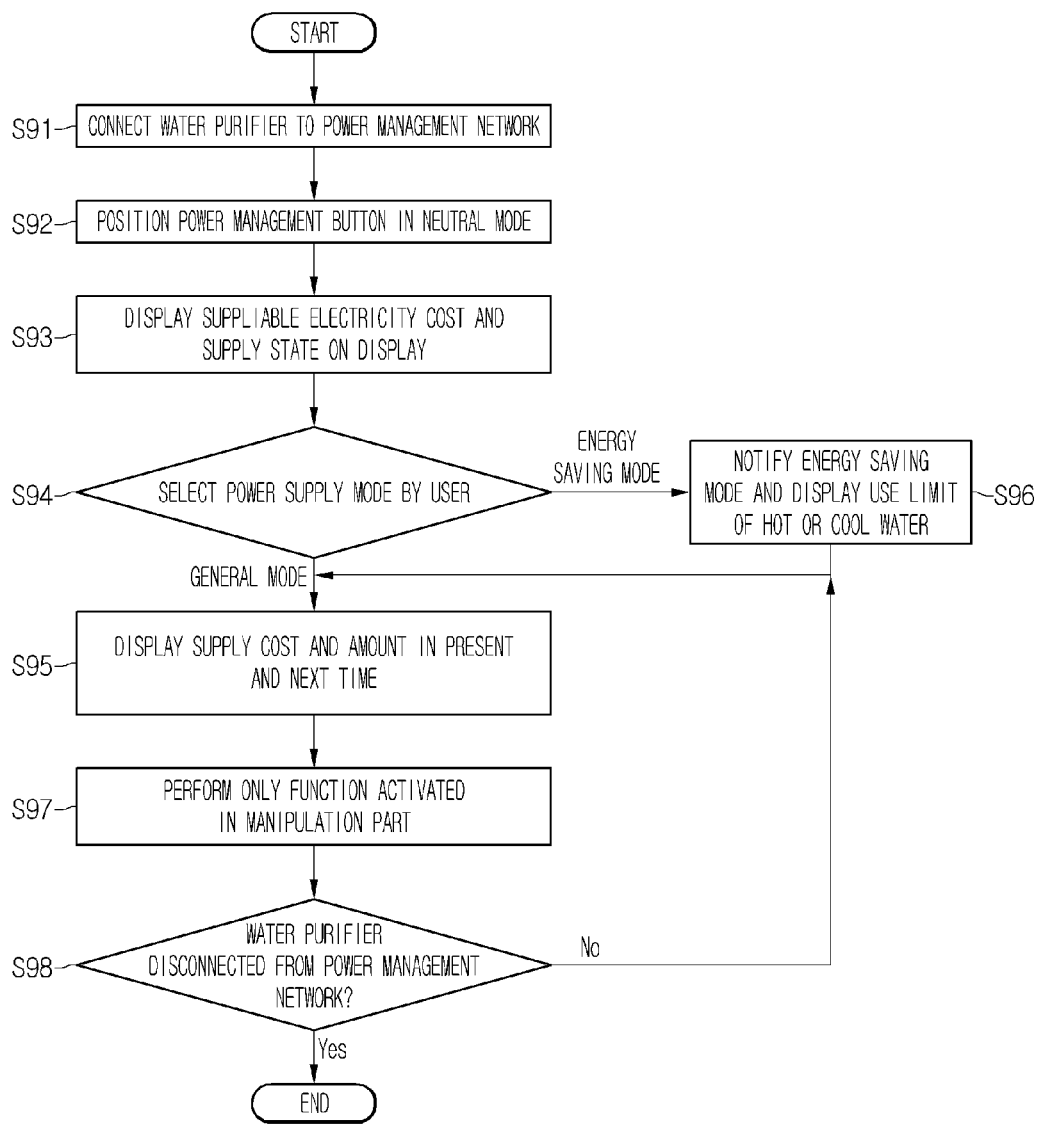
FIG. 41 is a flowchart illustrating a control process of the water purifier illustrated in FIG. 37.

Referring to FIGS. 40A, 40B, 40C, 40D and 41, the display 750 displays power supply information of power supply sources. The power supply information is provided from the power management network connected to the plug 720. The power supply information may include power supply sources, electricity costs per unit time, and supply amounts, as illustrated in FIG. 40A. The electricity costs per unit time and the supply amounts may be classified according to the power supply sources.

Referring to FIG. 40A, the power management button 350 is disposed at the central part. The power management button 350 may be configured such that the neutral mode is automatically selected when the plug 720 is connected to the power management network for the first time or is disconnected therefrom. To this end, the power management part 770 includes a switching circuit such that the neutral mode is set as an initial position when supplying of power is cut off or power is supplied for the first time, in operation S91, S92, and S93. After the user checks the above described information, if necessary, the user may select a power supply mode of the water purifier 700 by using the power management button 350 in operation S94.

When the user moves the power management button 350 in a direction to select the general mode as the power supply mode, power is supplied from a high cost power supply source as illustrated in FIG. 40B, and power supply information in a present time period and power supply information in a next time period are displayed on the display 750. Buttons, which are operated by a touch of a user, are activated on the input part 790 disposed in the lower portion of the display 750.

The buttons constituting the input part 790 may include: a cool water button 792 that is pressed to dispense cool water; a continuity button 793 that continually dispenses water for a predetermined time; a cleaning button 794 that notifies a filter replacement interval; and a power saving button 795 that adjusts the brightness of the display 750 to save power; and a hot water button 796 that dispenses hot water.

When the user touches the power management button 350 to select the energy saving mode as the power supply mode, the power management part 770 limits a part of the functions of the water purifier 700. That is, the power management part 770 checks a power supply amount selected by the user and provided from the EMS 24, and a power circuit is configured to limit a function consuming high power if the power supply amount is insufficient.

Information for notifying the limited function is displayed on the display 750, so that the user can easily check the limited function. That is, referring to FIG. 40C, the display 750 displays a message "Use of hot water is limited", and the hot water button 796 of the input part 790 is inactivated. When the functions of the water purifier 700 are partially limited, a large power function is limited first.

Thus, after the use of hot water is limited, the use of cool water is limited, which requires the next largest power, and the display 750 displays a message "Use of cool water is limited" as illustrated in FIG. 40D, in operation S96.

Simultaneously with displaying the message, the cool water button 792 of the input part 790 is inactivated. The user perceives the inactivation of the cool water button 792, and thus, knows that the water purifier 700 is not in trouble in function. The water purifier 700 operated as described above continually performs the same function until being disconnected from the power management network.

A large power function is limited when power is supplied in the energy saving mode as described above, and further, the water purifier 700 makes it possible for a user to arbitrarily select a function to be limited when power is supplied in the energy saving mode.

That is, since the dispensing of hot water is not frequent in summer, the dispensing of hot water may be limited first, and next, the dispensing of cool water may be limited, which may be controlled using the water purifier control part 780 and the power management part 770.

On the contrary, since the dispensing of cool water is not frequent in winter, the dispensing of cool water may be limited first, and next, the dispensing of hot water may be limited, which may be controlled using the water purifier control part 780 and the power management part 770, and thus, a user can more conveniently use the water purifier 700 and save energy, in operations S97 and S98.

Figure 42:
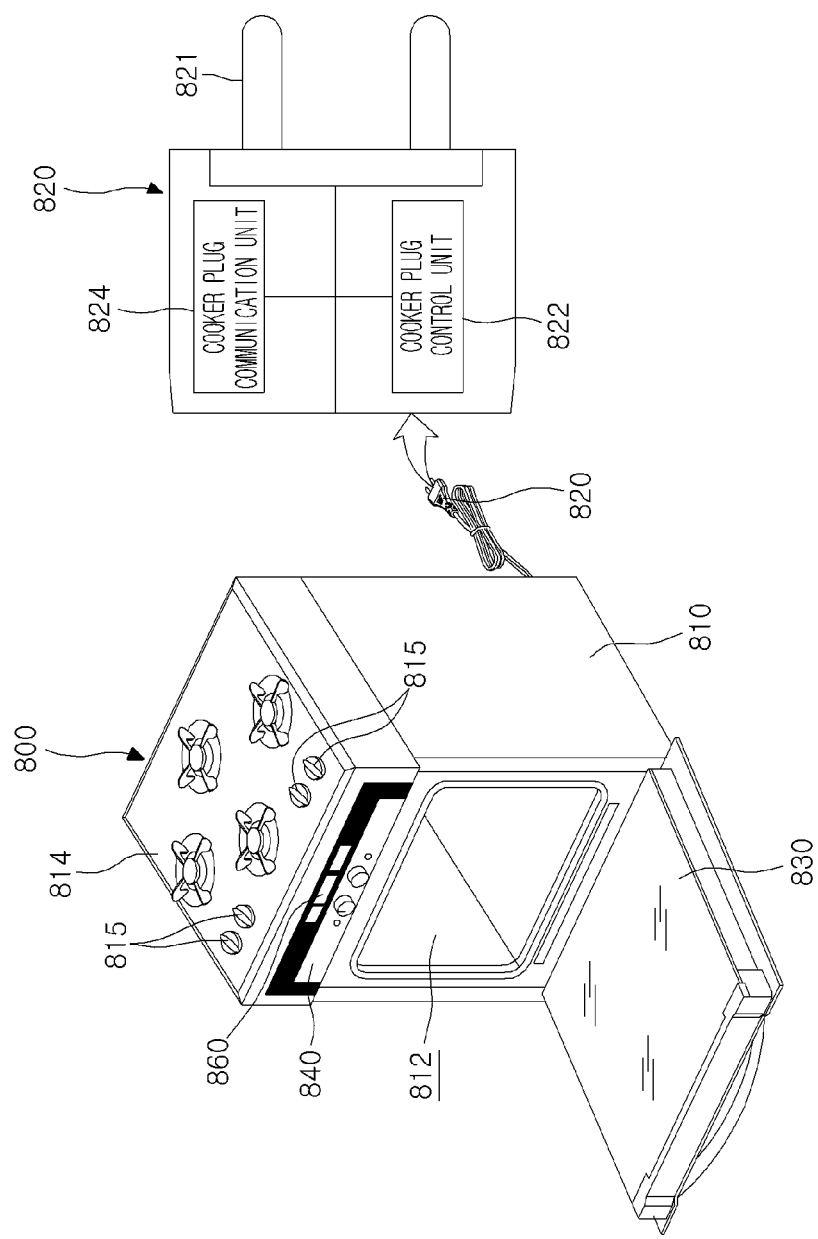
FIGS. 42 and 43 are views of a cooker according to an embodiment.
Figure 43:
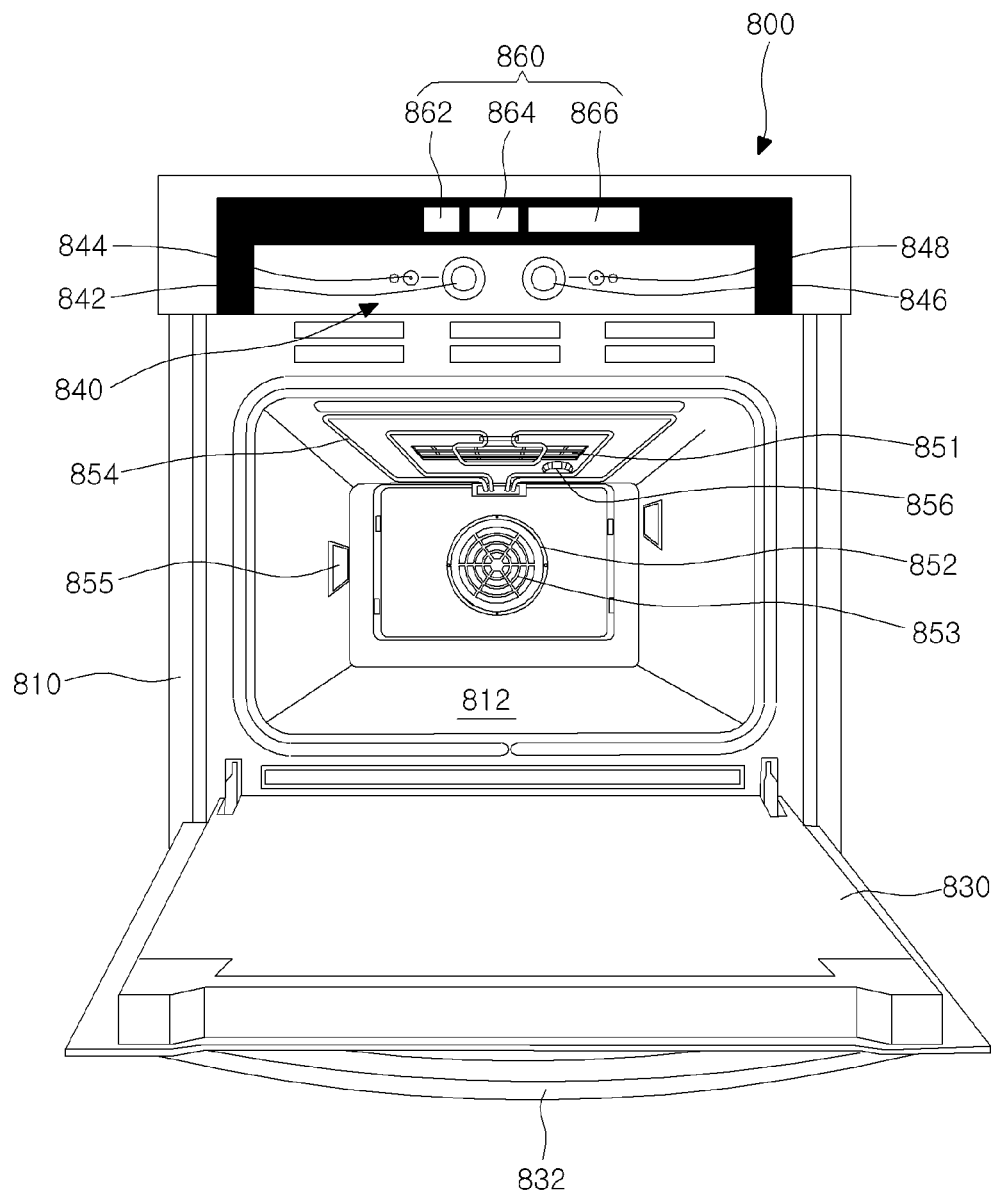
Figure 44:
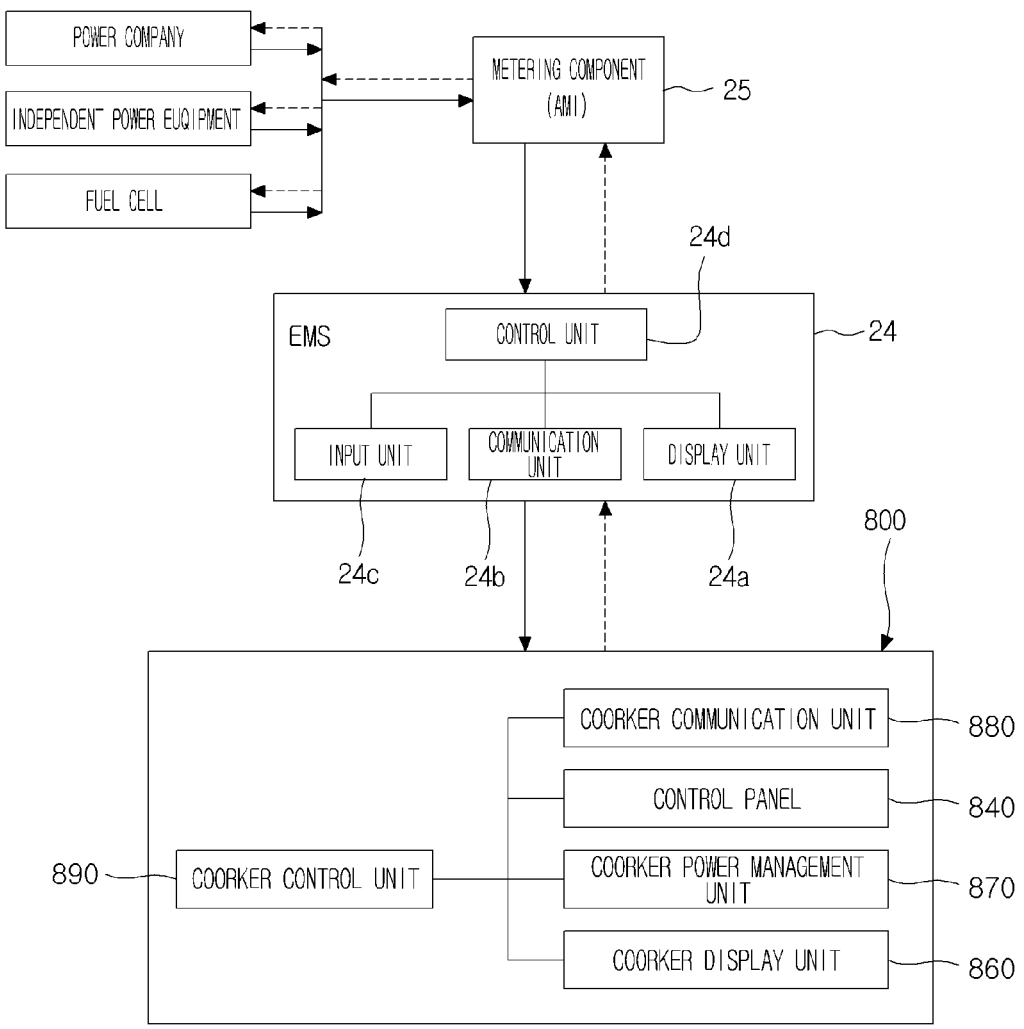
FIG. 44 is a view illustrating a control structure of the cooker according to an embodiment.

FIGS. 42 and 43 are views of a cooker according to an embodiment, and FIG. 44 is a view illustrating a control structure of the cooker according to an embodiment.

Referring to FIGS. 42 to 44, a cooker 800 according to an embodiment includes a cooking chamber 812 in which a cooker body 810 having an approximately rectangular shape have a hollow inner space for receiving foods to be cooked and the received foods are cooked by selectively using a plurality of heating sources. The cooking chamber 812 further includes an oven lamp 855 for informing operations of the heating sources and an exhaust filter 856 for exhausting smoke generated when the foods are cooked by the heating sources to the outside.

The heating sources include an upper heater 854 and a halogen heater 851, which are disposed at an upper portion of the cooking chamber 812, a convection heater 852 disposed at a rear side of the cooking chamber 812, and a lower heater (not shown) disposed at a lower portion of the cooking chamber 812. Also, a convection fan 853 for further effectively heating the foods is further disposed around the convection heater 852.

The cooking chamber 812 may be selectively covered by a door 830 rotatably coupled to the cooker body 810 to access the foods. The door 830 may further include a door handle 832 grasped by a user to open or close the door 830.

Also, a top burner 814 on which the foods or a container receiving the foods are seated to heat the foods or container is further disposed in an upper portion of the cooker body 810. Here, a control panel 840 that will be described below may include a manipulation knob 815 for operating the top burner 814. As illustrated, the manipulation knob 815 may be disposed on the cooker body 810.

A power source code including a cooker plug 820 connected to communicate with the above-described power management network, thereby supplying a power and receiving power supply information is disposed at a rear side of the cooker body 810. For this, the cooker plug 820 may include a cooker plug communication unit 824 that transmits/receives a communication signal for request of the power supply and a cooker plug control unit 822 for controlling the power supply.

The cooker plug 820 is connected to a cooker power management unit 870 disposed inside the cooker body 810. That is, the cooker power management unit 870 includes two power supply circuits classified from each other.

A control panel 840 for selectively controlling the plurality of heating sources disposed inside the cooker chamber 812 is disposed at a front upper portion of the cooker body 810. The control panel 840 includes a plurality of dials and buttons to select the heating sources to be operated by user's push manipulation or rotation manipulation and control a cooking time of the selected heating source.

A display unit 860 for displaying a control command inputted by manipulating the dials or buttons, a control state according to the control command, and operation information of the cooking chamber 812 is disposed on upper portion of the control panel 840. In detail, the control panel 840 includes a mode setting unit for allowing the user to confirm the power supply source for supplying the power through the display unit 860.

The mode setting unit includes a mode setting dial 842 having a dial shape and rotatably manipulated by the user and a mode selection button 844 having a push button shape and configured to supply a power through one of the power supply sources confirmed by the mode setting dial 842.

Here, the mode setting dial 842 performs a function for searching the power supply source when a main power source is turned on to operate the cooker 800 in a state where the power management network is connected to the cooker plug 820.

That is, as the user manipulates the mode setting dial 842, changed information of the power supply source is displayed on the display unit 860. When the user pushes the mode selection button 844, the current power supply source is selected on the display unit 860 to supply the power.

Also, the cooker power management unit 870 is operated in a power supply type classified into a normal mode and an energy saving mode according to a power supply amount of the selected power supply source/

That is, after the power supply type is decided, the plurality of heating modes are successively displayed through the display unit 860 according to the manipulation of the mode setting dial 842. Then, the user selects one of the heating modes to push the mode selection button 844, thereby cooking the foods in the selected heating mode.

For this, a cooker control unit 890 includes a control algorithm for confirming the selection and operation mode of the power supply source after the main power source is turned on when the mode setting dial 842 and the mode selection button 844 are manipulated. Also, the control panel 840 further includes a temperature and time setting dial 846 for setting a cooking temperature and time and a selection button 848 for executing the set cooking temperature and time.

The temperature and time setting dial 846 may be manipulated to search functions such as automatic cooking, memory cooking, keeping warm, and so on. Also, whether the function is available according to the power supply type may be displayed through the display unit 860. In detail, the display unit 860 includes a mode display part 862 for displaying the current power supply type and the operating heating mode, a temperature/time display part 864 for setting and displaying a heating temperature and a heating time, and an information display part 866 for displaying the power supply information and information of cooking modes limited in usage and available functions.

Figure 45:
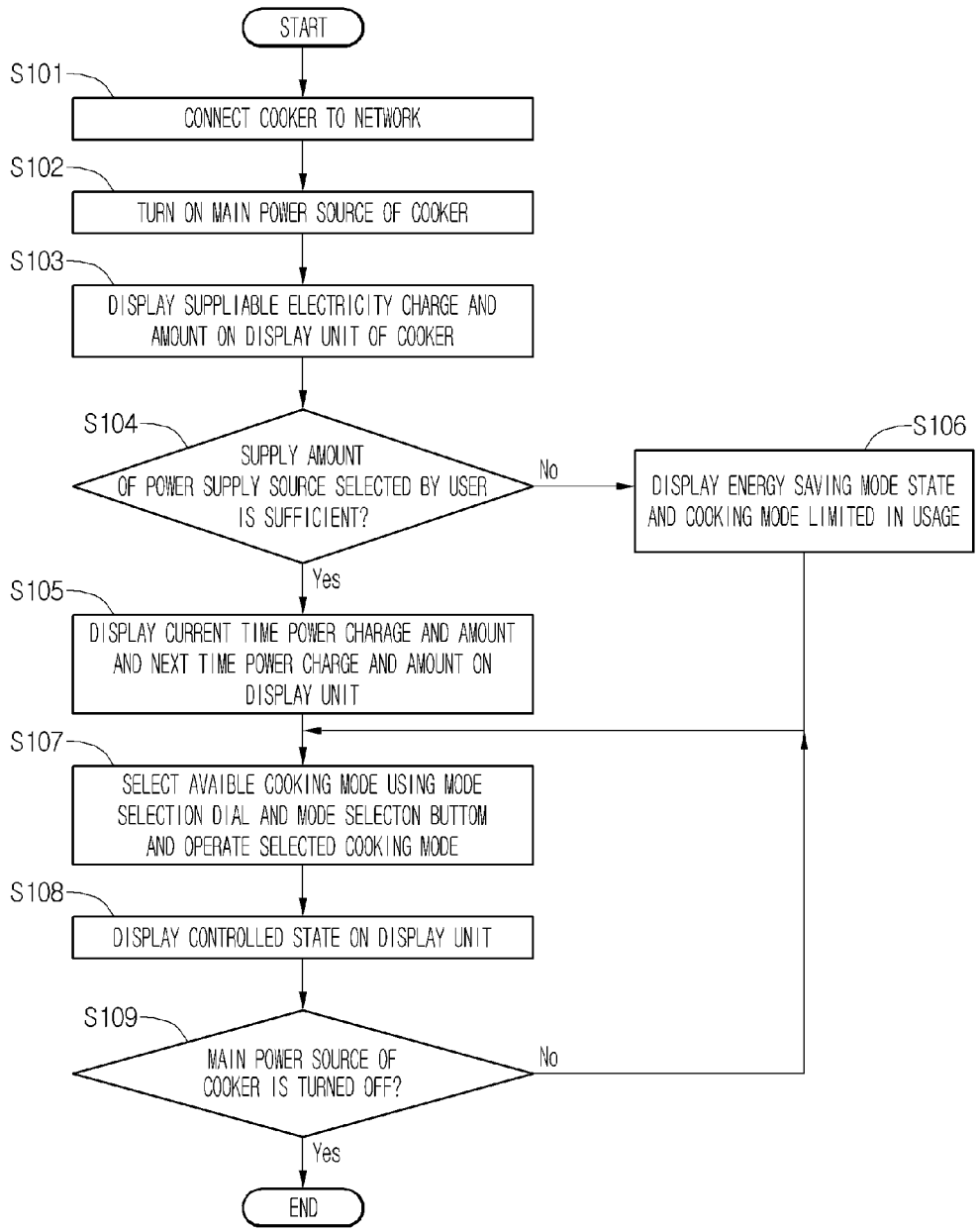
FIG. 45 is a flowchart illustrating a process of controlling a cooker according to an embodiment.
Figure 46:
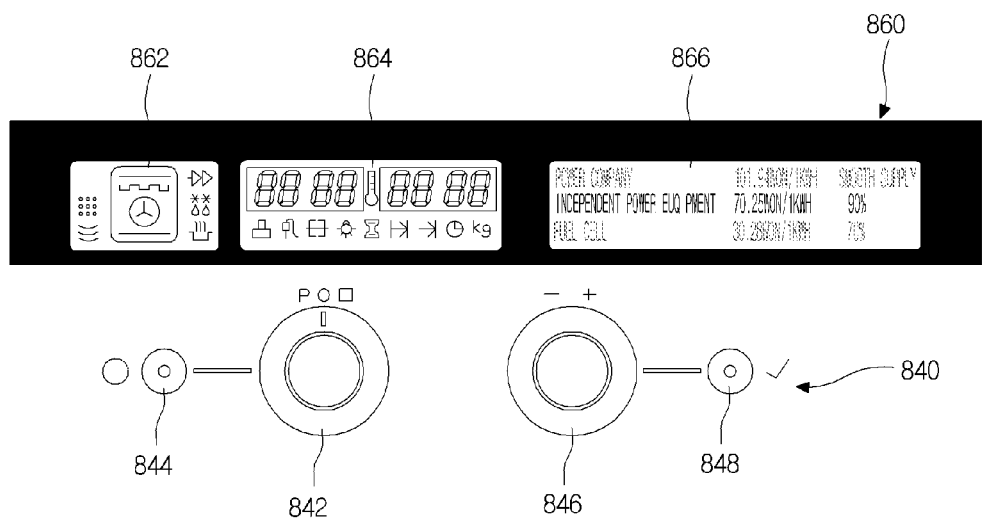
FIGS. 46 to 48 are views illustrating information displayed on a display unit of the cooker.
Figure 47:
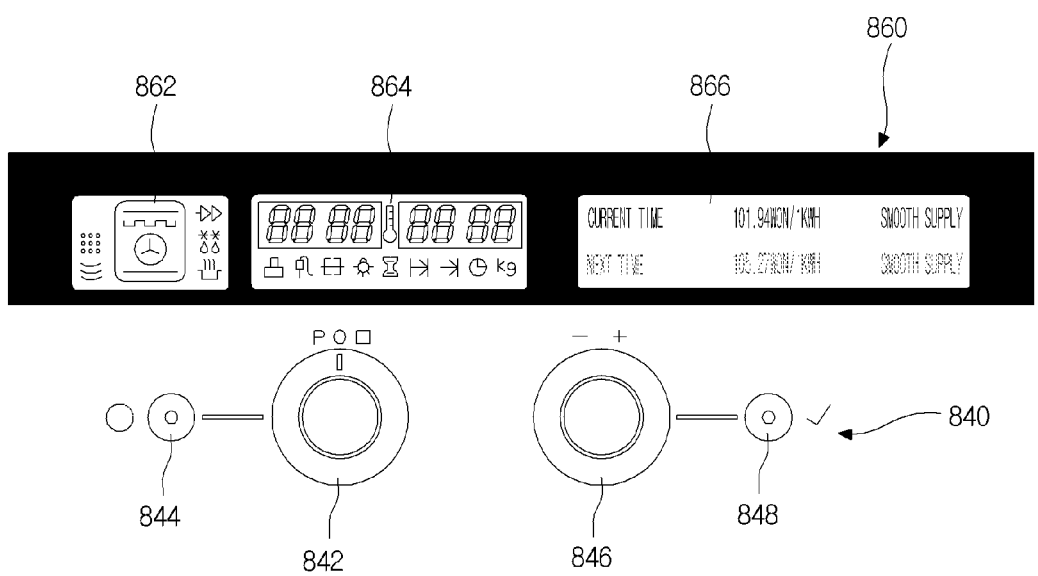
Figure 48:
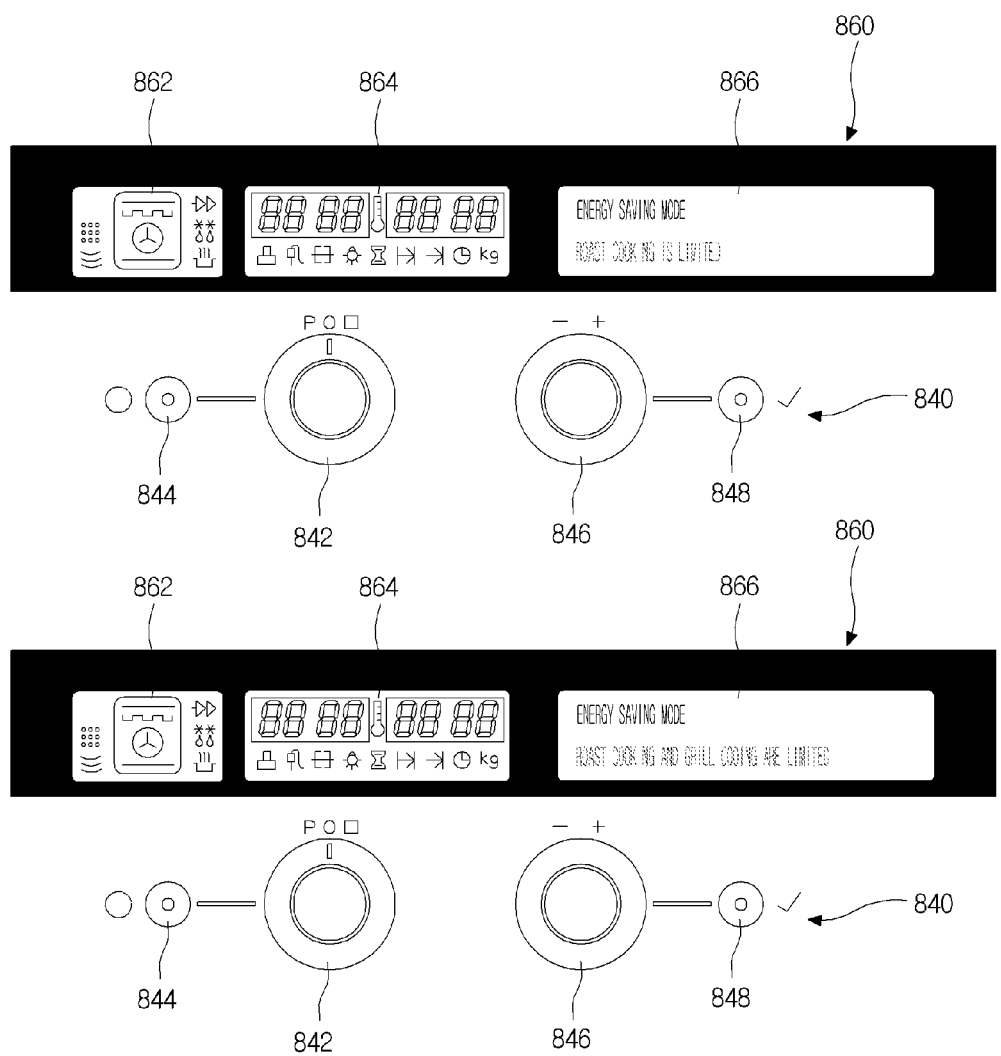

FIG. 45 is a flowchart illustrating a process of controlling a cooker according to an embodiment, and FIGS. 46 to 48 are views illustrating information displayed on a display unit of the cooker.

Referring to FIGS. 45 to 48, after a main power source of a cooker 800 connected to a power management network is pushed, the main power source of the cooker 800 is turned on by a user.

Here, in operations S101 and 102, a power supplied into the cooker 800 is supplied from a power supply source having the lowest supply price among a plurality power supply sources through an energy management component 24. Here, a supply amount of the power supplied as described above is not considered.

When the main power source of the cooker 800 is turned on, as shown in FIG. 46, power supply information including a power supply price and supply amount per a unit time in each power supply source is displayed on the information display part 466. Here, in operation S103, the power supply information may be successively varied according to rotation manipulation of the mode setting dial 842.

When the user selects the power supply source through the above-described process, a power control circuit of a cooker power management unit 870 is selected according to the power supply amount. That is, when the power supply amount of the power supply source selected by the user is sufficient, the cooker 800 is operated in a normal mode in which all cooking modes can be performed without limiting functions.

As shown in FIG. 47, current time electricity charge and supply amount and next time electricity charge and supply amount of the currently selected power supply source are displayed on the information display part 866. An English initial "N" that informs the normal mode is displayed on the mode display part 862 to inform the operating of the cooker 800 in the normal mode to the user. Here, in operations s104 and S105, the sufficient power supply amount represents that the power can be supplied until a cooking mode in which the longest time and maximal output are required in the automatic cooking mode of the cooker 800 is completely performed.

When the power supply amount of the power supply source selected by the user is not sufficient, the power supply type of the energy saving mode in which a portion of the cooking mode of the cooker 800 is limited by the cooker power management unit 870 may be performed.

As shown in FIGS. 47 and 48, the cooking mode limited in usage is disposed on the information display part 866. Also, in operation S106, an English initial "E" that informs the energy saving mode is displayed on the mode display part 862 to inform the operating of the cooker 800 in the energy saving mode to the user.

The heating mode limited as described above is limited in usage from the function in which a relatively longest output is required according to the supply amount of the power supplied from the selected power supply source. Thus, when the power supply type of the energy saving mode is performed in the cooker 800 according to an embodiment, roast cooking and grill cooking in which the power consumption is relatively high and the cooking time is required for a long time are firstly limited.

Thus, the user selects the power supply type of the cooker 800 in the energy saving mode when the roast or grill cooking is not frequently used to operate the cooker 800 using a power using a relatively low price in operations S107 and 108. Also, whether the main power source of the cooker 800 is turned off may be determined in operation S109.

According to the embodiments, the energy source may be effectively produced, used, distributed, and stored to perform the effective management of the energy source.

According to the network system according to the embodiment, the energy source may be effectively produced, used, distributed, and stored to perform the effective management of the energy source. Therefore, the industrial applicability is significantly high.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An energy consumption component capable of communicating with another component, comprising:
   a communication unit to receive information related to energy, the information comprising at least energy charge information;
   a memory unit to store an operation course including a plurality of course components having a predetermined time period, the plurality of course components being successively or simultaneously performed;
   a control unit to receive the information related to energy received by the communication unit, and to control an operation of the energy consumption component based on the plurality of course components from the memory unit,
   wherein the energy consumption component performs a function according to the plurality of course components, and the control unit controls the plurality of course components to restrict an operation of at least one of the plurality of course components based on the information related to energy,
   wherein the energy consumption component comprises a washing machine, wherein the plurality of course components includes a main component preset to be necessary and a sub component preset to be unnecessary, in a process of performing a function of the washing machine, the main component comprising a washing process, a rinsing process, or a dehydrating process, and the sub component comprising a displaying process for indicating an operation state of the washing machine, and wherein the control unit controls the main component and the sub component such that the main component is performed and operation of the sub component is stopped to not allow the indicating the operation state of the washing machine if the information related to energy indicates that the energy cost is high.

2. The energy consumption component according to claim 1, wherein the control unit causes the operation of the at least one of the plurality of course components to be immediately stopped or stopped after the operation of the sub component is operated for a preset time.

3. The energy consumption component according to claim 1, wherein, when the information related to energy indicates that the energy is low cost, the control unit causes the at least one of the plurality of course components to operate according to normal operation course.

4. The energy consumption component according to claim 1, wherein the information related to energy includes an energy consumption amount consumed by the at least one of the plurality of course components or an energy charge corresponding to the energy consumption amount.

5. The energy consumption component according to claim 1, wherein the washing machine comprises:
an input unit to select an operation course among a plurality of operation courses; and
a display unit, wherein the control unit causes the display unit to display information with respect to an operation state of the energy consumption component and the operation of the selected operation course or a course component of the selected operation course.

6. The energy consumption component according to claim 1, wherein the control unit causes the energy consumption component to selectively operate in a normal mode or an energy saving mode based on the information related to energy.

7. The energy consumption component according to claim 6, wherein the control unit controls the at least one of the plurality of course components to restrict the operation of the sub component when the washing machine is operating in the energy saving mode.

8. The energy consumption component according to claim 1, further comprising a display unit, wherein the control unit causes the display unit to display estimated energy amount or energy charge per a unit time, which are required from each operation function of the energy consumption component, stored in the memory unit.

9. The energy consumption component according to claim 1, further comprising a mode selection input unit to input a power supply mode.

10. The energy consumption component according to claim 1, wherein the information related to energy comprises information related to at least an energy cost.

11. The energy consumption component according to claim 10, wherein the information related to at least the energy cost is at least one of time-based pricing, a power amount, a variation of the time-based pricing, a variation of the power amount, a mean value of the time-based pricing, and a mean value of the power amount.

12. The energy consumption component according to claim 1, wherein the information related to energy comprises information except an energy charge, and the information except the energy charge is one of curtailment, grid emergency, grid reliability, electricity generation amount, operation priority, and an energy consumption amount.

13. The energy consumption component according to claim 1, wherein the information related to energy further comprises additional information comprising time information or weather information.

14. The energy consumption component according to claim 6, wherein the control unit skips the at least one of the plurality of course components when the washing machine is restricted in operation from the at least one of the plurality of course components skippable in a process in which the function of the washing machine is performed when the washing machine operates in the energy saving mode.

15. The energy consumption component according to claim 1, further comprises an input unit, wherein the input unit allows input of the at least one of the plurality of course components that is usable, and
wherein the input unit prevents input of the at least one of the plurality of course components that is unusable.

16. The energy consumption component according to claim 1, further comprises a display unit, wherein the display unit displays the at least one of the plurality of course components that is usable.

* * * * *